US010945092B2

(12) United States Patent
Shen et al.

(10) Patent No.: US 10,945,092 B2
(45) Date of Patent: Mar. 9, 2021

(54) ORGANIZING PHYSICAL OBJECTS USING WIRELESS TAGS

(71) Applicant: Adero, Inc., Goleta, CA (US)

(72) Inventors: Jack J. Shen, Goleta, CA (US); Jeremiah Prousalis, Santa Barbara, CA (US); Adrian Yanes, Santa Barbara, CA (US); Kristen Johansen, Santa Barbara, CA (US); Nathan Kelly, Santa Barbara, CA (US)

(73) Assignee: Adero, Inc., Goleta, CA (US)

( * ) Notice: Subject to any disclaimer, the term of this patent is extended or adjusted under 35 U.S.C. 154(b) by 0 days.

(21) Appl. No.: 16/183,079

(22) Filed: Nov. 7, 2018

(65) Prior Publication Data
US 2020/0145920 A1 May 7, 2020

(51) Int. Cl.
| H04W 4/02 | (2018.01) |
| H04W 52/02 | (2009.01) |
| H04L 29/08 | (2006.01) |
| H04W 4/38 | (2018.01) |
| H04W 4/35 | (2018.01) |

(52) U.S. Cl.
CPC .............. *H04W 4/023* (2013.01); *H04L 67/12* (2013.01); *H04W 4/38* (2018.02); *H04W 52/0229* (2013.01); *H04W 4/35* (2018.02)

(58) Field of Classification Search
CPC .................................................... H04W 4/023
See application file for complete search history.

(56) References Cited

U.S. PATENT DOCUMENTS

| 5,892,441 | A | 4/1999 | Woolley et al. |
| 6,717,516 | B2 | 4/2004 | Bridgelall |
| 6,745,027 | B2 | 6/2004 | Twitchell |
| 7,009,519 | B2 | 3/2006 | Leonard et al. |
| 7,644,261 | B2 | 1/2010 | Hsieh |
| 7,646,292 | B2 | 1/2010 | Johnson |
| 8,094,012 | B1 | 1/2012 | Tran et al. |
| 8,373,562 | B1 | 2/2013 | Heinze et al. |
| 8,981,938 | B2 | 3/2015 | Kazerouni |
| 10,051,600 | B1* | 8/2018 | Zhong ..................... H04L 67/12 |
| 10,373,463 | B1 | 8/2019 | Herring |

(Continued)

OTHER PUBLICATIONS

International Search Report and Written Opinion for Application No. PCT/US2019/052774; dated Dec. 12, 2019, 8 pages.
International Search Report and Written Opinion for Application No. PCT/US2019/052776, dated Oct. 29, 2019, 6 pages.

(Continued)

*Primary Examiner* — Jason E Mattis
(74) *Attorney, Agent, or Firm* — Brake Hughes Bellermann LLP

(57) ABSTRACT

A system includes: first tags configured to organize activities regarding respective physical objects, each of the first tags including at least a first processor, a first memory, a sensor, an input device, an output device, a wireless communication component, and a first activity component operated using the first processor and the first memory to adapt a behavior of the respective first tag; and a processing device configured to receive first wireless signals from at least some of the first tags, the processing device including a second processor, a second memory, and a second activity component operated using the second processor and the second memory to determine at least presence, proximity, and movement of the first tags based on the first wireless signals.

12 Claims, 64 Drawing Sheets

(56) References Cited

U.S. PATENT DOCUMENTS

| | | |
|---|---|---|
| 10,448,211 B1 | 10/2019 | Shen et al. |
| 10,520,580 B2 | 12/2019 | Nossik et al. |
| 2006/0109037 A1 | 5/2006 | Hsu |
| 2006/0192653 A1 | 8/2006 | Atkinson et al. |
| 2010/0060452 A1 | 3/2010 | Schuster et al. |
| 2013/0090134 A1* | 4/2013 | Heshmati .............. H04W 4/029 455/456.3 |
| 2014/0173439 A1 | 6/2014 | Gutierrez et al. |
| 2014/0368334 A1 | 12/2014 | Tian et al. |
| 2015/0126234 A1 | 5/2015 | Rodriguez |
| 2015/0128733 A1 | 5/2015 | Taylor et al. |
| 2016/0231372 A1 | 8/2016 | Wootton et al. |
| 2016/0260301 A1 | 9/2016 | Miller et al. |
| 2016/0364682 A1 | 12/2016 | Jones et al. |
| 2017/0093982 A1 | 3/2017 | Shaashua et al. |
| 2017/0262697 A1* | 9/2017 | Kaps .................... G11B 27/022 |
| 2018/0039934 A1 | 2/2018 | Mulaosmanovic et al. |
| 2018/0091138 A1 | 3/2018 | Greither et al. |
| 2018/0123804 A1 | 5/2018 | Smith et al. |
| 2018/0225951 A1 | 8/2018 | De Barros Chapiewski et al. |
| 2019/0058591 A1 | 2/2019 | Sharpe et al. |
| 2019/0096209 A1* | 3/2019 | Chen ..................... G06N 20/00 |
| 2020/0260228 A1* | 8/2020 | Arunachalam ........... G01S 5/02 |

OTHER PUBLICATIONS

International Search Report and Written Opinion for Application No. PCT/US2019/052777, dated Dec. 12, 2019, 9 pages.
International Search Report and Written Opinion for PCT Application No. PCT/US2020/070490, dated Nov. 20, 2020, 9 pages.

* cited by examiner

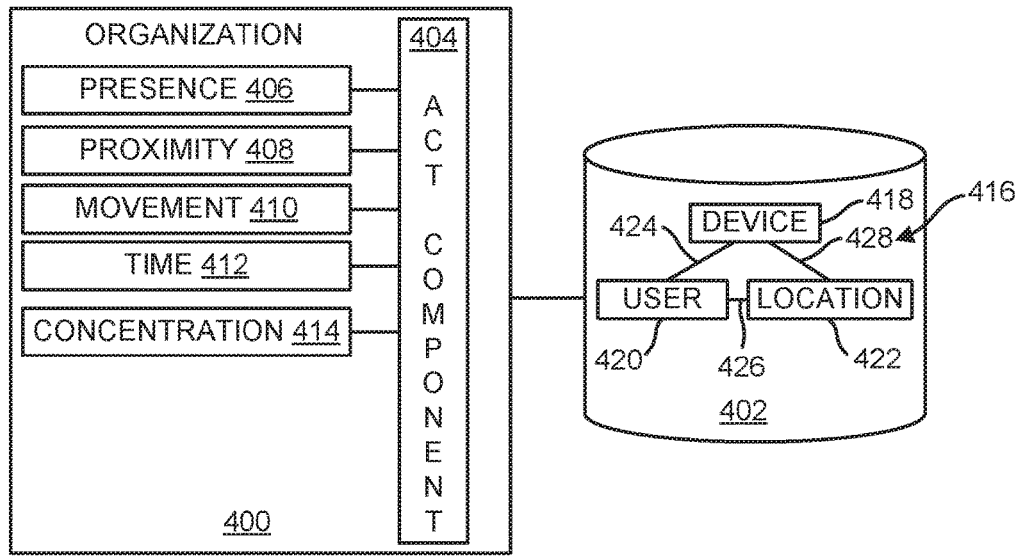
FIG. 4
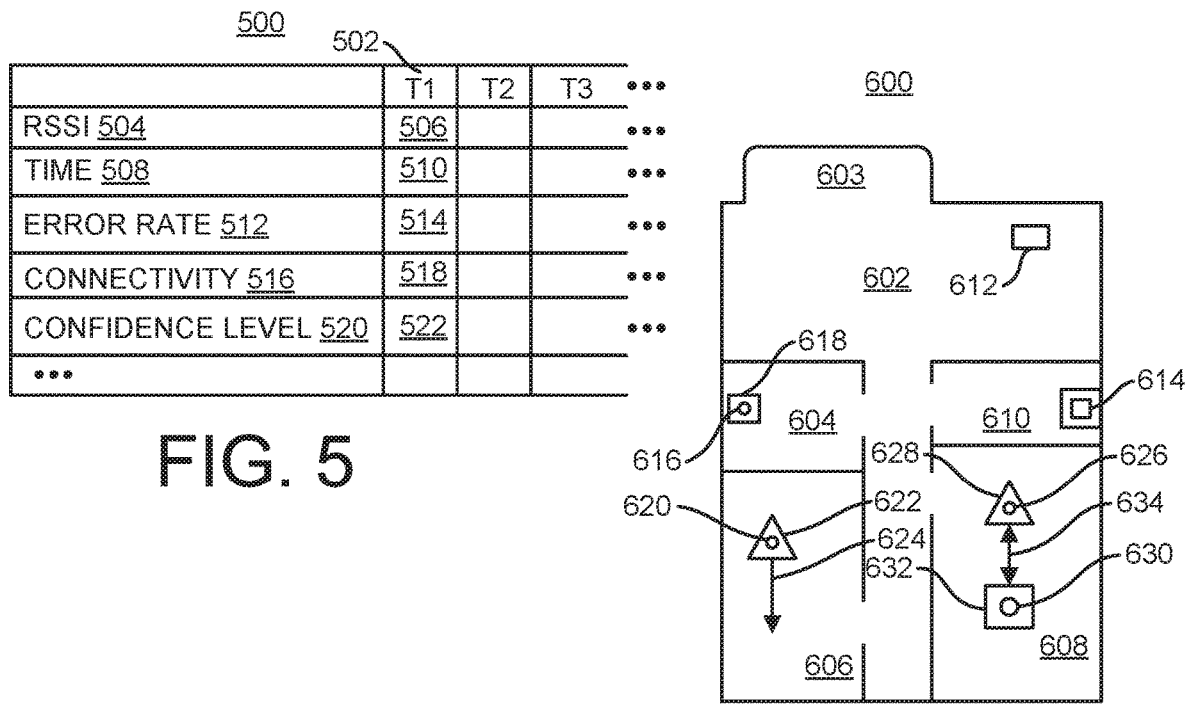
FIG. 5
FIG. 6

1900  FIG. 19

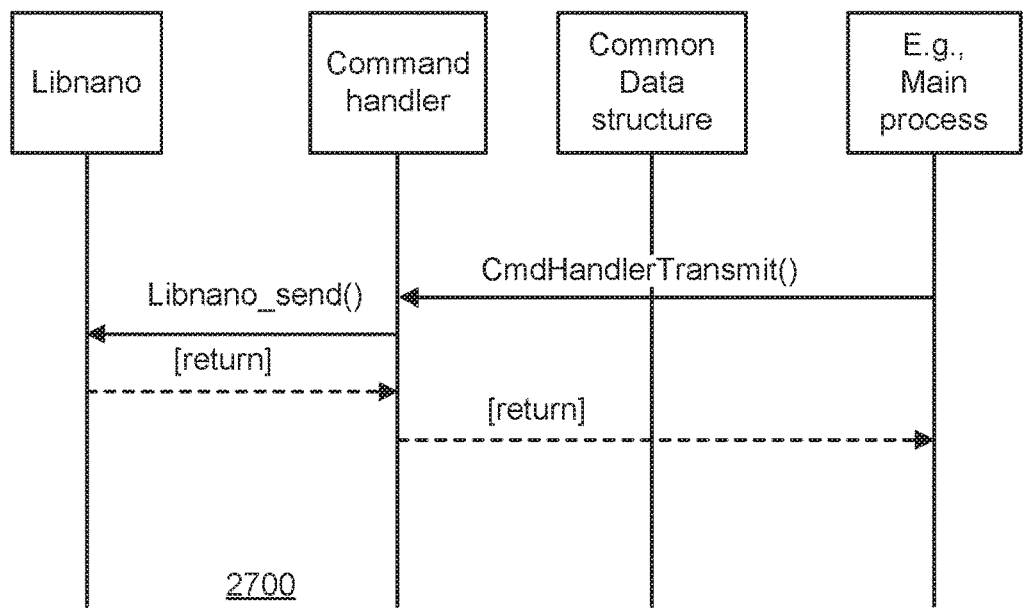
FIG. 27
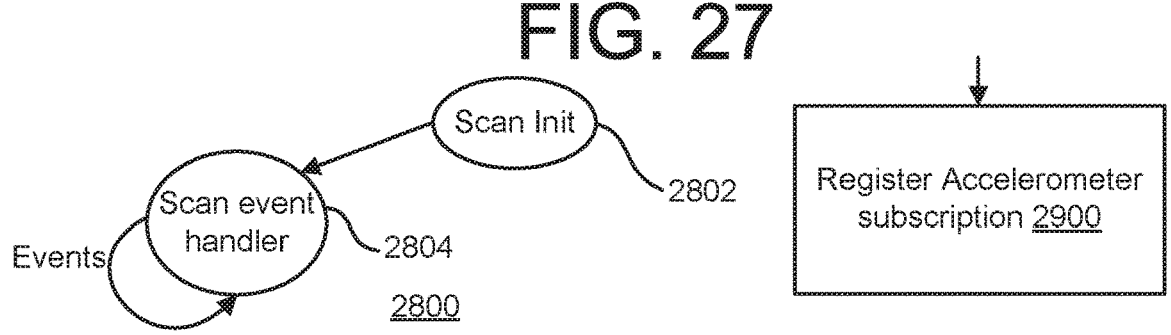
FIG. 28
FIG. 29
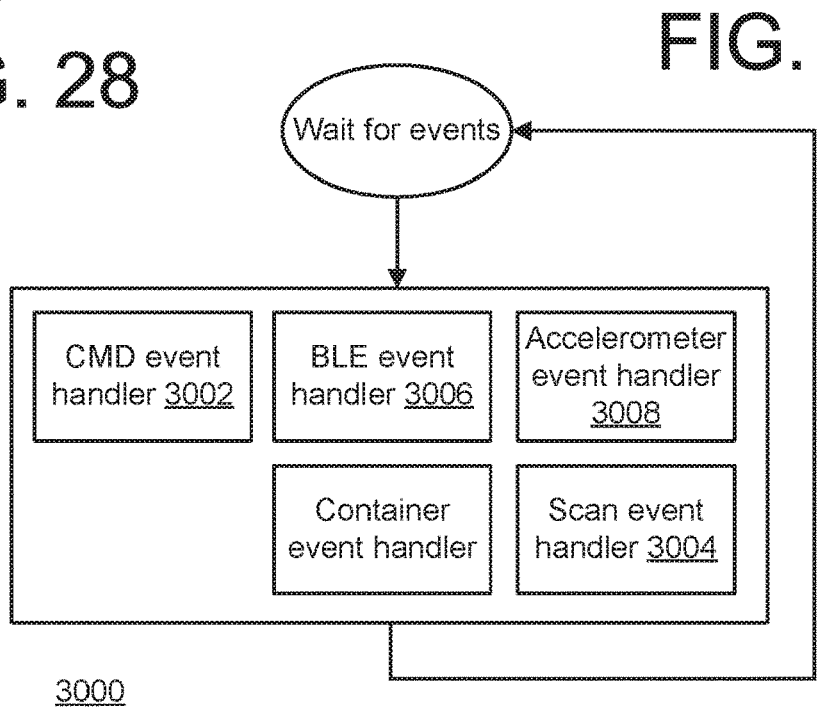
FIG. 30

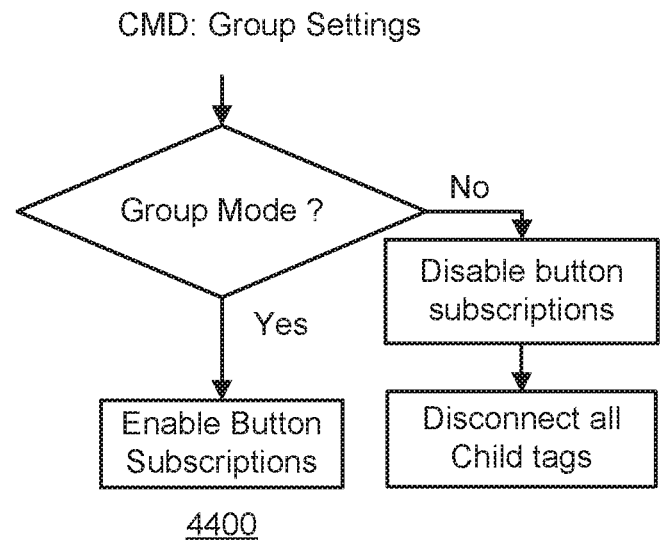
FIG. 44
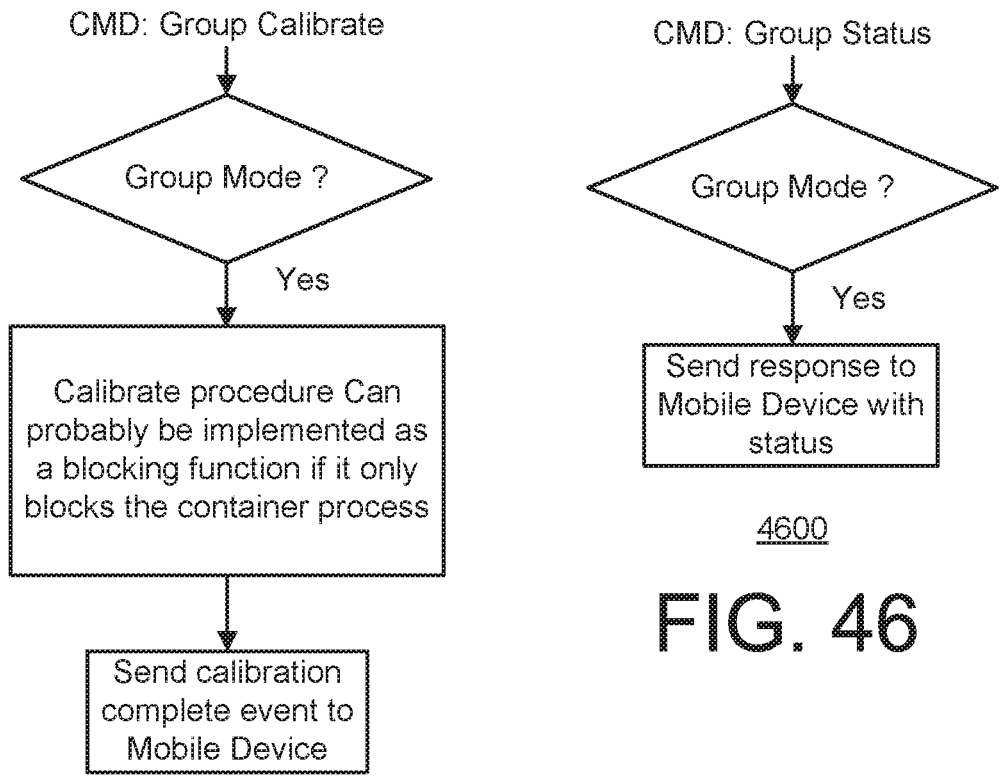
FIG. 45
FIG. 46

6700

6800

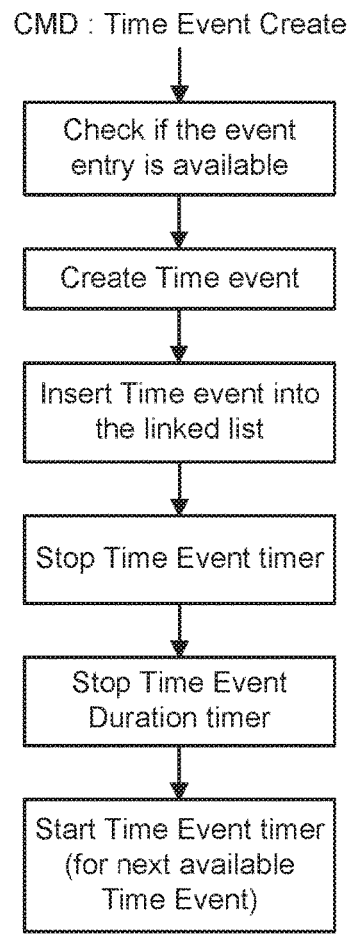
FIG. 69
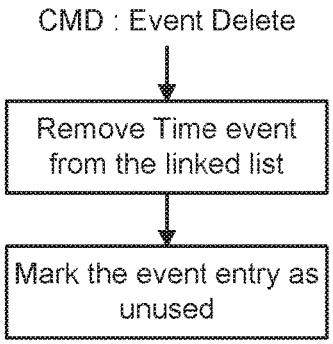
FIG. 70
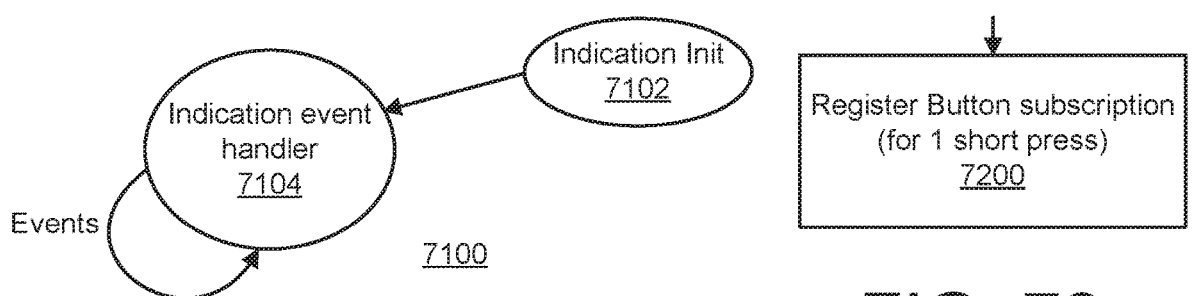
FIG. 71
FIG. 72

11200

11300

11600

11700

11800

12000

12100

12200

12900

13000

ORGANIZING PHYSICAL OBJECTS USING
WIRELESS TAGS

CROSS-REFERENCE TO RELATED
APPLICATIONS

This patent application relates to the following patent applications filed concurrently herewith ("the related patent applications"):

U.S. patent application Ser. No. 16/183,087, filed Nov. 7, 2018, and entitled "Organizing groups of physical objects using wireless tags."

U.S. patent application Ser. No. 16/183,092, filed Nov. 7, 2018, and entitled "Providing indication to location of physical object using wireless tag."

U.S. patent application Ser. No. 16/183,097, filed Nov. 7, 2018, and entitled "Tag for wirelessly organizing a physical object."

Each one of the related patent applications is incorporated herein by reference in its entirety.

TECHNICAL FIELD

This document relates, generally, to organizing physical objects using wireless tags.

BACKGROUND

The universe of internet-of-things (IoT) devices continues to expand, which can lead to transformation of homes, offices, retail stores, warehouses and public spaces. Smartphones, smart thermostats and smart light bulbs have been introduced. Although connected to a network, single-purpose, siloed IoT devices may suffer from the shortcoming that they are in a sense not truly aware of each other, and the system cannot take into account the bigger picture. For example, there may be no shared context.

SUMMARY

In a first aspect, a system includes: first tags configured to organize activities regarding respective physical objects, each of the first tags including at least a first processor, a first memory, a sensor, an input device, an output device, a wireless communication component, and a first activity component operated using the first processor and the first memory to adapt a behavior of the respective first tag; and a processing device configured to receive first wireless signals from at least some of the first tags, the processing device including a second processor, a second memory, and a second activity component operated using the second processor and the second memory to determine at least presence, proximity, and movement of the first tags based on the first wireless signals.

Implementations can include any or all of the following features. The first activity component adapts the behavior of the respective first tag based on an output of the sensor of the respective first tag. At least one of the first tags scans for second wireless signals, and wherein the first activity component of the at least one of the first tags adapts the behavior of the one of the first tags based on scanning for the second wireless signals. The system further comprises second tags assigned to at least one of the first tags, the second tags configured to send second wireless signals to the one of the first tags, wherein the first activity component of the one of the first tags determines at least presence, proximity, and movement of the second tags based on the second wireless signals. The first memory of the one of the first tags has stored therein a record reflecting confidence levels relating to the presence, proximity, and movement of the second tags. At least one of the second tags is configured to beacon in response to a wireless wake-up signal. The second activity component is configured to determine the presence, proximity, and movement of the first tags based on at least one of a received signal strength indication (RSSI) of the first wireless signals, a latency of the first wireless signals, a connectivity of the first wireless signals, a packet error rate of the first wireless signals, a packet loss of the first wireless signals, a change in the RSSI, a change in the latency, a change in the connectivity, a change in the packet error rate, or a change in the packet loss.

In a second aspect, a method includes: receiving, in a first tag, first wireless signals from second tags assigned to the first tag and configured to organize activities regarding respective physical objects; sending, by a second wireless signal from the first tag to a processing device, event information regarding at least presence, proximity, and movement of the second tags; and adapting a behavior of the first tag.

Implementations can include any or all of the following features. Adapting the behavior of the first tag comprises conserving power of the first tag. Adapting the behavior of the first tag comprises at least one of increasing how often the first tag sends a beacon, or increasing a signal strength of the beacon. Adapting the behavior of the first tag is based on at least one of the first wireless signals. The method further comprises receiving an input in the first tag from a sensor of the first tag, wherein adapting the behavior of the first tag is based on receiving the input. The method further comprises scanning by the first tag. The method further comprises generating an output by an output device of the first tag, the output based on the event information. The method further comprises determining, by the first tag, a confidence level regarding the presence, proximity, and movement of the second tags, and sending the confidence level to the processing device. The method further comprises determining the event information in the first tag. The method further comprises determining whether a rule permits at least one of the presence, proximity, or movement of at least one of the second tags. The event information is determined taking into account at least one of a received signal strength indication (RSSI) of the first wireless signals, a latency of the first wireless signals, a connectivity of the first wireless signals, a packet error rate of the first wireless signals, a packet loss of the first wireless signals, a change in the RSSI, a change in the latency, a change in the connectivity, a change in the packet error rate, or a change in the packet loss. The method further comprises invoking mesh networking based on the determination.

In a third aspect, a method includes: receiving, in a processing device, first wireless signals from first tags configured to organize activities regarding respective physical objects; determining, by the processing device, at least presence, proximity, and movement of the first tags; and taking, by the processing device, at least one action based on determining the presence, proximity, and movement.

BRIEF DESCRIPTION OF DRAWINGS

FIG. 4 shows an example of an activity component and a rules repository.

FIG. 5 shows an example of a record that can be generated to track presence, proximity, and movement of physical items.

FIG. 6 schematically shows a layout of a building in which a system can track physical items.

FIG. 27 shows an example of a sequence diagram for a transmit sequence.

FIG. 28 shows an example of a top level state diagram with a scan init and a scan event handler.

FIG. 29 shows an example relating to the scan init of FIG. 28, including a register accelerometer subscription.

FIG. 30 shows an example relating to the scan event handler of FIG. 28.

FIG. 44 shows an example of CMD: group settings relating to the command event handler in FIG. 43.

FIG. 45 shows an example of CMD: group calibrate relating to the command event handler in FIG. 43.

FIG. 46 shows an example of CMD: group status relating to the command event handler in FIG. 43.

FIG. 69 shows an example relating to a time event handler.

FIG. 70 shows an example relating to a time event handler.

FIG. 71 shows an example of a state diagram including an indication init and an indication event handler.

FIG. 72 shows an example relating to the indication init of FIG. 71.

FIG. 121 shows an example relating to a System Overview from the Piezo Sound Driver perspective.

FIG. 122 shows an example relating to an overview of the Indication Process integration.

FIG. 123 shows an example relating to indication process logic.

FIG. 124 shows an example relating to a system overview from accelerometer perspective.

FIG. 125 shows an example relating to a 6D/4D orientation.

FIG. 126 shows an example relating to a process overview

FIG. 127 shows an example relating to logic flow inside the Accelerometer Process.

FIG. 128 shows an example relating to process overview and execution flow of the button process.

FIG. 129 shows an example relating to rejecting or confirming a subscription to a button event.

FIG. 130 shows an example relating to starting a timer for debouncing in response to an event detection.

FIG. 131 shows an example relating to a button process, event detection.

FIG. 132 shows an example of a computer device that can be used to implement the techniques described here.

Figure 1:
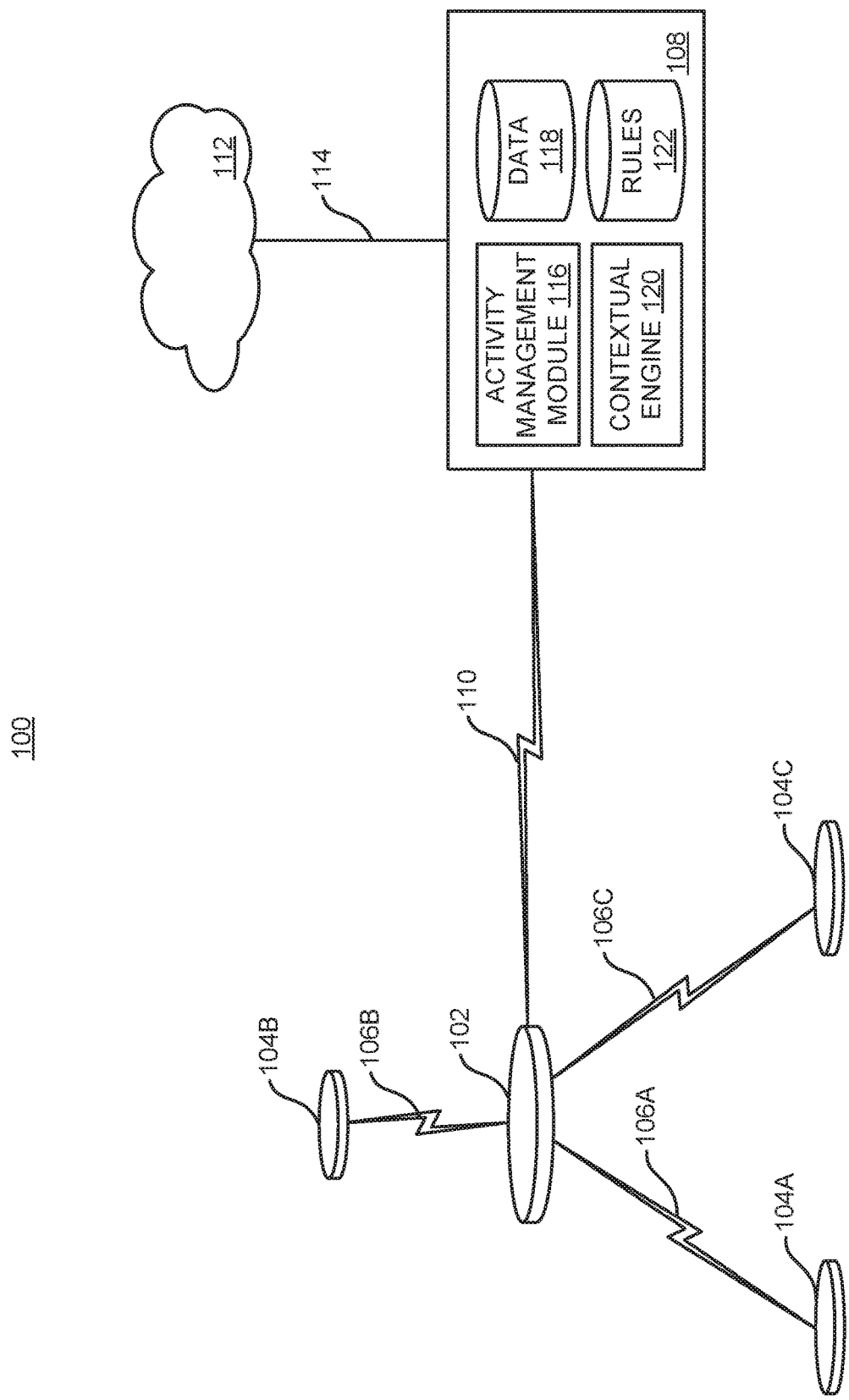
FIG. 1 schematically shows an example operating environment in which a system can track physical items.

Like reference symbols in the various drawings indicate like elements.

DETAILED DESCRIPTION

This document includes examples of systems and techniques that allow for intelligent organization, with regard to physical objects, of their presence relative to a system, an absolute location, or to a geofence definition, of their proximity relating to at least one other object, and/or of their movement.

More and more physical objects can be provided with sensors, processor capacity, and wireless connectivity. More and more everyday objects such as smart jackets, umbrellas, boxes, shelves, desks and chairs may now follow. An increased intelligence in everyday products can save resources and maximize utility in category after category of physical objects. The development of IoT devices can also create complexity and cognitive overhead for users, whether at home, at work, or elsewhere.

Existing approaches can be associated with one or more of the following characteristics. Only singular and point-to-point interactions may be supported. The approach may have limited universal or standardization of causes and effects (e.g., defined by participant) corresponding to an absence of universal truths. The approach may have limited greater contextual awareness of an environment. The approach may provide an unscalable experience; for example, every time a new component is added, the added benefit is linear. The approach may rely on heavy manual user input and upkeep. Implementations according to the present disclosure can improve or resolve one or more of the above characteristics of existing approaches.

The present disclosure describes examples of a technology platform that can counteract the complexity often observed in IoT proliferation and can be used for optimization and cross communication of these and/or other smart devices. In some implementations, a foundational technology platform/stack can be designed to counteract the complexity of IoT proliferation and harness the power of shared information. For example, item-level data can be securely gathered and shared across all the smart things in an environment (as a baseline system-level understanding) so as to create an intelligent, contextually aware environment. In such an intelligent environment, connected devices can serve as essentially intelligent systems, sharing a unified contextual understanding to inform decisions. In some implementations, such decisions could be singular, group-based, or collective in nature. In the context of such a platform, a range of seamless, end-to-end solutions can be created that solve larger, more challenging customer problems and drive greater benefits and returns on IoT investments.

The present disclosure describes examples of systems and/or techniques that allow things to take care of humans in some regards, rather than the other way around. In order for things to take care of a person, they must first in some sense understand the world in which the person lives and be aware of changes to that world. For example, an umbrella in a person's home can take care of that person by making sure the person is not caught in the rain without the umbrella. In such an example, the umbrella may need to have the intelligence and awareness to take care of that person in a variety of scenarios through various means. For example: the umbrella may need to know when it will likely rain; the umbrella may need to know who will be heading outside today; the umbrella may need to know if another family member took the umbrella; the umbrella may need to know where the umbrella is or where the person needs the umbrella to be; the umbrella may need to know if the person left the umbrella behind at the restaurant; the umbrella may need to know if the person already have the umbrella with him or her, ready to go; the umbrella may need to understand the context surrounding the person's need; and/or the umbrella may need to communicate to the person when it is meaningful to ensure that need is met.

Another example may involve asset management for a business. In this example, the physical object may be a service cart in a hotel; an oscilloscope in a lab; or a toolset on a construction site, to name just a few examples. In such or other scenarios, the physical object may need to know one or more of the following to take care of one or more of the persons involved if the physical object: for example, who will use it, when it will be used, and how long does that person need to use it for; where it should be returned to for the next use; if another team member took it, and when, or where it is; who has permission to use it; where it currently is; if it was forgotten, misplaced, or returned after the last use. Awareness and intelligence are required to understand the context surrounding the user's need, and/or ability to communicate to the person(s) when it is meaningful may be needed. That is, in order for things to truly take care of persons, they need to in a sense be aware of a greater, contextual environment. Some systems and/or techniques described herein illustrate that an environment can be implemented where individual things, locations, and people within the environment share a collective understanding and perspective of what is going on.

The present disclosure describes examples of systems and/or techniques that can simplify a person's life by creating a useful and trusted platform for making the things or other physical objects in that person's life smarter and more helpful. Things can be made smarter, for example, by increasing the intelligence of each thing; and/or increasing the intelligence of the system by creating a common platform to optimize the work done by the system. For example, when disparate objects are unified under a shared perspective of the world, it provides the objects within the environment (e.g., a container, a room, a house, a community, or a business) an ability to perform work (e.g., deliver contextualized experiences) that is greater than the sum of its parts.

The present disclosure describes examples of systems and/or techniques allowing physical objects to exist in a shared, contextual intelligent ecosystem. In such an ecosystem the intelligence of individual things, locations, and people within the ecosystem can contribute to and learn from a collective understanding and perspective of what is going on.

Some systems and/or techniques described herein can form a technology framework to create intelligent ecosystems. This can be characterized, for example, as creating a field around each thing, location, or person, which provides a shared common perspective in how they identify, sense, understand, and interact with the world. The field can apply to any wireless device (e.g., a user's mobile phone, a smart object, or a smart location) to allow these devices to gather insight. A foundational technology platform can include, for example, sensors, communication networks, and software, designed to create a shared intelligent, contextually aware platform for a wireless system in home, business, public settings, and/or other environments. A platform may enable developers to harvest the collective intelligence of IoT devices within an environment to deliver seamless, end-to-end customer solutions through coordinating information across multiple smart objects. The platform may facilitate development and sharing of a common, contextualized understanding of occurring activity.

In some implementations, the field and the systems/techniques relating thereto are an additive technology that can increase the capabilities of existing IoT devices to become more contextually aware of the activity around them, and/or coordinate with any or all participating devices within an environment. For example, this can help create more contextually aware environments that share a common understanding of the world and coordinate their work to achieve greater results.

As used herein, a tag is a wireless device with processing capability and configured to be attached to, embedded in, or otherwise coupled to a physical object to facilitate organizing or tracking of at least the presence, proximity, and movement of that physical object. The tag can include a wireless communication component that serves to transmit data packets over wireless (e.g., radio) signals from time to time (e.g., as a beacon), or to receive data packets over the signal(s) from another tag and/or from a processing device.

A platform may include multiple tags configured for being attached to, embedded within, or otherwise coupled to respective physical objects. Some tags can be configured to a logical structure such as a grouping or a structural hierarchy wherein one or more tags serve as a "parent tag" to one or more other tags which can be referred to as "child tags". As used herein, a tag is considered a parent tag if it controls the organizing of at least one other tag. As used herein, a tag is a child tag if the organizing of the tag is controlled by at least one other tag. The child tag can have the same or a different (e.g., less complex) configuration of hardware and/or software (e.g., operating system, applications, firmware, etc.) than the parent tag. A processing device can serve to connect with multiple tags (e.g., parent tags), react to information received from them, and issue queries, requests, or other commands to the tags. For example, the processing device may at least in part be implemented in the form of a smartphone and/or tablet executing a particular application or operating system. As another example, the processing device may at least in part be implemented in the form of a dedicated stand-alone device (sometimes referred to as a "hub" in the system). As another example, the processing device may at least in part be implemented in the form of one or more remote processing devices (e.g., a cloud solution). In some implementations, an intelligence engine can be implemented on one or more processing devices in the cloud. For example, the intelligence engine may contextualize one or more activities with external factors such as time of day, nature of interaction, location of interaction, weather and external conditions, and/or permissions and relationships between entities (e.g., tags, physical objects, and/or persons) to create experiences that leverage the collective understanding of the system.

The tag may include processing components to facilitate its communication with other parts of the system. The tag may be provided with context that is relevant to the tag and/or its physical object, and/or for surrounding tags and/or objects. In some implementations, such additional context may be provided through queries to other tags, devices, aspects of the system; input responses from one or more users; sensors or detection of environmental aspects, changes or variations of activity occurring such as presence or absence of expected/unexpected devices, anticipated or unanticipated occurring events or activities, or state changes in the devices internal awareness, or the duration of any number of such example activities. For example, the context and the tag's processing capability may allow the tag to phrase, or formulate responses to, queries including, but not limited to: What is the physical object? Who is the owner of the physical object? What other physical objects are located nearby the physical object? What is the relationship of the physical object to those other physical objects? Which of the physical objects is closest to the physical object? What physical objects are moving? Where is the physical object? What is the state of the environment in which the physical object is located? Is the physical object in a safe zone (e.g., a relative or absolute location where certain activities are permitted)? Other physical objects that have been assigned to the physical object, are they present? Has a schedule been set for the physical object? What time is it? In the physical object moving? Is the physical object lost? Should the tag ring? Should the tag send a notification? Should the tag light up? Should the tag adjust its beacon frequency?

Some systems and/or techniques described herein can be used for turning connected devices into aware systems. These systems can gather information about their environment at a given time and adapt behaviors accordingly. Generally, a system can include one or more hardware devices that may include wireless components (e.g., radios) and software. The hardware devices may facilitate gathering of data and performing of actions in the world, the wireless component(s) may allow for communication and data transmission between devices, and the software (sometimes referred to as an intelligence engine) may organize and contextualize the information gathered from, and optimize the actions performed by, the one or more hardware devices. In some implementations, the systems and/or techniques may facilitate connected devices (e.g., tags) to understand one or more of: the presence, proximity, motion, duration of presence, duration of proximity, duration of motion, and/or more of other connected devices in the system.

An entity can add contextual purpose on top of such awareness technology to create unique experiences. The technology can be combined with additional data sets (e.g., rules) to create experiences relating to "groups" (e.g., use of a parent tag to monitor one or more child tags associated with physical objects) and provide intelligent organization. The technology can be used for providing localization service that helps a user find and item; for example, the system can give an indication relating to the unknown location that may help the user in their search. Other examples of experiences include personal organization, home organization, security, inventory management, asset and access control, or logistics experiences.

FIG. 1 schematically shows an example operating environment in which a system 100 can track physical items. The system 100 can be used with one or more other examples described elsewhere herein. The system 100 can be implemented using one or more examples described herein with reference to FIG. 132.

The system 100 includes at least one tag 102 and/or at least one tag 104A-C. In some implementations, multiple instances (i.e., a plurality) of the tag 102 can be used, and here only one instance of the tag 102 is shown for simplicity. The tags 102 and 104A-C can be configured to be attached to, mounted on, or otherwise coupled to, respective physical objects which are not shown for simplicity. For example, the tag 102 may be attached to a sports bag and tags 104A-C may be attached to a baseball glove, a baseball cap, and a bat, respectively. Communication between the tag 102 and one or more of the tags 104A-C may occur by way of sending data packets over respective wireless signals 106A-C. In some implementations, the wireless signals 106A-C include beacon signals and the tag 102 is configured for receiving and recognizing the wireless signals 106A-C. For example, the tag 102 can be considered a parent tag with regard to one or more of the tags 104A-C. As another example, one or more of the tags 104A-C can be considered a child tag with regard to the tag 102. In some implementations, at least one instance of the tag 102 can serve as a child tag to another instance of the tag 102. In some implementations, at least one instance of the tag 104A can serve as a child tag to another instance of the tag 104A. In this example, the tag 102 can be considered to be at a first level of a hierarchy (e.g., as a parent tag), and the tags 104A-C can be considered to be at a second level of the hierarchy (e.g., as child tags). In some implementations, more levels than two can be used in a hierarchy.

For example, each of the tags 104A-C can be assigned to an item that a person carries in their purse to serve as a tracker for that item, and the tag 102 can be defined to correspond to the purse itself, to facilitate organizing and performance of actions based on whether the group of the tags 104A-C represented by the tag 102 is presently intact, or whether one or more of the tags 104A-C is deemed not to be within the group.

The system 100 includes a processing device 108 that can be implemented using one or more examples described with reference to FIG. 132. In some implementations, the processing device 108 may be implemented by one or more processors executing instructions stored in one or more instances of computer-readable storage medium. For example, a processor can execute instructions stored in a memory to instantiate and operate the processing device 108. Communication between the tag 102 and the processing device 108 can occur by way of at least one wireless signal 110. In some implementations, one or more of the tags 104A-C can communicate directly with the processing device 108.

The processing device 108 can be implemented as a single physical component, or can be distributed over multiple physical components. In some implementations, the processing device 108 may include a mobile electronic device (e.g., a smartphone, tablet, watch, wearable device, and/or laptop). In some implementations, the processing device 108 may include a dedicated stand-alone device (e.g., a hub in the system 100).

The processing device 108 can communicate directly and/or via a network with one or more other components within the system 100, outside the system 100, or both. In some implementations, the processing device 108 may participate in group management (e.g., of the tag 102 and/or the tags 104A-C), notification management (e.g., to a user by way of the tag 102 and/or tags 104A-C, or another user interface, such as the display device 13238 in FIG. 132), software updates (e.g., of the tag 102 and/or the tags 104A-C), power management (e.g., of the tag 102 and/or the tags 104A-C), and/or artificial intelligence (e.g., to control the tag 102 and/or the tags 104A-C, and/or to control responses to scenarios involving it or them).

The system 100 can include or make use of one or more remote processing devices, here referred to as clouds 112. The cloud 112 can be implemented using one or more examples described with reference to FIG. 132. Communication between the processing device 108 and the cloud 112 may occur by way of at least one signal 114. The signal 114 can be a wireless signal and/or a wired signal and here schematically illustrates a data network connection between devices. The signal 114 can be sent through one or more networks, including, but not limited to, a local network and/or the internet. In some implementations, the processing device 108 or components thereof can be implemented at least in part by the cloud 112. In some implementations, the tag 102 and/or at least one of the tags 104A-C can communicate directly with the cloud 112.

Activity can be monitored and managed in the system 100. Activity can include, but is not limited to, one or more aspects of presence, proximity, movement, or concentration, and/or the duration of any such presence, proximity, movement, or concentration. Activity monitoring and management in the system 100 can occur by way of the processing device 108 and/or the cloud 112. Here, an activity management module 116 is shown as part of the processing device 108 for purpose of illustration only. The activity management module 116 can accumulate data 118 to facilitate and/or in performing such activity management. For example, the data 118 is stored in a computer-readable medium. For example, data can be stored as state variables on a processing device.

The system 100 can be configured according to one or more levels. In some implementations, the processing device 108 and at least the tag 102 can be considered an item level in the system 100. For example, the item level can facilitate system awareness of at least the presence, proximity and movement of the physical item(s) associated with the tag(s) 102. In some implementations, a group level in the system 100 can include the item level just mentioned and one or more of the tags 104A-C. For example, the group level can facilitate that the tag 102 serves as the parent of the tag(s) 104A-C and monitors the at least the presence, proximity and movement of the physical item(s) associated with the tag(s) 104A-C. In some implementations, a home level in the system 100 can include the group level just mentioned and one or more connected components, including, but not limited to a hub in the system 100, a router, a digital assistant, and/or a smart lightbulb. For example, the home level can provide and manage awareness about the presence, proximity and movement of the physical item(s) associated with the tag(s) 102 and/or the tag(s) 104A-C in a broader spatial environment, such as in a home, office or other location. In some implementations, a system intelligence level in the system 100 can include the home level just mentioned and one or more cloud services. For example, the cloud service(s) can provide contextual notification based on the presence, proximity or movement recognized within the home level. As another example, the cloud service(s) can provide predictive ability based on data recognized in the system 100 and/or tracked behavior relating to the system 100 and/or the physical objects associated with the tags 102 and/or 104A-C.

Contextualization in the system 100 can occur by way of the processing device 108 and/or the cloud 112. Here, a contextual engine 120 is shown as part of the processing device 108 for purpose of illustration only. The contextual engine 120 can harvest data from one or more sources (e.g., based on detecting the behavior of a nearby device) and use it for contextualization, prediction, and/or to adapt its behavior. Harvested data can include external data, such as calendar information for event data, weather data for weather conditions, or crowd-based data, to name just a few examples. Data can be harvested in one or more ways. In some implementations, each device maintains a state table with various state information about the system. For example, as each device determines a change in the information, the device may update the data in the local state variable and then send the new data to the other devices in the system so that each device maintains a current view of the system.

In some implementations, contextualization can include collection of standardized data from one or more entities in the system 100 (e.g., ultimately from the tag 102 and/or the tags 104A-C), collection of disparate device data (e.g., data that is unexpected or otherwise does not conform to a data standard), and/or performance of system dictated actions (e.g., issuing a notification, modifying a behavior, redistributing one or more system resources). Contextualization can be related to or facilitated by the invocation of one or more rules 122 in the system 100. Solely as illustrative examples, the rule(s) 122 can define, with regard to the tag 102 and/or the tag(s) 104A-C, one or more locations where presence is permitted, required, or is not permitted; one or more objects or persons with which a certain proximity is permitted, required, or is not permitted, one or more characteristics of movement that is permitted, required, or is not permitted; and/or one or more concentrations that is permitted, required, or is not permitted. The rule(s) 122 can specify actions performable by the system 100 under specific circumstances (e.g., to generate a notification or to energize or de-energize a component). For example, the rules 122 are stored in a computer-readable medium.

Contextualization can be based on one or more aspects of environmental understanding. In some implementations, an environmental understanding can include information or input that can be processed (e.g., weather conditions, time-based information, information extracted from a calendar, location, presence and/or activity). For example, notification that one of the tags 104A-C is not currently present in the group represented by the tag 102 can be conditioned on some aspect of the weather information (e.g., whether precipitation is forecast).

The following are examples of contextualization, described for illustrative purposes only. A person who is a young millennial may travel light during a bus commute to work. The person may usually bring at least their phone, wallet, and keys. Under normal conditions during this commute, tags or other processing devices of this system, corresponding to the phone, wallet, and keys, should experience the same type of movement and stay together. If the person's keys were to fall out of their pocket on the bus, one or more actions may occur in the system, including, but not limited to, the following: Sense: The tag of the keys can sense occurrence of a significant change. For example, by way of accelerometer data. Understand: The tag of the keys can understand the event. In some implementations, the tag can gauge the severity of the impact to determine what response is appropriate. Interact: If the keys slid out of the person's pocket onto the bus seat, the tag of the keys can enter a more alert mode to make sure the person is still within its presence. Interact: If the keys are subject to a significant impact onto the bus floor, the tag of the keys can wait to see if another action is detected (e.g., if the keys are picked up). Interact: If the tag of the keys do not detect a motion of being picked up, the tag can push a notification to a processing device and/or another tag. For example, the tag of the keys can also change its level of alertness. Sense: If the person walks away from the keys on the bus, the keys in an elevated alert state can detect a change in the presence of the person and their items (e.g., an RSSI strength change as exemplified below), while no motion is detected on the keys. Understand: Because the keys are not moving, and the person's wallet and phone are moving away, the keys can interpret that as being left behind.

In some implementations, the tag of the keys can push a notification to the person's phone. If this catches the person's attention, they can pick up the keys before disembarking. The tag of the keys can sense wireless signals of the phone and wallet, as well as the movement of the keys. The tag can understand that the person's things are now together based on detecting a constant strength of wireless signals from the other belongings and detecting a similar motion. The tag can interact by lowering its alert state.

If the notification from the tag of the keys does not catch the person's attention before they disembark the bus, the tag no longer senses the person's presence or the presence of their other things. The tag can understand that is has lost connection with the person in a place that is not designated a safe zone. The tag may interact by changing its beaconing behavior. When the tag detects a new significant change the tag may call on the crowd for help. For example, when the bus parks in the yard for the night, the keys are no longer moving and the tag can beacon more frequently to call for help. As soon as a processing device of a crowd user picks up the beacon, the keys can understand that its call has been heard and slow its beaconing until another significant change is detected.

Meanwhile, the phone also does not sense the tag of the keys anymore. The phone can understand that the keys were not in an area designated a safe zone. For example, the phone logs the last seen location.

Some examples herein describe that a tag (e.g., a parent tag or child tag) independently is in charge of deciding when to beacon, such as randomly or at regular intervals, as a way to allow a system to detect and organize that tag. In other implementations, a tag beacons in response to detecting that another device (e.g., a tag, processing device, and/or IoT device) is nearby according to a proximity metric. This can allow the tag to improve its power management, in that transmissions are not made unless they are likely to be detected. The tag can be configured to allow one or more specific devices (e.g., a specific tag, processing device, or IoT device), or types of device (e.g., any tag, processing device, or IoT device), to wake up the tag. When the processor of the tag is suspended (e.g., in a sleep mode or other low-power mode), the wireless interface of the tag (e.g., a radio) can remain powered so as to detect a wireless wake-up signal. The tag can have a programming that causes it to beacon (e.g., randomly or regularly) when it is awake.

Contextualization can lead to a contextual understanding that can be the basis for performing (or deciding not to perform) one or more actions in the system 100. The contextual understanding can facilitate phrasing of, or formulation of responses to, queries along the lines of those exemplified above regarding tags. For example, such queries and/or responses can relate to: What is the primary directive of the physical object to which the tag is coupled? In such an example, the tag (when stationary) may contextualize its primary directive as reporting the presence or proximity of tags around it. In another example, the tag's primary directive may be to report whether movement is detected by the first tag or a secondary tag around it. In another example, the tag (if lost) may contextualize its primary directive as needing to communicate via a processing device its current location to the owner. In another example, the tag (when sufficiently powered or continuously charged, may contextualize its primary directive as responsible for greater processing and contextualization of the system: to shoulder the processing and power burden so that other tags will have a lesser burden. What is the tag's confidence level for accuracy? In such an example, a tag may choose to communicate or withhold communicating one of its directives or queries until more information is gathered from the environment, such as greater points of data to confirm accuracy of data. Is the tag/physical object safe? For example, the tag may sense the concentration of recognized tags or devices within its proximity to determine whether or not it is with the owner or authorized user, or whether it is still within presence of known entities. For example, if a tag no longer sees any recognized devices, it may contextualize this as being "lost" and change its behavior. Is the tag/physical object in a safe zone? For example, if a tag has the awareness of a familiar or safe location such as the owner or authorized user's home or office, the tag may choose to communicate at a lower interval frequency as to conserve power consumption over time. Is the tag/physical object in distress? For example, if the tag detects an absence of recognized devices nearby, or any combination of environmental activities is contextualized as unacceptable (increase in temperature, presence of unauthorized devices, change in acceptable weather, etc.) the tag may choose to communicate the relevant information to the relevant party. Is the physical object needed? Is the physical object where the system needs the physical object to be? For example, if there is an event that requires the presence of a certain physical device at a certain location or a certain time, the tag may choose to inform a relevant user of its current location to prepare ahead of the event. Who or what is the physical object with (e.g., taking into account proximity and/or duration)? Is the physical object with an object and/or person that the physical object needs to be with? For example, in a scenario where a physical object must be in an authorized location or with an authorized person, an alarm may sound if the object was removed from the presence of the authorized location or authorized user. Did the physical object change its location? For example: if a physical object is "lost", and the primary directive is to "be found", the tag may contextualize the action required as to report a new location every time there has been a detected movement or location change. However, in such an example, if the object has not moved or meaningfully moved, the object may not need to communicate location information as frequently to conserve its power consumption. Should the tag communicate anything? For example, in some scenarios, tags may be aware of a greater number of things, activities, or environmental conditions than what is meaningfully relevant to a user or the system. In this contextualization process, the tag is deciding what to do, when, and if an action is even needed.

Figure 2:
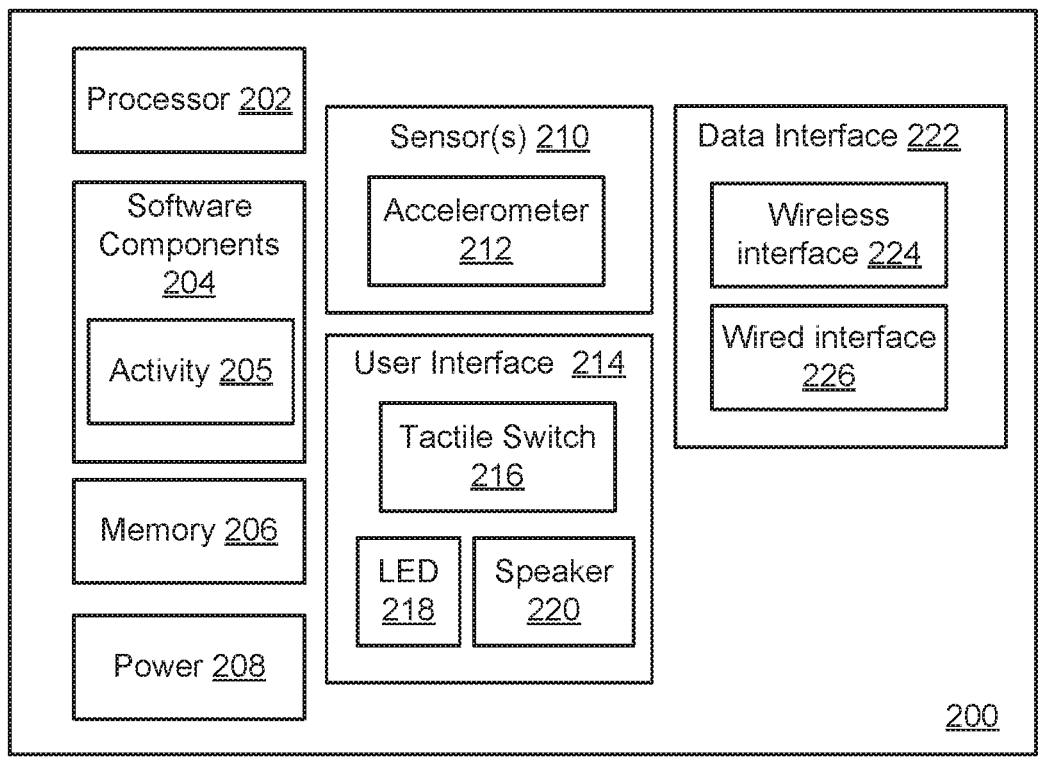
FIG. 2 shows a block diagram of an example of a tag.

FIG. 2 shows a block diagram of an example of a tag 200. The tag 200 can be implemented using one or more examples described with reference to FIG. 132. The tag 200 can be implemented substantially inside a housing that facilitates attachment of the tag 200 to, or otherwise coupling the tag 200 with, a physical object. For example, the housing can include one or more enclosures serving to contain at least some of the components of the tag 200 as a cohesive unit. The tag 102 and/or the tags 104A-C can be implemented using the tag 200. Solely as an example, and without limitation, such housing can have a thickness that is on the order of a few mm, and or a greatest width in any dimension that is on the order of tens of mm. For example, the housing can be an essentially circular disc. An identifier (e.g., a QR code) can be affixed to the housing to aid in identification and/or a setup process.

The tag 200 can be attached to, embedded within, or otherwise coupled to the physical object in one or more ways. For example, the tag 200 can be provided with an adhesive on the housing that couples to a surface on the physical object. As another example, the tag 200 can be provided with a holder that attaches to the tag 200, the holder having a loop (e.g., a keyring) for being coupled to the physical object.

The tag 200 can include at least one processor 202. The processor 202 can be semiconductor-based and can include at least one circuit that performs operations at least in part based on executing instructions. The processor 202 can be a general purpose processor or a special purpose processor.

The tag 200 can include one or more software components 204. The software components 204 can include software (e.g., firmware). In some implementations, the software components 204 includes an activity component 205 that can control one or more aspects of operation by the tag 200. For example, the activity component 205 can include some or all functionality described with reference to the activity management module 116 (FIG. 1) or the contextual engine 120. The software components 204 can be formulated using one or more programming languages that facilitate generation of instructions comprehensible to the processor 202.

The tag 200 can include at least one memory 206. The memory 206 can store information within the tag 200. The memory 206 can be implemented in the form of one or more discrete units. The memory 206 can include volatile memory, non-volatile memory, or combinations thereof.

The tag 200 can include a power supply 208. The power supply 208 can power some or all of the components of the tag 200 or other components not shown. In some implementations, the power supply 208 includes one or more electrochemical cells (e.g., a lithium-ion cell) capable of storing energy in chemical form and allowing consumption of that energy by way of conversion into electrical current. In some implementations, the power supply 208 includes a capacitor capable of storing energy in an electric field. The power supply 208 can be rechargeable (e.g., by external power from a voltage/current source, or from a solar cell) or non-rechargeable. For example, the power supply 208 can be recharged by electrically connecting a power source to physical pins that contact the power supply 208. As another example, the power supply 208 can be recharged wirelessly (e.g., by inductive charging). Kinetic energy harvesting and/or thermal energy harvesting may be used. In some implementations, a near-field communication (NFC) coil can also be used as a charging coil for inductive charging. For example, the power supply 208 can be recharged wirelessly in near proximity (e.g., by inductive coupled charging using internal dedicated coil or reusing an NFC coil for charging). As another example, the power supply 208 can be recharged wirelessly in far field (e.g., by electric field charging) or using energy harvesting techniques from multiple ambient sources, including kinetic or bio-mechanical sources (e.g., a piezo electric generator sensing vibration or thermo-electric generator (TEG) which harvests energy from temperature gradient). In some implementations, ambient backscatter energy may be used to power the tag directly (e.g., in lieu of using an electrochemical cell to store energy).

The tag 200 can include one or more sensors 210. The sensor(s) 210 can be configured to detect one or more characteristics of the environment or other surrounding to which the tag 200 is subjected. The sensor(s) 210 can detect one or more aspects including, but not limited to, moisture, humidity, temperature, pressure, altitude, acoustics, wind speed, strain, shear, magnetic field strength and/or orientation, electric field strength and/or orientation, electromagnetic radiation, particle radiation, compass point direction, or acceleration. Here, for example, the sensor 210 includes an accelerometer 212. For example, the accelerometer 212 may be used to detect if the tag 200 is in motion, and the processor 202 of the tag 200 may decide to change the behavior of the tag 200 based on the motion detected. For example, the beaconing pattern of the wireless interface 224 may be increased when the tag 200 is determined to be moving. Collection of data (e.g., one or more signals) from the sensor(s) 210 can be considered harvesting of information that can be the basis for deterministic behavior, predictive behavior, and/or adaptive behavior in the system in which the tag 200 is implemented.

The tag 200 may include one or more user interfaces 214. The user interface(s) 214 can facilitate one or more ways that a user can make input to the tag 200 and/or one or more ways that the tag 200 can make output to a user. In some implementations, the user interface 214 includes a tactile switch 216. For example, activating the tactile switch can open and close an electric circuit on the tag 200, thus providing input to the tag 200. In some implementations, the user interface 214 includes at least one light-emitting diode (LED) 218. The LED 218 can illuminate using one or more colors to signal a status of the tag 200 or of another tag, and/or to convey an instruction to the user. A red-blue-green LED can be used for the LED 218. In some implementations, the LED 218 can indicate power and/or pairing status during setup of the tag 200. In some implementations, the LED 218 can confirm the presence or absence of one or more child tags. In some implementations, the user interface 214 includes at least one speaker 220. The speaker 220 can emit one or more portions of audio to signal a status of the tag 200 or of another tag, and/or to convey an instruction to the user. For example, the speaker 220 can include an audio piezo buzzer.

The tag 200 may include at least one data interface 222. Here, the data interface 222 is shown as including a wireless interface 224 and a wired interface 226. The data interface 222 can facilitate communication between the tag 200 and at least one component in a system, such as during operation or a software update. For example, the data interface 222 can facilitate the wireless signal 110 (FIG. 1) between the tag 102 and the processing device 108. As another example, the data interface 222 can facilitate one or more of the wireless signals 106A-C between the tag 102 and the tags 104A-C. In some implementations, the data interface 222 can be configured for short-distance communications (e.g., in a personal-area or near-me network). In some implementations, the data interface 222 can be also or instead be configured for longer-distance communications (e.g., in a local-area or wide-area network). For example, and without limitation, the data interface 222 can operate in accordance with the principles of one or more of Bluetooth communication, Bluetooth Low Energy (BLE) communication, Zigbee communication, Wi-Fi communication, Long-Term Evolution (LTE) communication, NFC, Long Range (LoRa) communication, ultra wide band (UWB) communication, radio-frequency identification (RFID) communication, Ethernet, Ethernet over powerline, or Narrow-Band (NB).

The data interface 222 (e.g., the wired interface 226) can make use of physical pins on the tag 200. In some implementations, the physical pins at least partially extend beyond the hull of a housing that contains the tag 200 so that the physical pins can be contacted by another component. In some implementations, the physical pins relating to the data interface 222 can be grouped with physical pins relating to the power supply 208 (e.g., to be used in recharging). For example, the physical pins relating to the data interface 222 can be used to trigger the tag 200 to be ready to receive electrical input on the physical pins relating to the power supply 208.

The tag 200 can include at least one bus or other communication component that facilitates communication between two or more of the processor 202, software components 204, memory 206, sensor(s) 210, user interface 214, and/or data interface 222.

The tag 200 can be implemented as an intelligent device that can be used for personal tracking and organization. The tag 200 can be configured to communicate directly (or indirectly, such as via a network) with one or more instances of the tag 200, such as with a child tag when the tag 200 is considered a parent tag, or with a parent tag when the tag 200 is considered a child tag. The tag 200 can be configured for direct/indirect communication with a processing device (e.g., the processing device 108 in FIG. 1, a third-party IoT device, and/or a cloud server (e.g., the cloud 112 in FIG. 1). The tag 200 can be configured to generate and record state information. For example, the tag 200 can record events that relate to the tag 200 and/or to another tag. The tag 200 can represent a single object (e.g., the physical object to which the tag 200 is attached) or a group of objects (e.g., the physical objects to which respective child tags are attached when the tag 200 is considered a parent tag). The tag 200 can be configured to have one or more relationships with another instance of the tag 200, with a person (e.g., an owner or user), and/or with a location. For example, such relationships can be defined in the rules 122 (FIG. 1).

The tag 200 can be used to organize essentials (e.g., physical objects of significance) and for personal organization. The tag 200 can help a user quickly locate the physical object to which the tag 200 is attached. The tag 200 can serve as a parent tag for one or more child tags (e.g., instances of the tag 200) within a group solution, which can allow for tracking of the presence, proximity, and movement of other physical objects. The tag 200 can serve as a location marker. For example, this can be exploited by a location service designed to provide indications to the location of wireless-enabled devices.

Examples herein mention that a tag can serve as a child tag to another tag, which can be considered the parent tag. In some implementations, the child tag is implemented with all components of the tag 200, optionally with more components. In some implementations, the child tag can have fewer than all of the components of the tag 200. For example, the power supply 208 in the child tag may be non-rechargeable. As another example, the child tag may not have one or more of the sensor(s) 210 (e.g., the accelerometer 212 can be omitted). As another example, the LED 218 in the child tag can be a single-color LED (e.g., white). As another example, the child tag may not have the speaker 220. As another example, the child tag may not have the wired interface 226. For example, no physical data pins may be present on the housing of the child tag.

In operation, the child tag (e.g., including some or all of the components of the tag 200) can be used to organize a range of physical objects, including all everyday essentials that a person may have. The parent tag (e.g., including some or all of the components of the tag 200) can monitor the child tag(s) to which it is connected. As such, the parent tag can indicate the presence of a physical object to which the child tag is attached/coupled based on the child tag's proximity to the parent tag. For example, the parent tag can send a message indicating whether the child tag is within the range of the parent tag or not within the range of the parent tag.

Examples herein illustrate that a tag (e.g., the tag 200) can have an awareness of circumstances. Aspects of the awareness can be categorized as being either internal or external. An internal awareness may pertain to the physical object itself. In some implementations, the internal awareness can be further separated into preset state values and dynamic state values. Preset state values can include, but are not limited to, make, model, manufacturing date, unique identifier (UID), device info, object type, or manufacturer's suggested retail price (MSRP). Dynamic state values can include, but are not limited to, battery level, power consumption, market value, directive, beaconing rate, communications frequency, communications protocol, object relationship logic, owner identity, permissions, internal clock, motion, or orientation.

An external awareness can relate to factors externally related to the physical object. External factors can include, but are not limited to, relative location, geo location, time, sensor data, objects nearby, proximity, relative motion of objects nearby, or duration of any states.

Figure 3:
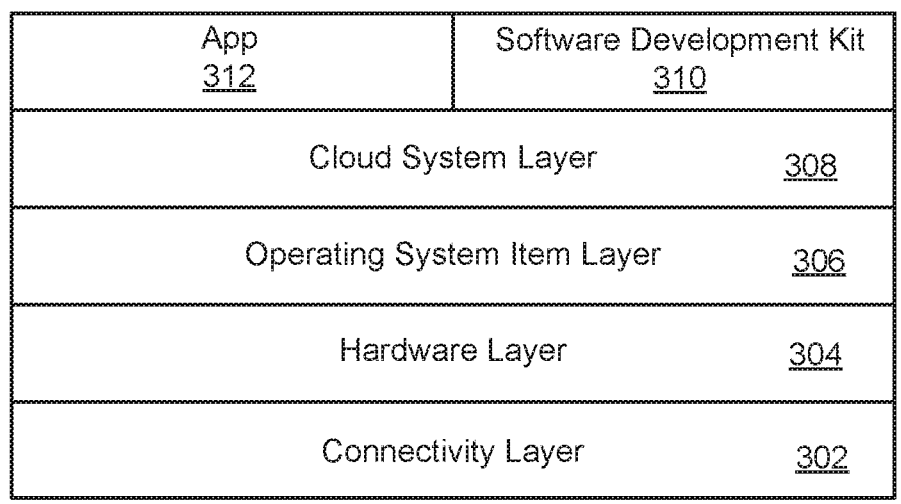
FIG. 3 shows an architecture of an example of a system that can track physical items.

FIG. 3 shows an architecture 300 of an example of a system that can track physical items. The architecture 300 can be used with one or more other examples described elsewhere herein. The architecture 300 can be used in a system implemented using one or more examples described with reference to FIG. 132.

The architecture 300 includes a connectivity layer 302. In some implementations, the connectivity layer 302 represents what type of connectivity exists or can be established between two or more components of a system. Without limitation, the connectivity layer 302 can represent tag-tag connectivity, parent-child tag connectivity, tag-processing device connectivity, or tag-cloud connectivity. For example, the connectivity layer 302 can correspond to short-range communication, long-range communication, mesh networking, and/or crowd-based communication. The connectivity represented by the connectivity layer 302 can be implemented based on one or more secure tokens.

The architecture 300 includes a hardware layer 304. In some implementations, the hardware layer 304 represents the hardware included in one or more components of the system. The hardware layer 304 can represent electronic components, semiconductor devices (e.g., a processor, radio, or sensor), mechanical components and the industrial design of the product. The hardware represented by the hardware layer 304 can be implemented using a hardware development kit and/or a chemistry development kit.

The architecture 300 includes an operating system item layer 306. In some implementations, the operating system item layer 306 provides item-level insight and represents the ability to monitor and record at least the presence, proximity and movement of physical objects labeled with respective tags and communicate those. The operating system item layer 306 can represent functionality of an operating system, connectivity components, harvesting of data (e.g., for determining presence, proximity, movement, concentration, and/or time), sensor data gathering, local processing, or operational modes. The functionality of the operating system item layer 306 can be developed using a functionality development kit.

The architecture 300 includes cloud system layer 308. In some implementations, the cloud system layer 308 represents the ability to apply system-level intelligence to harvested data. The cloud system layer 308 can represent contextualization of the data (e.g., by relying on relationships, permissions, groupings and/or hierarchies), and processing of that data as well as external data. The functionality of the cloud system layer 308 can be implemented based on one or more application programming interfaces (API) that will be used. The cloud system layer 308 can be implemented in at least one cloud server (e.g., the cloud 112 in FIG. 1) and/or in a processing device (e.g., the processing device 108 in FIG. 1).

The architecture 300 includes a software development kit 310 and an app 312. The software development kit 310 can facilitate development of applications (e.g., apps) that make use of system-level intelligence of the cloud system layer 308 and item-level insight of the operating system item layer 306. For example, the software development kit 310 is configured based on the APIs reflected in the cloud system layer 308. Here, the app 312 has been developed using the software development kit 310. The app 312 can be a consumer-oriented application or an enterprise-oriented application, to name just two examples. The app 312 can operate using consumer electronics equipment (e.g., a smartphone, tablet, or wearable device); operation of the app 312 can constitute one or more of software-as-a-service, platform-as-a-service, or data-as-a-service.

FIG. 4 shows an example of an organization module 400 and a rules repository 402. The organization module 400 and the rules repository 402 can be used with one or more other examples described elsewhere herein. The organization module 400 and the rules repository 402 can be implemented using one or more examples described with reference to FIG. 132. For example, the organization module 400 can be implemented by way of at least one processor executing instructions stored in a computer-readable medium. The rules in the rules repository 402 can relate to relationships including, but not limited to, permissions, groupings, and/or parent-child hierarchies.

The organization module 400 can be implemented in a device such as the tag 200 (FIG. 2), the tags 102 and/or 104A-C (FIG. 1), or in the processing device 108 (FIG. 1), to name just a few examples. Such device(s) can receive wireless signals from one or more items being monitored. For example, the tag 102 when serving as a parent tag can receive the wireless signals 106A-C from the tags 104A-C, respectively, serving as child tags. As another example, the processing device 108 can receive the wireless signal 110 from the tag 102.

The organization module 400 can use the received signal(s) to gain insight into at least the presence, proximity, or movement of the transmitting device, or of a device related to the transmitting device. In some implementations, received signal strength indication (RSSI) can be used as part of such a determination. The RSSI can indicate the power present in the received signal (e.g., the wireless signals 106A-C or the wireless signal 110). In some implementations, relative RSSI can be used. Generally speaking, when the transmitting device is closer to the receiving device, the RSSI tends to be greater because there is more power in the received signal. In some implementations, a first tag can determine, in its wireless module, an RSSI for a signal that the first tag receives from a second tag. The first tag can receive from the second tag a "received RSSI" value reflecting an RSSI determined by the second tag. The first and second tags can store the determined RSSI and the received RSSI value in state variables.

The organization module 400 can detect "activity" of a tag, processing device, and/or a third-party IoT device, in any of several senses, including, but not limited to, that the device is present in a system, that the device is proximate to something (e.g., another device, a tag, an object, or a user), and/or that the device is moving, and the organization module 400 can take action if appropriate. The organization module 400 can also or instead detect the "inactivity" of a device and take action if appropriate. As such, the organization module 400 may not merely detect, or respond to, a device's action.

In some implementations, activity can be detected or determined in one or more ways. For example, a tag can send a message when the tag senses (e.g., by an accelerometer) that it is moving. As another example, a first tag can detect that a second tag is moving because the RSSI is decreasing in a predictable manner. As another example, a first tag can detect that a second tag is moving because the RSSI is decreasing and a third tag reports increasing RSSI with the second tag.

In some implementations, time (e.g., duration) can be part of such a determination of activity. In some implementations, a transmitting device may include a timestamp or other time identifier in the transmitted message, and the receiving device can compare the timestamp/identifier with its (internal) clock to determine an amount of time that passed between the sending and the receipt of the wireless signal. For example, the clocks in the transmitting and receiving devices can be synchronized to a master clock, or the receiving device may know how to translate the transmitting device's timestamp into its local time. Internal processing delays (at the transmitting or receiving end) can be accounted for. As another example, the time can be measured from the moment of sending a request for a response until the response is received. The time is a measure of the latency experienced in communication between two devices (e.g., two tags, a parent tag and a child tag, and/or a tag and a processing device). A latency value can be defined based on the time it takes for a signal to reach the receiver. The latency value, moreover, can be used to characterize the distance between the transmitting and receiving devices, which gives an indication as to the relative position of the devices. In some implementations, time may be measured with round trip time (RTT) for estimating distance. For example: the sender sends a message, and based on the time it takes to receive a response, the sender can infer things about link quality and distance. RTT can be used to give information about packet loss, error rate, or number of hops (in the case of a mesh search).

In some implementations, connectivity can be part of such a determination. In some implementations, connectivity can represent whether a device (e.g., a parent tag) is able to communicate with another device (e.g., a child tag). For example, a connectivity parameter can be a binary factor dependent on whether communication is currently established between two devices.

The organization module 400 can use one or more of, or a combination of, at least RSSI and connectivity to measure at least presence, proximity and movement of any tag. In some implementations, the RSSI can be represented by a value RSSI and the connectivity parameter can be denoted by C. The organization module 400 can then operate based on a metric $$A(\text{RSSI}, C),$$

where A indicates an activity of at least one tag and reflects a measure of the distance, proximity, or movement between, say, a child tag and a parent tag. A can be expressed as depending on the RSSI, latency value, and connectivity as follows:

$$A = a_f f(\text{RSSI}) + a_g g(C),$$

where $f$ is a function depending on at least the RSSI, g is function depending on at least the connectivity value C, and $a_f$ and $a_g$ are coefficients or other modifying factors (e.g., dynamically scalable factors) for the functions $f$ and g, respectively.

The activity A can also or instead take into account one or more other characteristics. For example, latency can be taken into account (e.g., denoted by L). For example, packet error rate can be taken into account (e.g., denoted by PER). For example, packet loss can be taken into account (e.g., denoted by PL). For example, change in RSSI over time can be taken into account (e.g., denoted by ΔRSSI). For example, change in connectivity over time can be taken into account (e.g., denoted by ΔC). For example, change in latency over time can be taken into account (e.g., denoted by ΔL). For example, change in packet error rate over time can be taken into account (e.g., denoted by ΔPER). For example, change in packet loss over time can be taken into account (e.g., denoted by ΔPL). In some implementations, the activity A can be based on one or more of RSSI, C, L, PER, PL, ΔRSSI, ΔC, ΔL, ΔPER, or ΔPL.

There may be multiple ways of determining some or all of the parameters above (i.e., the RSSI, C, L, PER, PL, ΔRSSI, ΔC, ΔL, ΔPER, or ΔPL). For each parameter, one or more of such ways may be used. In some implementations, RSSI (or ΔRSSI) may be used by a processing device (e.g., the processing device 108 in FIG. 1) to determine presence, proximity, movement, and/or another measure regarding a tag (e.g., the tag 102 in FIG. 1). In some implementations, the processing device may calculate the RSSI (or ΔRSSI) based on the wireless signal(s) received from the tag, and use the calculated RSSI (or ΔRSSI) in its determination. However, in some processing devices (e.g., smartphones and some other electronic devices) such calculations may be relatively slow to perform, for example because the processing device may be designed to give higher priority to (e.g., assign more processing resources to) one or more other functionalities. As such, the RSSI (or ΔRSSI) calculated by the processing device may be more akin to a running average over a period of time (or a coarse estimate) than an up-to-date value reflecting present circumstances. In some implementations, the processing device may instead or also rely on a value determined by the tag. For example, the tag may be calculating a value for the RSSI (or ΔRSSI) of the signal(s) the tag receives from the processing device, and the tag may send message(s) including the calculated value(s) to the processing device. The processing device may use the value of RSSI (or ΔRSSI) received from the tag in lieu of (or in combination with) calculating its own value(s) for the RSSI (or ΔRSSI). For example, this may provide the processing device with a more up-to-date value of RSSI (or ΔRSSI) that improves the determination of presence, proximity, movement, and/or another measure regarding the tag.

As such, a proximity metric for the distance between devices (e.g., two tags, a parent tag and a child tag, and/or a tag and a processing device) can be defined based on at least one of the RSSI, the latency value, the connectivity parameter, and/or changes in one or more of such characteristics, for example as shown for A above. This can be considered a proximity measure that the organization module 400 can use in determining the presence, proximity, and movement of one or more tags. The proximity measure takes into account at least one of RSSI, C, L, PER, PL, ΔRSSI, ΔC, ΔL, ΔPER, or ΔPL, and can optionally take into account also one or more other parameters. The organization module 400 can include an activity (ACT) component 404 that can be responsible for determining and providing a proximity measure (e.g., based on A above). In some implementations, the activity component 205 (FIG. 2) can include one or more aspects of functionality described with reference to the activity component 404.

The organization module 400 can include one or more components that facilitate use of a proximity measure in determining, and reacting to, the activity of one or more tags. In some implementations, the organization module 400 includes a presence component 406 coupled to the activity component 404. For example, the presence component 406 can make use of the proximity measure of the activity component 404 to determine the presence of a tag (e.g., whether the tag 104A (FIG. 1) serving as a child tag is present relative to the tag 102 serving as a parent tag for the tag 104A). As another example, a tag can be deemed present if it is detected by the system, whether the tag is proximate to another tag (e.g., its parent tag) or not. The determination of whether a tag is present can depend on the rules in the rules repository 402, and as such can be different for different physical objects. For example, a wallet labeled with a tag can be deemed present if it is detected as being inside the dwelling of the person who owns the wallet; a wheelbarrow, on the other hand, can be deemed to be present if it is detected by either the system monitoring the owner's house or the corresponding system at the neighbor's house, in that the neighbor may be permitted to borrow the wheelbarrow from the owner's yard.

In some implementations, the organization module 400 includes a proximity component 408 coupled to the activity component 404. For example, the proximity component 408 can make use of the proximity measure of the activity component 404 to determine the proximity of a tag (e.g., how proximate the tag 104A (FIG. 1) serving as a child tag is relative to the tag 102 serving as a parent tag for the tag 104A).

In some implementations, the organization module 400 includes a movement component 410 coupled to the activity component 404. For example, the movement component 410 can make use of the proximity measure of the activity component 404 to determine the movement of a tag (e.g., how the tag 104A (FIG. 1) serving as a child tag moves relative to the tag 102 serving as a parent tag for the tag 104A).

In some implementations, the organization module 400 includes a time component 412 coupled to the activity component 404. For example, the time component 412 can make use of the proximity measure of the activity component 404 to determine a duration relating to a tag (e.g., how long the tag 104A (FIG. 1) serving as a child tag is present, proximate, and/or moving relative to the tag 102 serving as a parent tag for the tag 104A). As another example, a time as in the time of day at a particular location, can be a factor in applying a rule based on contextualized information.

In some implementations, the organization module 400 includes a concentration component 414 coupled to the activity component 404. For example, the concentration component 414 can make use of the activity of the activity component 404 to determine a concentration of at least one tag (e.g., some or all of the tags 104A-C (FIG. 1) serving as child tags relative to the tag 102 serving as a parent tag for the tags 104A-C). For example, a concentration can be used to provide multi-factor authentication of a user. As another example, a concentration can be used to generate a heat map of a location (e.g., to aid a determination of what type of environment it is).

The activity component 404 can factor in a temporal component in the determination of a proximity measure. In some implementations, one of the rules in the rules repository 402 can define that an alert should be generated if one of the tags 104A-C (FIG. 1) is not present in the group represented by the tag 102. However, if for example, the tag 104A had been detected as present within the group over an extended period of time and was not detected as undergoing (significant) movement at the time its signal was lost, the activity component 404 can apply a grace period (e.g., on the order of a few or multiple seconds) before generating the alert. For example, this temporal component (e.g., a grace period) can account for the situation where the signal 106A (FIG. 1) from the tag 104A was temporarily blocked and the absence of the signal 106A did not correspond to the tag 104A being missing from the group represented by the tag 102. Also, or instead, another component in the organization module 400 can apply the temporal component to a corresponding determination.

The organization module 400 can take into account contextualized information in determining the activity (e.g., presence, proximity, and/or movement) of any tag, in performing one or more actions in response thereto, or in deciding not to take action. In some implementations, the contextual engine 120 (FIG. 1) or a similar component can serve to contextualize harvested information so that the rules in the rules repository 402 can be applied appropriately.

The tags (e.g., the tag 102 and/or the tags 104A-C in FIG. 1) can be proxies for other devices, users, and/or locations. The rules in the rules repository 402 can reflect such an organization. In some implementations, a rule 416 can reflect one or more of a device 418, a user 420, or a location 422. Moreover, the rule 416 can involve a device-user relationship 424, a user-location relationship 426, and/or a device-location relationship 428. As such, any of a number of relationships can be taken into account when applying the rule(s) in the rules repository 402, and can be reflected in the particular action (or a non-action) taken in response.

The following are examples of information that can be contextualized (e.g., by the contextual engine 120 in FIG. 1) and how the contextual information can be taken into account in applying a rule. Example 1: If the system determines that the weather information includes a forecast of rain, then a processing device (e.g., the user's smartphone or tablet) can issue an alert that the user should not leave the current premises without an umbrella. In some implementations, the system can use the tag coupled to the umbrella (e.g., the tags 102 and/or 104A-C in FIG. 1) to report a current location of the umbrella to the user. For example, the tag coupled to the umbrella can make a predefined output (e.g., a red LED signal, create or play an audio output, etc.).

Example 2: If the system determines, by way of a tag that has been applied to the owner's bicycle, that the bicycle is moving and the current time is 3 a.m. (e.g., a time not conformant with any previously observed use of the bicycle), the system can issue an alert to the user. For example, lights in the storage location (e.g., garage) can be turned on, and/or an alarm can be activated.

Example 3: If the system determines, by way of a tag that has been applied to the owner's dog, that the dog is leaving a predetermined geofence area (e.g., the owner's yard), the system can issue an alert to the user. However, as an intelligent group of tags, if the system also determines, by way of a tag that has been applied to the dog's leash, that the leash is leaving the predetermined geofence area together with the dog, then the system can inhibit alert (e.g., take no action, as it can be inferred that the dog is not escaping but rather is being taken for a walk).

Example 4: If the system determines, from calendar information, that the user is about to embark on a trip, then the system can specify to the user a number of tagged items (e.g., six specific items) that the user brought the last time the user traveled to this location. For example, the tag applied to the respective item can make a predefined output (e.g., a red LED signal).

Example 5: If the system determines, from presence of tags which all belong to some relational group, that the tags are entering or exiting a vicinity (e.g., a user returns home with a processing device, a tag applied to their wallet, a tag applied to their keys, a tag applied to their workbag), a specific activity is occurring (e.g., the user is returning home), a corresponding action can be taken (e.g., the system may ask all tags applied to physical objects within the home to beacon more frequently because the user has returned home).

As such, the contextual engine 120 in FIG. 1 is an example of a contextual engine implemented using a processor (e.g., the processing device 13202 in FIG. 132) executing instructions stored in a memory (e.g., the memory 13204 in FIG. 132), the contextual engine configured to identify an action relating to at least one tag of a plurality of tags (e.g., two or more of the tags 102 and/or 104A-C) based on a proximity measure (e.g., determined by the activity component 404) for the corresponding tag.

The rules 122 in FIG. 1 can be stored in a rules repository accessible to a contextual engine (e.g., to the at least one processor of the contextual engine 120 in FIG. 1), the rules repository having stored therein rules (e.g., the rule 416) regarding respective actions performable by the activity component (e.g., by the at least one processor of the organization module 400), the rules depending on the activity measure (e.g., determined by the activity component 404) for the at least one of the first plurality of tags, the action identified using the rules.

A user interface can be provided on one or more devices. In some implementations, a graphical user interface can be provided on a processing device (e.g., the processing device 108 in FIG. 1), and/or a tag can provide for input and/or output (e.g., by way of the user interface 214 in FIG. 2). The user interface can be based on, and reflect, one or more status of a tag (e.g., the tags 102 and/or 104A-C in FIG. 1). In some implementations, a tag can have a status of connected, out of range, or marked as lost. For example, in the connected state, the user interface can provide a control for the user to initiate a locate function for the item.

In the out of range state, the user interface can provide a control for identifying the location where the system most recently detected the tag. As another example, the user interface can provide a control for marking the tag as lost.

In the marked as lost state, the user interface can provide a control for identifying the location where the system most recently detected the tag. As another example, the user interface can provide a control for launching a crowd-location function for the tag. As another example, the user interface can provide a control for marking the tag as found.

The user interface can provide one or more other functionalities relating to a tag (e.g., a parent tag or a child tag). Such functionality can include, but is not limited to, adding a tag; defining or editing a group of tags; defining or editing a rule relating to one or more tags; viewing and/or editing details of a tag or a group of tags; re-calibrating a tag with regard to a processing device or to at least one other tag; replacing a tag; deleting a tag; alerting that a tag battery needs recharging; alerting that a non-rechargeable battery is running out of power; performing an update (e.g., of software or firmware); prioritizing among tags; and combinations thereof.

FIG. 5 shows an example of a record 500 that can be generated to track presence, proximity, and movement of physical items. The record 500 can be used with other examples described elsewhere herein. The record 500 can be generated by a device that monitors or otherwise tracks activities relating to one or more other devices, and can be persisted in a computer-readable storage medium. For example, the processing device 108 (FIG. 1) and/or at least one of the tags 102 or 104A-C can generate the record 500. For example, the record 500 can be stored in the memory 206 (FIG. 2) and/or in the memory 13204 (FIG. 132). Only a portion of the record 500 is here shown for simplicity.

The record 500 can include an identifier 502 for one or more tags. Here, the tags are labeled T1, T2, and T3, respectively, using the identifier 502. For example, the record 500 can be generated by a parent tag and the tags T1-T3 can be child tags of the parent tag.

The record 500 can include one or more information portions for each tag relating to at least the presence, proximity, or movement of that tag. Here, an RSSI measure 504 is included in the record 500. For example, a value 506 for the RSSI measure 504 can reflect a received signal strength indication for the tag T1. Here, a time measure 508 is included in the record 500. For example, a value 510 for the time measure 508 can reflect a time delay (e.g., a latency value) associated with the tag T1. Here, an error rate measure 512 is included in the record 500. For example, a value 514 for the error rate measure 512 can reflect the error rate for communications to or from the tag T1. In some implementations, a packet loss measure can be used instead of, or in combination with, the error rate measure 512. Here, a connectivity parameter 516 is included in the record 500. For example, a value 518 for the connectivity parameter 516 can reflect whether a connection with the tag T1 exists. Here, a confidence level parameter 520 is included in the record 500. For example, a value 522 for the confidence level parameter 520 can reflect a determined level of confidence that the tag T1 is currently within its defined group. Other measures or parameters not shown can be included in the record 500.

FIG. 6 schematically shows a layout 600 of a building in which a system can track physical items. The examples described with reference to the layout 600 can be used with other examples described elsewhere herein. The layout 600 shows a top view of a floorplan that includes a kitchen/living room area 602, a balcony 603, bedrooms 604, 606, and 608, and an office 610. Tags within the layout 600 may here be shown with an enlarged size for clarity. A system for organizing and responding to activity can be managed by a processing device 612 (e.g., a user's smartphone or a dedicated standalone device). The processing device 612 can operate in conjunction with one or more computer devices, including, but not limited to with a computer 614 in the office 610, and/or with the cloud 112 (FIG. 1).

A tag 616 (e.g., the tag 102 and/or one of the tags 104A-C in FIG. 1) has been applied to a physical object 618. The physical object 618 can have any shape or size, and is here schematically illustrated as a rectangular object. In some implementations, the processing device 612 determines (e.g., based on an activity measure for the tag 616) that the tag 616 is in (or in the vicinity of) the bedroom 604. For example, the processing device 612 can register the tag 616 as being present based on such a determination.

A tag 620 (e.g., the tag 102 and/or one of the tags 104A-C in FIG. 1) has been applied to a physical object 622. The physical object 618 can have any shape or size, and is here schematically illustrated as a triangular object. In some implementations, the processing device 612 determines (e.g., based on an activity measure for the tag 620) that the tag 620 is undergoing movement 624 within (or in the vicinity of) the bedroom 606. For example, the processing device 612 can register movement of the tag 620 based on such a determination.

A tag 626 (e.g., the tag 102 and/or one of the tags 104A-C in FIG. 1) has been applied to a physical object 628 (here schematically illustrated as a triangular object), and a tag 630 (e.g., the tag 102 and/or one of the tags 104A-C in FIG.

1) has been applied to a physical object 632 (here schematically illustrated as a rectangular object). In some implementations, the processing device 612 determines (e.g., based on activity measures for the tags 626 and 630) that the tag 626 is proximate—as indicated by arrow 634—the tag 630 within (or in the vicinity of) the bedroom 608. For example, the processing device 612 can register proximity of the tag 626 and/or the tag 630 based on such a determination.

One or more devices can be taken into account in determining a location or an approximate location. In some implementations, any of the tags 616, 620, 626, or 630 can register a signal strength (e.g., in the form of an activity measure) with regard to another of the tags 616, 620, 626, or 630, with regard to the computer 614, and/or with regard to a third-party IoT device. Information reflecting at least one of RSSI, C, L, PER, PL, ΔRSSI, ΔC, ΔL, ΔPER, or ΔPL can be recorded as state information, for example in a table at each device. State information may periodically be evented so that all devices can see each device's measurements, for example as described below. Such information can provide an indication of a distance between the tag and such other device, and can be used in combination with an activity measure that pertains to a separation between the tag and the processing device 612 to determine the location of the tag with increased granularity.

The above-described systems are examples of a system that includes first tags (e.g., the tag 102 and-or the tags 104A-C in FIG. 1) configured to organize activities regarding respective physical objects (e.g., the physical objects 406A-D in FIG. 4), each of the first tags including (e.g., as shown in FIG. 2) at least a first processor, a first memory, a sensor, an input device, an output device, a wireless communication component, and a first activity component (e.g., the activity component 404 in FIG. 4) operated using the first processor and the first memory to adapt a behavior of the respective first tag (e.g., for power management). The system includes a processing device (e.g., the processing device 108 in FIG. 1) configured to receive first wireless signals (e.g., the signals 110) from at least some of the first tags, the processing device including (e.g., as shown in FIG. 132) a second processor, a second memory, and a second activity component (e.g., the activity component 404 in FIG. 4) operated using the second processor and the second memory to determine at least presence, proximity, and movement of the first tags based on the first wireless signals.

Figures 7, 8, 9:
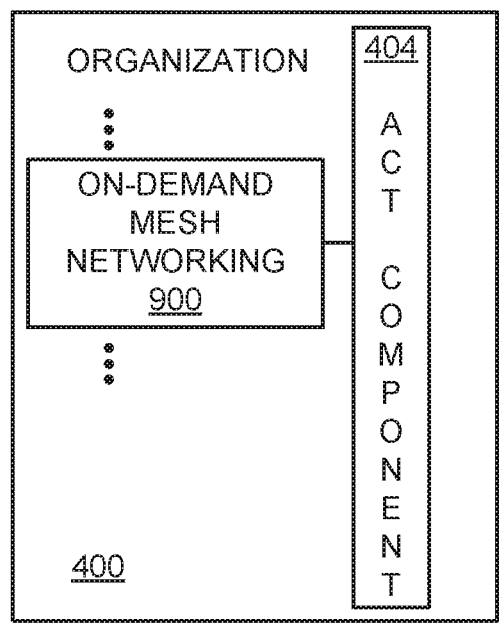
FIG. 7 shows an example of a record that can be generated to track presence, proximity, and movement of physical items.
FIG. 8 shows an example of a record that can be generated to track presence, proximity, and movement of physical items.
FIG. 9 shows an example of the activity component of FIG. 4 with an on-demand mesh networking component.

FIG. 7 shows an example of a record 700 that can be generated to track presence, proximity, and movement of physical items. The record 700 can be used with other examples described elsewhere herein. The record 700 can be generated by a device that monitors or otherwise tracks activities relating to one or more other devices, and can be persisted in a computer-readable storage medium. For example, the processing device 108 (FIG. 1) and/or at least one of the tags 102 or 104A-C can generate the record 700. Only a portion of the record 700 is here shown for simplicity.

The record 700 can include an identifier 702 for one or more tags. For example, a value 704 for the identifier 702 can identify any of the tags 102 or 104A-C in FIG. 1. The record 700 can include an event parameter 706. For example, a value 708 for the event parameter 706 can correspond to an event involving one or more of the tags 102 or 104A-C in FIG. 1, or the processing device 108. The record 700 can include a time parameter 710 for one or more tags. For example, a value 712 for the time parameter 710 can specify a time that the event was detected. The record 700 can include a location parameter 714 for one or more tags. For example, a value 716 for the location parameter 714 can specify a location at which the event is deemed to have taken place. Other measures or parameters not shown can be included in the record 700.

FIG. 8 shows an example of a record 800 that can be generated to track presence, proximity, and movement of physical items. The record 800 can be used with other examples described elsewhere herein. The record 800 can be generated by a device that monitors or otherwise tracks activities relating to one or more other devices, and can be persisted in a computer-readable storage medium. For example, the processing device 108 (FIG. 1) and/or at least one of the tags 102 or 104A-C can generate the record 800. Only a portion of the record 800 is here shown for simplicity.

The record 800 can include an identifier 802 for one or more tags, and another identifier 804 for one or more tags. Here, the tags are labeled T1, T2, and T3, respectively, using the identifiers 802 and 804. In some implementations, the record 800 can reflect presence and/or proximity relating to respective pairs of tags corresponding to the identifiers 802 and 804. For example, a value 806 can reflect a determined confidence level that the tags T2 and T1 are within a particular proximity of each other. The value 806 can be determined by at least one of the tags T2 or T1, or by another device (e.g., a processing device). As another example, a value 808 can reflect a determined confidence level that the tags T1 and T3 are within a particular proximity of each other. The value 808 can be determined by at least one of the tags T1 or T3, or by another device (e.g., a processing device). As such, a memory of a tag (e.g., the memory 206 of the tag 200 in FIG. 2) can have stored therein a record (e.g., the record 800) reflecting confidence levels (e.g., the value 806 and/or 808) relating to respective ones of a plurality of tags (e.g., the tags T1, T2, and T3), the confidence levels based on the activity measure (e.g., determined by the activity component 404 in FIG. 4) for the corresponding one of the plurality of tags.

The records 500 (FIG. 5), 700 (FIG. 7), and/or 800 (FIG. 8) are examples of up-to-date records that relate to the presence, proximity, or movement of one or more tags. In some implementations, the record(s) can be created and kept by at least one entity in a system, and used for, or forwarded to another device for use in, developing and maintaining a contextual awareness of one or more circumstances relating to physical objects tracked by the system. For example, the processing device 108 (FIG. 1) can read such record(s) and take one or more corresponding actions. The entity can create the record based on information it receives from at least one tag or processing device, and/or based on inputs from one or more sensors of the entity.

FIG. 9 shows an example of the activity component 404 of FIG. 4 with an on-demand mesh networking component 900. The on-demand mesh networking component 900 can be used with one or more other examples described elsewhere herein. The on-demand mesh networking component 900 can be implemented using one or more examples described with reference to FIG. 132. For example, the on-demand mesh networking component 900 can be implemented by way of at least one processor executing instructions stored in a computer-readable medium.

The on-demand mesh networking component 900 can be used to selectively invoke mesh networking to aid in the location of one or more tags (e.g., the tags 102 or 104A-C in FIG. 1) or a processing device (e.g., a user's smartphone or other portable electronic device). For example, the mesh networking can be invoked (automatically or in response to user input) following a determination that the device (e.g., tag or processing device) is not present (e.g., is not detected by another device). The mesh networking can be terminated based upon a successful result (e.g., the device is located) or the expiration of a predefined time period.

Figure 10:
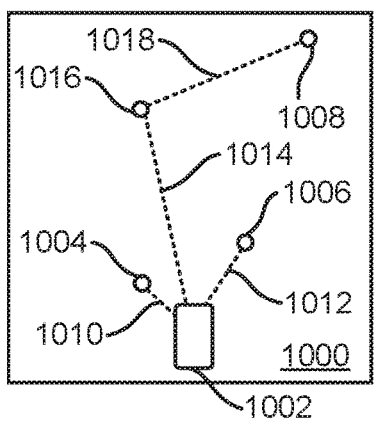
FIG. 10 schematically shows an example of performing on-demand mesh networking.

FIG. 10 schematically shows an example of performing on-demand mesh networking. The examples described with reference to FIG. 10 can be used with one or more other examples described elsewhere herein. This example involves a physical space 1000 where a processing device 1002 is currently present. One or more tags can be associated with the processing device 1002 for purposes of tracking and acting on at least their presence, proximity, or movement. Here, at least tag 1004, tag 1006, and tag 1008 have been associated with the processing device 1002. The processing device 1002 can monitor the tags 1004, 1006, and 1008 by establishing respective wireless communication with each of them, and then track their activities and perform corresponding actions accordingly. Here, a connection 1010 currently exists between the tag 1004 and the processing device 1002, and a connection 1012 currently exists between the tag 1006 and the processing device 1002. The processing device 1002 can register the tags 1004 and 1006 as being present based on the respective connections 1010 and 1012.

However, no connection presently exists between the processing device 1002 and the tag 1008. For example, this can be because the present distance between the tag 1008 and the processing device 1002 is too great for a type of wireless communication, and/or because an object is located between the tag 1008 and the processing device 1002 that interferes with or prevents wireless communication between the tag 1008 and the processing device 1002. The processing device 1002 can recognize the circumstance that no connection exists and act accordingly. For example, the processing device 1002 can assign the tag 1008 a status of being lost.

The processing device 1002 (or another device or component) can initiate mesh networking. In some implementations, this can be done on demand (e.g., such that the system and/or a user invokes the functionality). For example, mesh networking can be invoked by the on-demand mesh networking component 900 (FIG. 9). As part of the mesh networking, the processing device 1002 can make use of a connection 1014 with a device 1016. The device 1016 can be a tag or another wireless device (e.g., a smartphone or an IoT device). In some implementations, the device 1016 can be a tag that like the tags 1004, 1006, and 1008 has been associated with the processing device 1002. For example, the tags 1004, 1006, and 1008, and the device 1016, may have been defined as a group represented by the processing device 1002. In some implementations, the device 1016 can be a tag that has not been associated with the processing device 1002 (e.g., the device 1016 is not part of any group represented by the processing device 1002). This can be characterized as the device 1016 being an "unpaired tag" with regard to the processing device 1002 (although the device 1016 may have been paired with another processing device that is not shown here for simplicity). In situations where the device 1016 has not previously been associated with the processing device 1002 (e.g., the device 1016 is an unpaired tag or is another wireless device such as a smartphone or an IoT device, the processing device 1002 can establish the connection 1014 by way of categorizing the message as a mesh networking request, and this may prompt the device 1016 to recognize and react to the message despite that no previous connection may have been established between the processing device 1002 and the device 1016.

The connection 1014 allows the processing device 1002 to request the device 1016 to participate in mesh networking. For example, such a request can include at least an identifier for the tag 1008 and an identifier for the processing device 1002. Assuming the device 1016 is triggered to act by the request, the device 1016 can evaluate whether any connection 1018 has been established that is related to the identifier for the tag 1008 that was contained in the request. For example, the connection 1018 can be established by way of the device 1016 receiving a beacon signal from the tag 1008, a beacon signal that for some reason is not presently received by the processing device 1002. If the device 1016 recognizes that the identifier contained in the beacon signal received by way of the connection 1018 matches the identifier included in the request for mesh networking, then the device 1016 can send a response to the processing device 1002. For example, the response can indicate that the identifier of the tag 1008 has been detected and can include a location of the device 1016. As another example, the response can indicate the location of the tag 1008 to the extent such information is available to, or determinable by, the device 1016.

Figure 11:
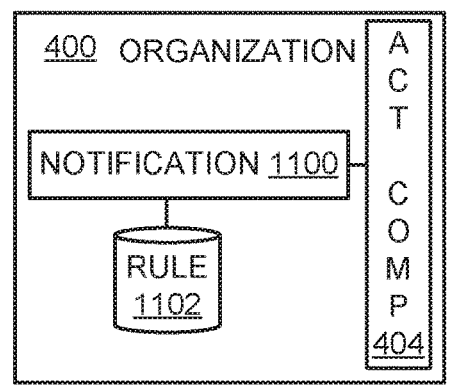
FIG. 11 shows an example of the activity component of FIG. 4 with a notification component.

FIG. 11 shows an example of the RTC component of FIG. 4 with a notification component 1100. The notification component 1100 can be used with one or more other examples described elsewhere herein. The notification component 1100 can be implemented using one or more examples described with reference to FIG. 132. For example, the notification component 1100 can be implemented by way of at least one processor executing instructions stored in a computer-readable medium.

The notification component 1100 can make use of one or more rules 1102 to generate at least one notification based on an activity measure determined by the activity component 404. For example, the rule(s) 1102 can be applied to contextualized information. The notification(s) can be issued audibly (e.g., by the speaker 220 in FIG. 2 or a speaker of the processing device 108 in FIG. 1), visually (e.g., on a screen of the user interface 214 in FIG. 2 or of the processing device 108 in FIG. 1), by haptic output (e.g., by the user interface 214 in FIG. 2 or by a component for tactile feedback of the processing device 108 in FIG. 1), and or by sending at least one signal (e.g., a wired or wireless signal alerting and/or triggering another device).

With regard to the Examples 1-4 mentioned above with regard to FIG. 4, the notification component 1100 can make corresponding notifications to alert a user in one or more ways. In Example 1, the notification component 1100 can present "Remember your umbrella" on a display device and/or illuminate an LED on the corresponding tag. In Example 2, the notification component 1100 can present "Your bicycle is being moved" on a display device, turn on (garage) lights, and/or activate an alarm. In Example 3, the notification component 1100 can present "[dog name] is leaving the yard" on a display device. In Example 4, the notification component 1100 can present "Remember to bring [six items]" on a display device and/or illuminate an LED on the corresponding tags of the respective physical objects.

Figure 12:
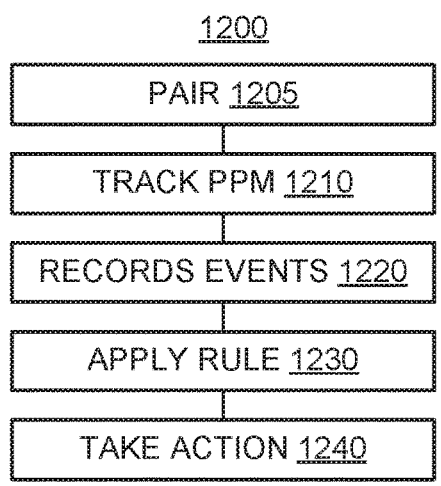
FIG. 12 shows an example of a method that can be performed to track presence, proximity, and movement of physical items.

FIG. 12 shows an example of a method 1200 that can be performed to track presence, proximity, and movement of physical items. The method 1200 can be used with one or more other examples described elsewhere herein. The method 1200 can be performed using one or more examples described with reference to FIG. 132. For example, the method 1200 can be performed by way of at least one processor executing instructions stored in a computer-readable medium. More or fewer operations than shown can be performed. Two or more operations can be performed in another order unless otherwise indicated.

At 1205, a tag can be paired with at least another device. In some implementations, any of the tags 104A-C (FIG. 1) can be paired with the tag 102. For example, this can establish the one of the tags 104A-C as a child tag of the tag 102. In some implementations, the tag 102 (FIG. 1) can be paired with the processing device 108. In some implementations, any of the tags 104A-C (FIG. 1) can be paired with the processing device 108. The pairing can be triggered by way of input on the tag and/or on another device, and through at least one wireless signal. For example, the user can authorize wireless communication by the processing device, and can press a button on the tag to cause the tag to send a pairing signal to the processing device. To pair a child tag with a parent tag that has been paired with the processing device, the user can define (e.g., name) the child tag in the processing device, and press a button on the tag to cause the tag to send a pairing signal to the processing device, and optionally a signal to establish a connection with the processing device, which connection can be used for software/firmware updates, to name just one example.

At 1210, at least presence, proximity, and movement (PPM) can be tracked. In some implementations, the activity component 404 (FIG. 4) of the organization module 400 can perform tracking. The tracking can be based on beacon signals sent by one or more tags. For example, the tracking can be done by a processing device (e.g., the processing device 108 in FIG. 1).

At 1220, events can be recorded. In some implementations, the organization module 400 (FIG. 4) can record events based on an activity measure from the activity component 404. For example, one or more events can be recorded in the record 700 in FIG. 7.

At 1230, at least one rule can be applied. In some implementations, the organization module 400 (FIG. 4) can apply the rule 416 to information contextualized by the contextual engine 120 (FIG. 1). The rule 416 may have been defined by a user (e.g., through the user interface 214 in FIG. 2 or using a screen presented by the organization module 400. The rule 416 may have been defined by way of artificial intelligence, machine learning, a predictive process, or an adaptive algorithm that takes into account previously observed or otherwise detected behavior.

At 1240, at least one action can be taken based on applying the rule. In some implementations, the organization module 400 (FIG. 4) can perform one or more operations designed to address or otherwise notify the user about a situation. For example, the notification component 1100 in FIG. 11 can be used.

Figure 13:
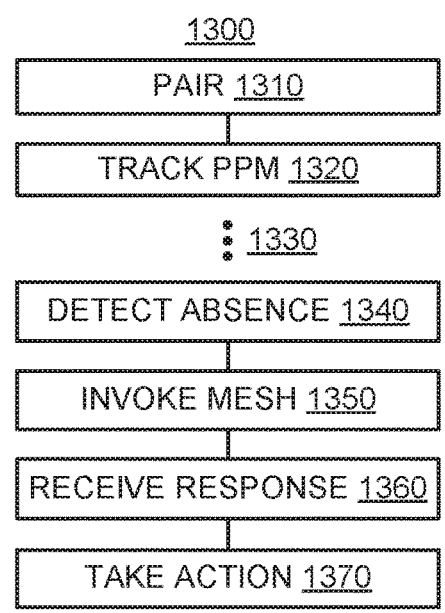
FIG. 13 shows an example of a method that can be performed for on-demand mesh networking.

FIG. 13 shows an example of a method that can be performed for on-demand mesh networking. The method 1300 can be used with one or more other examples described elsewhere herein. The method 1300 can be performed using one or more examples described with reference to FIG. 132. For example, the method 1300 can be performed by way of at least one processor executing instructions stored in a computer-readable medium. More or fewer operations than shown can be performed. Two or more operations can be performed in another order unless otherwise indicated.

At 1310, a tag can be paired with at least another device. In some implementations, the pairing can be done substantially as exemplified with regard to the method 1200 in FIG. 12.

At 1320, at least presence, proximity, and movement (PPM) can be tracked. In some implementations, the tracking can be done substantially as exemplified with regard to the method 1200 in FIG. 12.

The tracking at 1320 can be performed continuously, at regular intervals, or randomly, over a shorter or longer period of time, as schematically indicated at 1330.

At 1340, absence of a tag can be detected. In some implementations, the organization module 400 (FIG. 4) can detect the absence of a tag based on an activity measure from the activity component 404 regarding that tag. For example, absence of a tag can be detected based on not receiving a wireless signal from the tag (e.g., none of the received wireless signals originates with the tag, which can then be deemed absent).

At 1350, mesh networking can be invoked. In some implementations, this can be done on demand, so as to address the detected absence of at least one tag. This can involve sending a mesh networking request to one or more devices. For example, the on-demand mesh networking component 900 in FIG. 9 can be used.

At 1360, a response relating to the mesh networking can be received. In some implementations, the organization module 400 in FIG. 4 can be notified that the device (e.g., an unpaired tag, another wireless device, or an IoT device) has detected the tag.

At 1370, at least one action can be performed in response to receiving the response. For example, a user can be notified. As another example, a message can be provided to the device that responded at 1360, the message to be forwarded by the device to the absent tag (e.g., such a message can instruct the tag to change its behavior in one or more ways).

Figure 14:
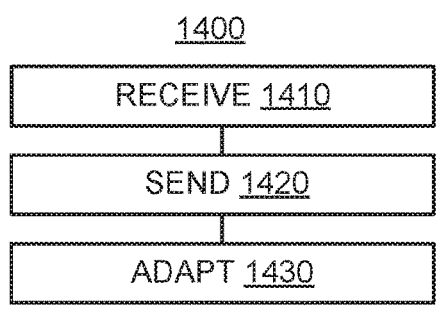
FIG. 14 shows an example of a method that can be performed by a tag.

FIG. 14 shows an example of a method 1400 that can be performed by a tag. The method 1400 can be used with one or more other examples described elsewhere herein. The method 1400 can be performed using one or more examples described with reference to FIG. 132. In some implementations, the method 1400 can be performed by way of at least one processor executing instructions stored in a computer-readable medium. For example, the activity component 205 (FIG. 2) or the activity component 404 (FIG. 4) can perform the method 1400. More or fewer operations than shown can be performed. Two or more operations can be performed in another order unless otherwise indicated.

At 1410, first wireless signal(s) from second tag(s) assigned to a first tag can be received in the first tag. For example, the wireless signals 104A-C (FIG. 1) can be received in the tag 102 (e.g., by way of the wireless interface 224 in FIG. 2). The second tag(s) are configured to organize activities regarding respective physical objects. For example, the tags 408B-E can be coupled to respective ones of the physical objects 406B-E.

At 1420, event information regarding at least presence, proximity, and movement of the second tag(s) can be sent by a second wireless signal(s) from the first tag to a processing device. For example, the tag 102 (FIG. 1) can report some or all information from the record 500 (FIG. 5), the record 700 (FIG. 7), or the record 800 (FIG. 8).

At 1430, a behavior of the first tag can be adapted. In some implementations, the behavior can be adapted based on input received in the first tag. For example, the first tag can react to a signal from a sensor of the first tag. As another example, the first tag can react to one or more of the first wireless signal(s), or to the absence of a signal from one of the second tag(s).

In some implementations, the first tag can issue an alert to the user to stop a harmful condition (e.g., water submersion). For example, the first tag can issue such an alert audibly, visually, and/or by triggering an alert by another device (such as a processing device). In some implementations, the first tag can change its behavior in one or more ways that may seek to increase the likelihood of being found. For example, the first tag can increase its transmission power and/or beaconing rate. As another example, the first tag can conserve power by decreasing its transmission power and/or beaconing rate.

Figure 15:
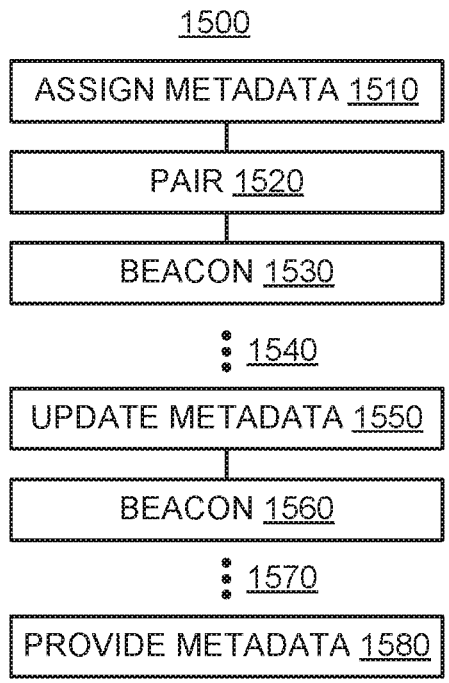
FIG. 15 shows an example of a method that can be performed by a tag to manage metadata.

FIG. 15 shows an example of a method 1500 that can be performed by a tag to manage metadata. The method 1500 can be used with one or more other examples described elsewhere herein. The method 1500 can be performed using one or more examples described with reference to FIG. 132. For example, the method 1500 can be performed by way of at least one processor executing instructions stored in a computer-readable medium. More or fewer operations than shown can be performed. Two or more operations can be performed in another order unless otherwise indicated.

At 1510, metadata can be assigned to a tag. In some implementations, the metadata can indicate a value of the physical object to which the tag is (or will be) attached, and/or an owner of the physical object. For example, the value can be a list price, MSRP, retail value, and/or a rental value).

At 1520, a tag can be paired with at least another device. In some implementations, the pairing can be done substantially as exemplified with regard to the method 1200 in FIG. 12.

At 1530, the tag can beacon. In some implementations, the beaconing can be done substantially as exemplified with regard to the method 1400 in FIG. 14.

The beaconing at 1530 can be performed continuously, at regular intervals, or randomly, over a shorter or longer period of time, as schematically indicated at 1540.

At 1550, metadata can be updated. In some implementations, the update relates to a value and/or ownership of the physical object to which the tag is coupled. For example, the metadata can be updated to indicate a new or additional owner, and/or to indicate a new or additional value. For example, the metadata can be updated by a software/firmware update (e.g., by wireless communication to the tag).

At 1560, the tag can beacon. In some implementations, the beaconing can be done substantially as exemplified with regard to the method 1400 in FIG. 14.

The beaconing at 1560 can be performed continuously, at regular intervals, or randomly, over a shorter or longer period of time, as schematically indicated at 1570.

At 1580, some or all metadata of the tag can be provided. In some implementations, the tag can be interrogated as part of determining a value of the physical object, and/or in establishing ownership thereof. For example, the tag can be queried by wireless communication verified using a security certificate.

Figure 16:
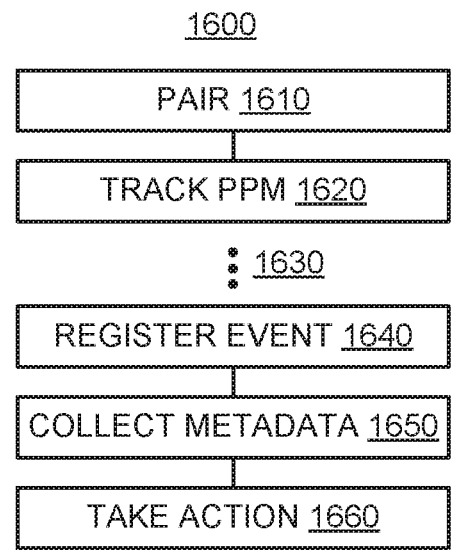
FIG. 16 shows an example of a method that can be performed to act on metadata kept by tags.

FIG. 16 shows an example of a method that can be performed to act on metadata kept by tags. The method 1600 can be used with one or more other examples described elsewhere herein. The method 1600 can be performed using one or more examples described with reference to FIG. 132. For example, the method 1600 can be performed by way of at least one processor executing instructions stored in a computer-readable medium. More or fewer operations than shown can be performed. Two or more operations can be performed in another order unless otherwise indicated.

At 1610, a tag can be paired with at least another device. In some implementations, the pairing can be done substantially as exemplified with regard to the method 1200 in FIG. 12.

At 1620, at least presence, proximity, and movement (PPM) can be tracked. In some implementations, the tracking can be done substantially as exemplified with regard to the method 1200 in FIG. 12.

The tracking at 1620 can be performed continuously, at regular intervals, or randomly, over a shorter or longer period of time, as schematically indicated at 1630.

At 1640, an event can be registered. In some implementations, the event can involve or otherwise implicate the physical object to which the tag is coupled. For example, the event can involve that a storage unit becomes flooded with water that damages some of the property.

At 1650, metadata can be collected from one or more tags. In some implementations, the collection is prompted by the registered event. For example, the collection can be done in preparation for seeking insurance reimbursement for losses due to the flooding (e.g., to determine value and/or ownership of the property).

At 1660, at least one action can be taken based on the collected metadata. In some implementations, the organization module 400 (FIG. 4) can perform one or more operations designed to address or otherwise notify the user about the metadata and/or the registered event. For example, the notification component 1100 in FIG. 11 can be used.

Figure 17:
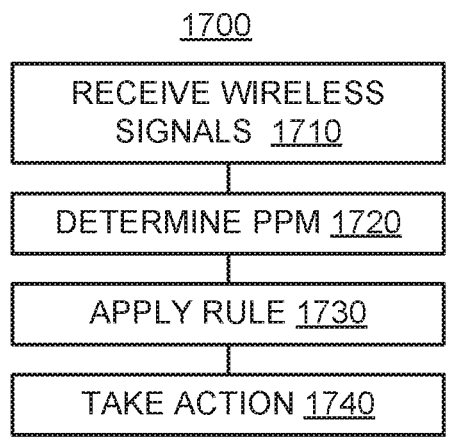
FIG. 17 shows an example of a method that can be performed by a processing device.

FIG. 17 shows an example of a method that can be performed by a processing device. The method 1700 can be used with one or more other examples described elsewhere herein. The method 1700 can be performed using one or more examples described with reference to FIG. 132. In some implementations, the method 1700 can be performed by way of at least one processor executing instructions stored in a computer-readable medium. For example, the activity component 205 (FIG. 2) or the activity component 404 (FIG. 4) can perform the method 1400. More or fewer operations than shown can be performed. Two or more operations can be performed in another order unless otherwise indicated.

At 1710, wireless signals can be received. In some implementations, wireless signals are received from at least some of a first plurality of tags (e.g., two or more of the tags 102, 104A-C, 200, 616, 620, 626, or 630), each of the first wireless signals having associated therewith at least an RSSI, a latency value, and a connectivity parameter. For example, The RSSI, latency value, and connectivity parameter can be determined by the activity component 404 in FIG. 4.

At 1720, at least presence, proximity, and movement for one or more of the first plurality of tags can be determined. In some implementations, the presence, proximity, and movement is determined based on an activity measure for the corresponding tag (e.g., as determined by the activity component 404 in FIG. 4.

At 1730, a rule can be applied. In some implementations, the rule depends on the activity measure for one or more of the first plurality of tags. For example, the rule 416 in FIG. 4 can depend on whether the tag 616 in FIG. 6 is within or near the bedroom 604, whether the tag 620 is undergoing the movement 624, and/or on whether the tags 626 and 630 have the proximity indicated by the arrow 634.

At 1740, at least one action can be taken. In some implementations, the action is specified by the rule. For example, the rule 416 in FIG. 4 can specify an action relating to the device 418, the user 420, and/or the location 422.

The following examples relate to one or more system designs.

Figure 18:
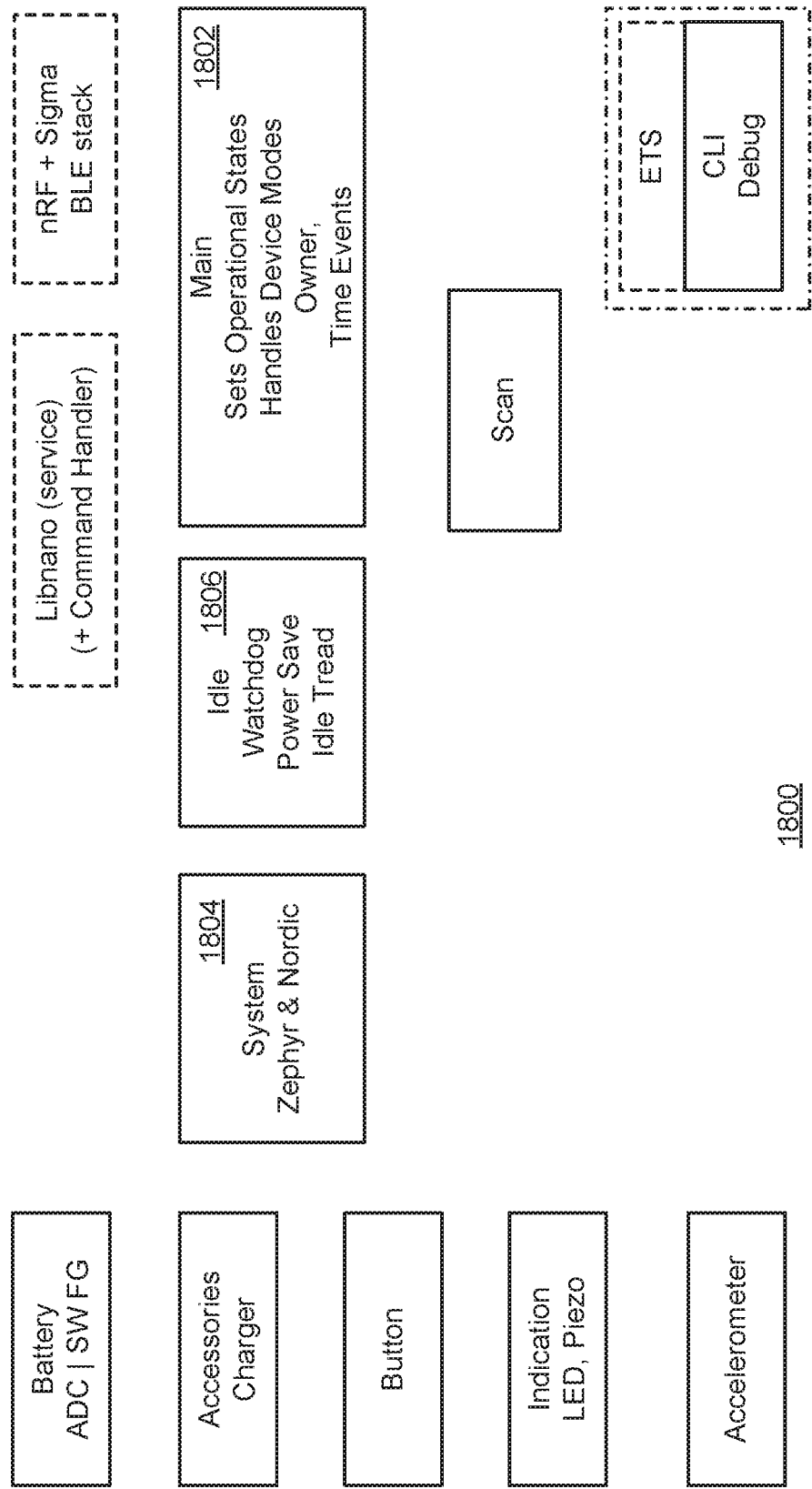
FIG. 18 shows an example of a process overview.

The following section relates to a process overview. Tag software is built around processes. FIG. 18 shows an example of a process overview 1800. In some implementations, three special processes can be used: Main 1802, System 1804 and Idle 1806.

Figure 19:
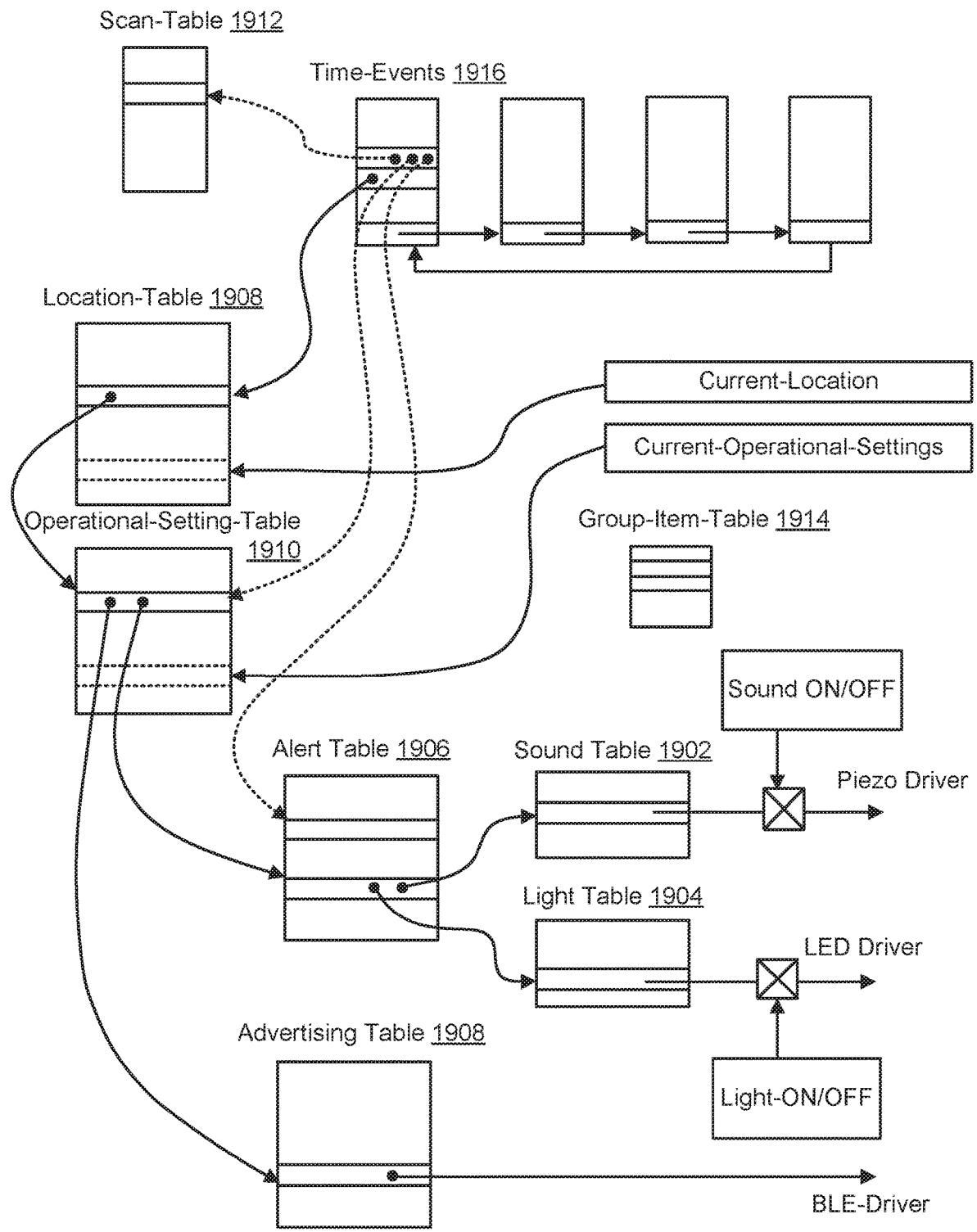
FIG. 19 shows an example of common data structures.

The following section relates to common data structures. FIG. 19 shows an example of common data structures 1900.

All API commands will map to a specific allocated memory area for just that command. These memories will be referred to as the common data structures, and be accessible by all processes in the system. This means that when a command is received from the Mobile Device its data (arguments) will first be written to the placeholder for that data in the common data structures and then an event is sent to the process responsible for handling that specific command. The process will then read the data for its internal usage.

Many of the data structures are organized as tables, for example as described in the following.

A sound table 1902 holds sequences of individual tones that make up a complete sound. This is indexed by the alert table. The sound table will currently only be accessed from the indication process.

The sound table can be implemented as many separate tables or a single longer table. A user may insert his/her own sounds, which can be considered when implementing the table(s). This is an example of a sound table:

| Index | Tone (PWM frequency) | Duration (ms) |
|---|---|---|
| 0 | Pattern (1) Tone 1 | Pattern (1) Tone Duration |
| 1 | Pattern (1) Tone 2 | Pattern (1) Tone Duration |
| 2 | Pattern (1) Tone 3 | Pattern (1) Tone Duration |
| . . . | | |
| n − 1 | Pattern (1) Tone n − 1 | Pattern (1) Tone Duration |
| n | End of pattern marker | 0 |
| n + 1 | Pattern (2) Tone 1 | Pattern (2) Tone Duration |
| n + 2 | Pattern (2) Tone 2 | Pattern (2) Tone Duration |
| . . . | | |
| k − 1 | Pattern (2) Tone k − 1 | Pattern (2) Tone Duration |
| k | End of pattern marker | 0 |

A sound alert can be generated by iterating over the above PWM frequencies starting from index 0 to index n. Every pattern shall be ended in the table using End of pattern marker. The duration in the sound table specifies how long time each tone shall be sounding. Special characters (markers) are needed to change volume and for silence.

Special characters (markers) are needed for:

End of pattern (if a single table is used)

Increase volume

Decrease volume

Silence

A light table 1904 holds sequences of individual lights that make up a complete light pattern. This is indexed by the alert table. The light table may only be accessed from the indication process.

The light table can be implemented as many separate tables or a single longer table. The user may create his/her own light patterns, and that should be considered when implementing the table(s). Here is an example of how the light table could be implemented:

| Index | Color (RGB bitmap) | Duration (ms) |
|---|---|---|
| 0 | Pattern (1) Color 1 | Pattern (1) Color Duration |
| 1 | Pattern (1) Color 2 | Pattern (1) Color Duration |
| 2 | Pattern (1) Color 3 | Pattern (1) Color Duration |
| . . . | | |
| n − 1 | Pattern (1) Color n − 1 | Pattern (1) Color Duration |
| n | End of pattern marker | 0 |
| n + 1 | Pattern (2) Color 1 | Pattern (2) Color Duration |
| n + 2 | Pattern (2) Color 2 | Pattern (2) Color Duration |
| . . . | | |
| k − 1 | Pattern (2) Color k − 1 | Pattern (2) Color Duration |
| k | End of pattern marker | 0 |

A light alert can be generated by iterating over the above RGB bitmap starting from index 0 to index n. Every light pattern shall be ended in the table using End of pattern marker. The duration in the light table specifies how long time the color shall be on.

Special characters (markers) are needed for

End of light pattern (if a single table is used)

Diming (LED ramping)

An advertising table 1906 contains information about the current advertising settings. It consists of:

Advertising interval

Tx power

Changes can be made to the advertising table 1906 to accommodate for dynamical changes in Advertising frequency.

A Location table 1908 holds the following entries:

Location type

Default operational setting.

Movement filter

Resting filter

Location Timeout

The Location types are:

HOME: Is defined by a Hub's range. It will: Know if an item is at home or away. Assist users in locating their items at home easier. Provide fast access to items. Be able to anticipate needs and apply rule to the Tag behavior. Allow Tag to sleep more and thus extend battery life.

SAFE ZONE: Is defined by the Positioning system of the Mobile Device and sent as a command to the Tag. It will give the user some of the benefits of HOME: Know if an item is in the safe zone or not. Be able to anticipate needs and apply rules. Allow Tag to sleep and thus extend battery time.

UNSAFE ZONE: Is every location that is not defined as a HOME or a SAFE ZONE.

LOST ZONE: Tag will revert to this zone when the Mobile Device has not been in contact with it for a predefined time.

Default operational setting points to a default setting that is used when no other setting overrides it.

A movement filter corresponds to a time in seconds/10 the Tag needs to be moved for before it is defined as a move.

A resting filter corresponds to a time in seconds/10 the Tag needs to have been laying still before it is defined as resting. This is used to prevent the Tag from entering lower advertising mode too quickly, and to limit the number of accelerometer interrupts.

Location timeout: If the Tag has not been in contact with a known device (Mobile Device or Hub) for this time it will revert to a different ZONE. If the current location was set to HOME or SAFE ZONE it will revert to UNSAFE ZONE. If current location was set to UNSAFE ZONE it will revert to LOST ZONE An operational settings table 1910 is used to define how the Tag will function autonomously when not being connected. It contains advertising and alert settings for the following states:

Resting: Contains settings for advertising

Moving: Contains settings for advertising, alert, alert duration

Disconnecting: Contains settings for advertising, alert, advertising duration, alert duration These settings are referenced by the location setting as a default operation. They can also be referenced by the time events to enable changing of operational settings dynamically.

A scan table 1912 defines when and how to scan for group items and other BLE devices. When scanning for surrounding items (not just group items) the periodic scan is enabled. This has two possible configurations:

Interval between scans and

A resting filter that says how long the Tag must be resting before a scan can be performed. Group items uses the group moving scan and group resting scan setting.

For stationary items e.g. drawers and lockers the group resting scan is best suited. This will perform a scan once the group has been resting for a period—defined by: group resting filter=Spurious Move Scan Delay. The group moving filter must be set to 0.

For handbags and carry bags the group moving scan is better suited. This will perform a scan once the Tag has been moving a period—defined by: group moving filter=Continuous Move Scan Filter, group resting filter Continuous Move Resting filter.

The scan table will contain the following fields:

Scan duration: Number of milliseconds to scan.

Periodic Scan Interval: Minimum time between periodic scans.

Group Moving Filter: This value is in seconds/10. It filters out movements shorter than this time. This is only used when group moving scan is enabled end the group is not full.

Group Resting Filter: This value is in seconds/10. It filters out resting periods shorter than this time. This is only used when group moving scan is enabled end the group is not full.

A group item table 1914 is where the group items are stored. For every entry a 6 byte long MAC address is stored, and if the location is valid or not.

Valid Item 6 bytes MAC address

Time events are used to accommodate for dynamic changes of operational settings and scan settings. They will also be able to dynamically trigger alerts and scans at specified times.

The events 1916 are set to occur at a certain time during the day at a specific date or weekday. They can also be set to repeat.

Each event will also have a priority and a bitmask of which locations it applies to. The bitmask makes it possible for events to point to several locations at a same time, and the priority enables multiple events that occur at the same time to be prioritized. This is necessary for event exception handling.

These are the fields that one Time Event will contain:

Event type

Event data

Event priority

Duration

Location bit mask

Date

Time

Weekday

Repeat

Time events are added in chronological order. The Event HEAD points to the first event of the day. Each event contains an embedded next event point, that points to the next chronologically ordered event.

Figure 20:
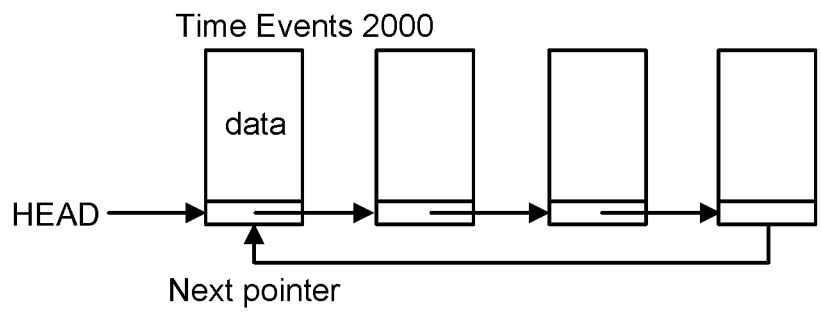
FIG. 20 shows an example of time events.

FIG. 20 shows an example of time events 2000. Implemented in a table time events could look like:

| In | Event Data content | Next |
|---|---|---|
| 0 | | |
| 1 | Event 4 | 4 |
| 2 | | 1 |
| 3 | Event 2 | 5 |
| 4 | Event 5 | 7 |
| 5 | Event 3 | 2 |
| 6 | | END |
| 7 | | n − 1 |
| ... | | |
| n− | | 6 |
| n | | | where index (Ind.) number 3 corresponds to a HEAD and index number 5 corresponds to a CURRENT EVENT.

Every time a location is changed the list must be traversed until an event that matches the location and time is found. The current event pointer will point to the event that is currently serviced.

Since every Time Event contains a duration and a priority when exiting one event there may be one lower priority event that should take effect. A suggestion for an easy implementation is to either embed a previous event index into the data which will assist in going backwards chronologically, or to have additional pointers into the table that keeps track of lower prioritized underlying events.

The following section relates to an operating system. In some implementations, a Zephyr real-time operating system can be used.

The notion of processes is used to conceptually define how to partition the system into self-contained entities. The system will be multi-threaded and each of the processes will be implemented in a single Zephyr thread. Though this is not necessary and all processes can easily be combined into a single or fewer threads if wanted. In some implementations, more benefits can be obtained in using more threads than few.

Every process may have two main states:

an initial state which then goes into an infinite event loop.

Figure 21:
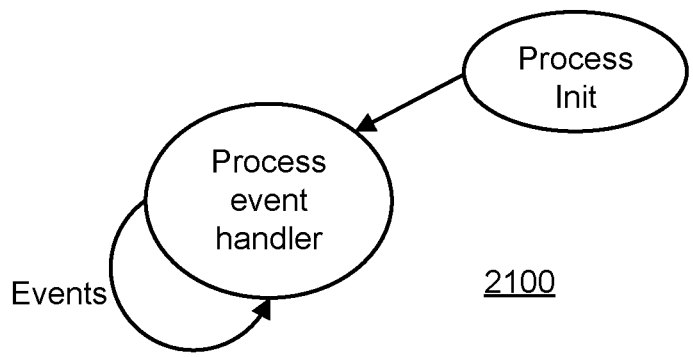
FIG. 21 shows an example involving an initial state and an event loop.

Any interaction with the process logic will go via a single event queue. If no items reside in the queue the process will enter sleep. The benefit of doing it this way is that all the process logic is in one context and no other synchronization methods are needed, except for this queue. FIG. 21 shows an example 2100 involving an initial state and an event loop.

Examples of Event types include:

Cmd events

Accelerometer events

Button events

BLE events

Timer events

The following section relates to application programming interfaces (APIs) and message passing. Each process will implement a single message queue.

For easy handling one can define two APIs:
External API
Internal API

The External API will be the API that other processes use when contacting the process. These API functions are executed in the caller's context, and are basically wrapper functions to internal API event.

The Internal API consists of a set of internally defined events that are queued from the callers context to the process context. The internal API events are later used in the description of the process logic.

The Internal API is also used in callback functions:
Timer callbacks
Interrupt callback
Subscription callback (e.g. button or accelerometer)

Figure 22:
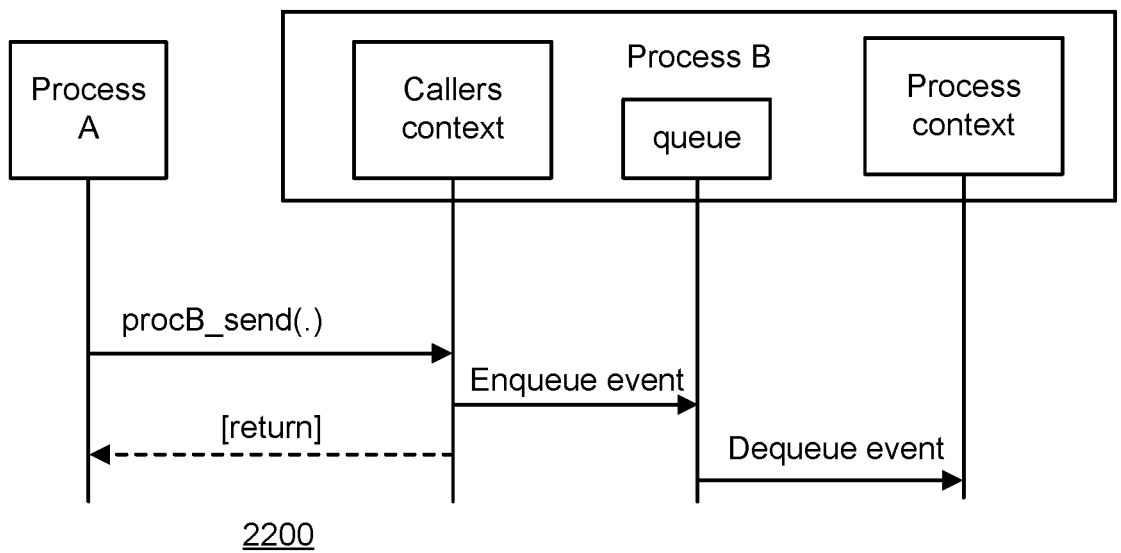
FIG. 22 shows an example of how a process may be contacted.
Figure 23:
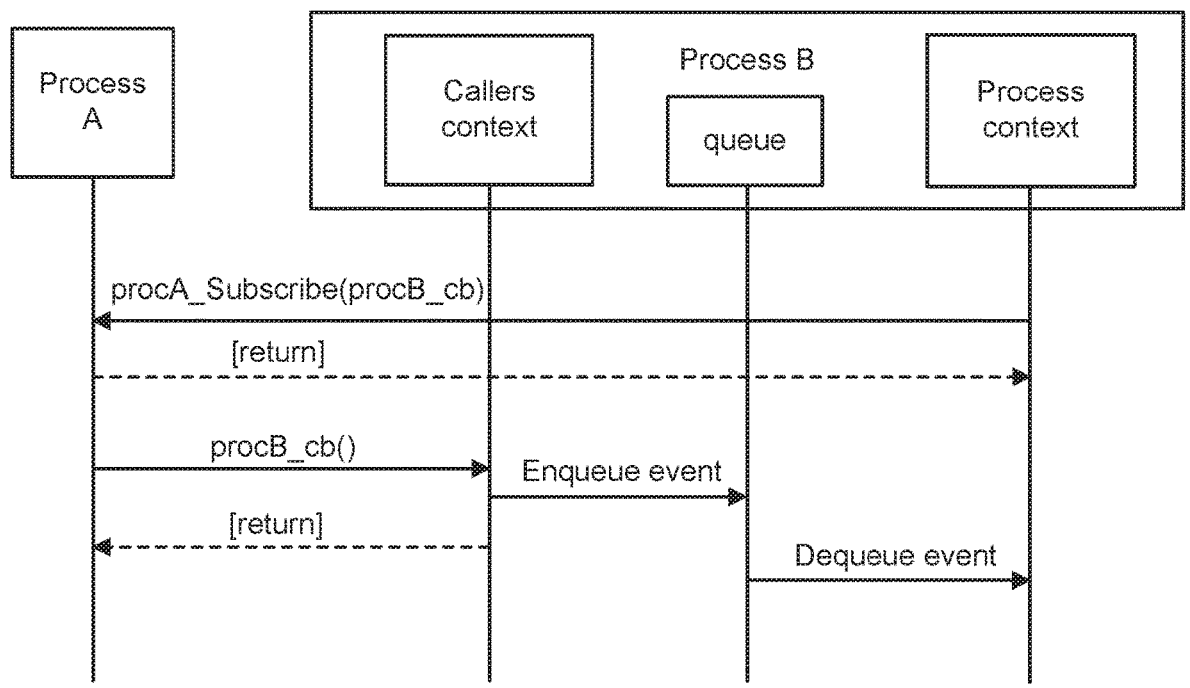
FIG. 23 shows an example of how a process may be contacted.
Figure 24:
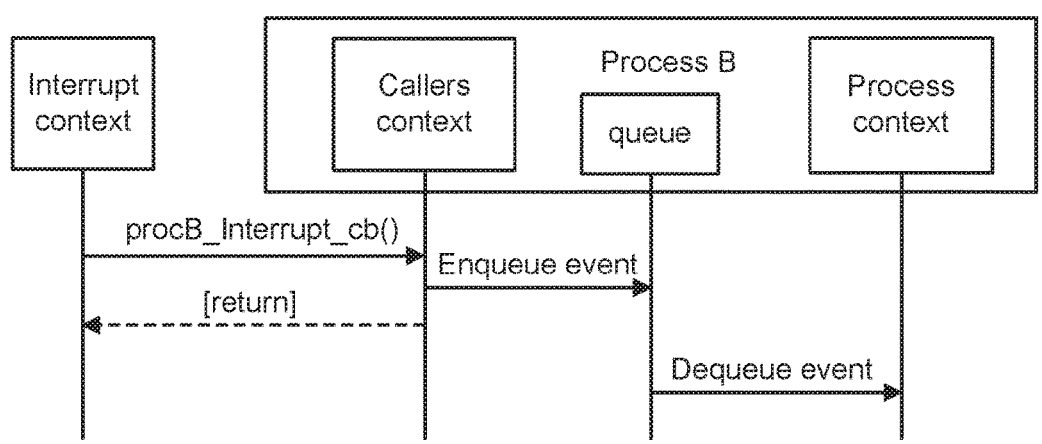
FIG. 24 shows an example of how a process may be contacted.

FIG. 22 shows an example 2200 of how a process may be contacted. FIG. 23 shows an example 2300 of how a process may be contacted. FIG. 24 shows an example 2400 of how a process may be contacted.

There should be a straight forward mapping between the Internal API events that needs External API functions. in the present description, focus has been on the Internal API because it gives a better understanding of the internal function.

Figure 25:
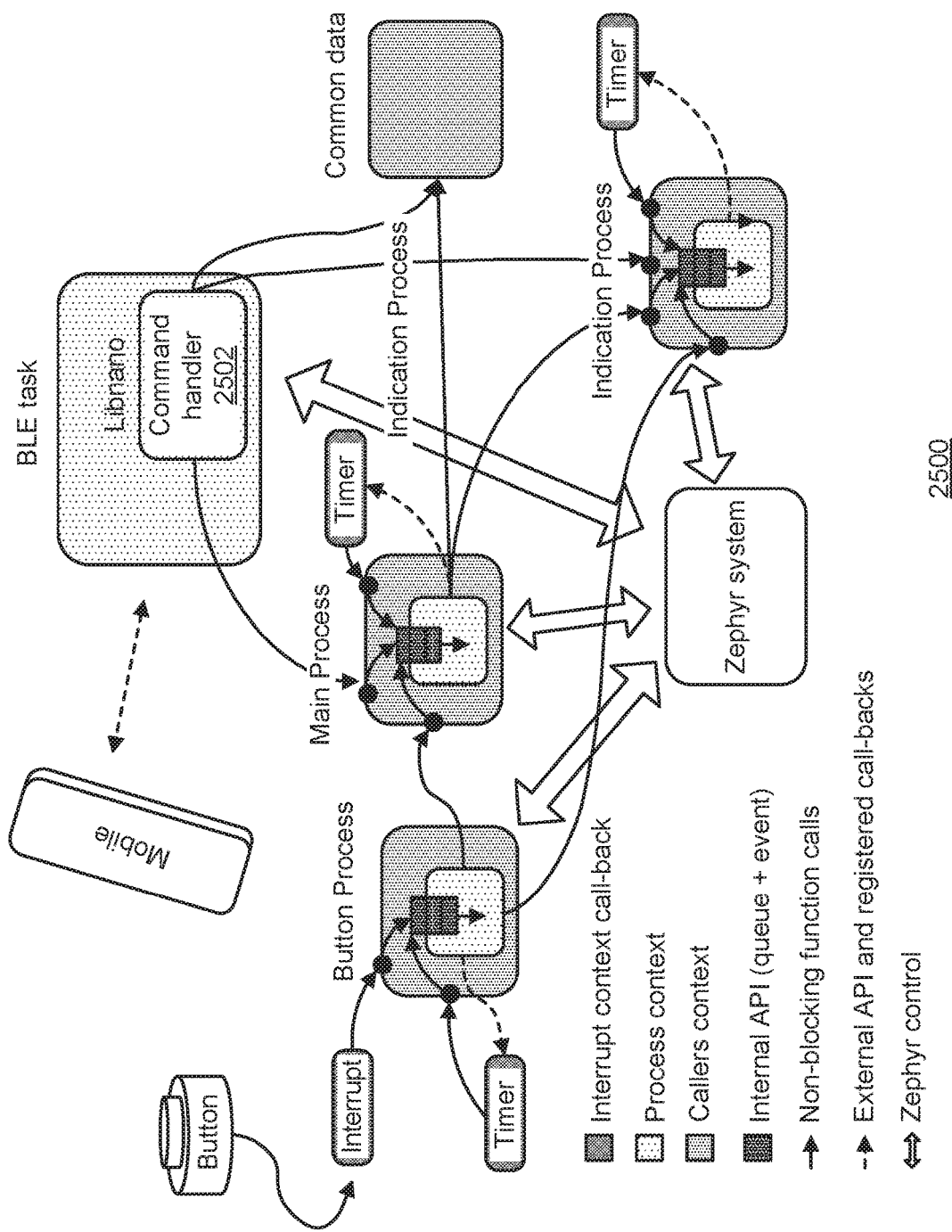
FIG. 25 gives an overview of how the entire system will interact when it comes to data and message passing.

The following section relates to a system overview of data/message flow. FIG. 25 gives an overview 2500 of how the entire system will interact when it comes to data and message passing.

Regarding queue sizes, there should be very little queuing in the system because of several reasons:
Input to the system from Mobile Device/Hub is limited by the BLE throughput.
Input via interrupts are limited via different SW filters, that disables the interrupt.
Input from timers is limited by the nature of time scales used.

However, one may not know what may cause things to queue up before it is tested. A suggestion is to oversize the queues and if they exceed a filling level of 50% this should be reported and logged to be able to evaluate and identify possible issues.

Processes can be configured with process priorities.

Regarding timer event handling, one problem may arise with timers that need to be stopped before they have expired. If a timer is stopped after already inserted an event into the message queue, but before the event has been taken out, and this event is not removed the event may cause logical errors.

To handle it correctly any element in the queue of a stopped timer must be removed.

A sequence bit is added to the timer object to address and solve this problem. A library for handling this is created and this library should be used in all processes.

The following section relates to general-purpose input/output (GPIO). The GPIOTE peripheral can create two different events:
PORT event and
IN[n] event.

Both of these can be used as interrupts to wake the CPU up in System ON mode (Nordic definition).

The PORT event is generated by the DETECT signal from the GPIO. Since the DETECT signal is combined to one signal from all the GPIOs, there are some limitations of knowing which pin did triggered the interrupt.

The IN[n] event is generated directly from the GPIOTE peripheral and is assigned to one specific GPIO pin.

When it comes to current consumption, using the DETECT signal or PORT events as interrupt source do not consume any current. Using IN[n] events consumes about 20 μA.

It is important to save current. Therefore interrupts should be triggered on PORT events. However, since PORT events only will give the GPIO port that generated the interrupt, the firmware must also detect from what pin the interrupt originated from.

The following section relates to a command handler 2502. The Command Handler will be a set of functions responsible for communicating between the Libnano process and the rest of the system.

After a packet has been received from the Mobile Device/Hub over the Libnano transport, it is sent to the Command handler that parses its content. For each command it interprets it uses a look-up table to retrieve a common data write callback, and a process callback, that are both executed. The process callback will generate an event to the process, and when received it will read the data stored in the common data area.

A transmit function is used for sending command responses or event to the Mobile Device/Hub over the Libnano transport.

Figure 26:
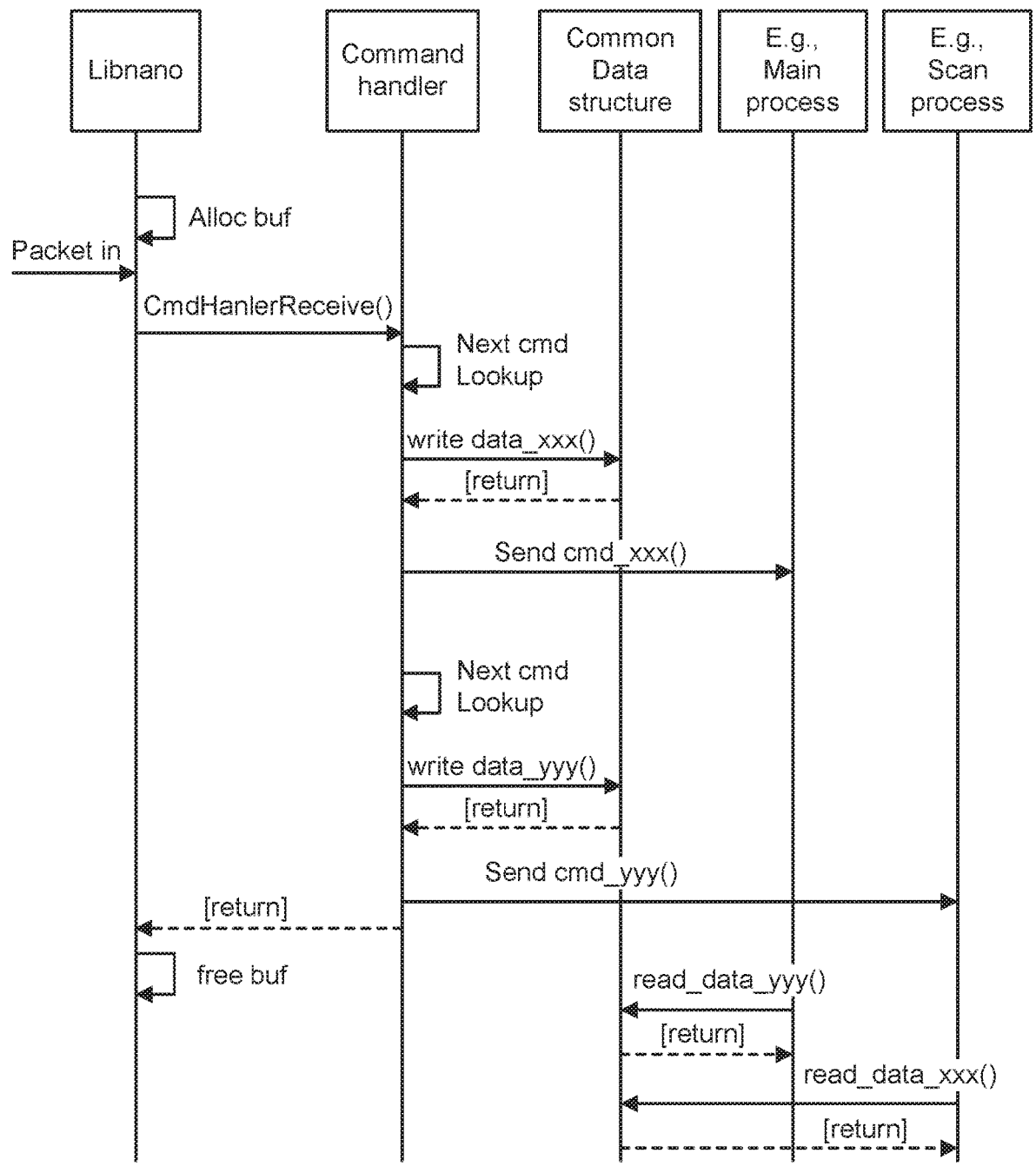
FIG. 26 shows an example of a sequence diagram for a receive sequence.

FIG. 26 shows an example of a sequence diagram 2600 for a receive sequence. FIG. 27 shows an example of a sequence diagram 2700 for a transmit sequence. The sequence diagrams 2600 and 2700 illustrate how the Command Handler can work with the Libnano and the rest of the system.

The following sections relate to a scan process. The scan process is responsible for:
Scanning of group items
Scanning of surrounding BLE devices The following section relates to an internal API. The internal API is made up of events that are queued from caller's context to the process context. It is here to make the flow charts easier to understand later in the document, and also give a fuller picture of what events the process is supposed to be able to handle:
MAIN: Instant scan; This event comes from the main process and will start a single scan.
MAIN: Scan settings changed; This event comes from the main process and is triggered on Time Events. It will start a single scan.
GROUP: Onboard scan; This event comes from the main process when a child tag onboard process is started. It will perform a longer scan.
GROUP: Group scan enable; This event comes from the main process and indicates when the scan process should start scan for missing group items.
GROUP: Group scan disable; This event comes from the main process and indicates when the scan process should stop scan for missing group items.
CMD: Scan Table Define; This event comes from the Libnano process (command handler) and indicates that the Scan Table has been updated.
CMD: Scan Enable; This event comes from the Libnano process (command handler) and indicates that the scan enable bits have been updated.
ACC: Moving event; This event indicates that the Tag is moving. Sent from a callback that were submitted when subscribing to accelerometer events.
ACC: Resting event; This event indicates that the Tag is resting. Sent from a callback that were submitted when subscribing to accelerometer events.

BLE: Device found; This event indicates that a device has been found during scanning. The callback that this event is generated from is the one submitted when starting BLE scans. When it is called it will first copy the received MAC address and RSSI to a short circular buffer and then send an event to the scan process, with the index to the buffer as an argument. The index in the circular buffer is then incremented to allow space for more found items.

Timer: Periodic scan event; This event is sent when the periodic scan timer expires. The event is generated from a timer callback that is submitted when initializing the timer.

Timer: Periodic scan duration event; This event is sent when the periodic scan duration timer expires. The event is generated from a timer callback that is submitted when initializing the timer.

Timer: Group scan duration event; This event is sent when the group scan duration timer expires. The event is generated from a timer callback that is submitted when initializing the timer.

Timer: Instant scan duration event; This event is sent when the instant scan duration timer expires. The event is generated from a timer callback that is submitted when initializing the timer.

Timer: Onboard scan duration event; This event is sent when the onboard can duration timer expires. The event is generated from a timer callback that is submitted when initializing the timer.

The following section relates to an external API. A list and description of functions exposed to other processes can include: A Scan Result Query function call comes from the Libnano process (command handler) and requests the scan process to search its scan list to see if it has "seen" a devices with a specific MAC address and return the result. A Scan Result List function call comes from the Libnano process (command handler) and requests the scan process to send the entire scan list to the requester This process depends on:
Libnano process
Indication process
Accelerometer The following section relates to internal handling. State variables can include onboard_scan, which shows if and onboarding scan of child tags is ongoing. State variables can include scan_clients: Since there are many reasons for a scan to be started, this variable keeps track of all requests so the Tag knows when to stop scanning.

Figure 31:
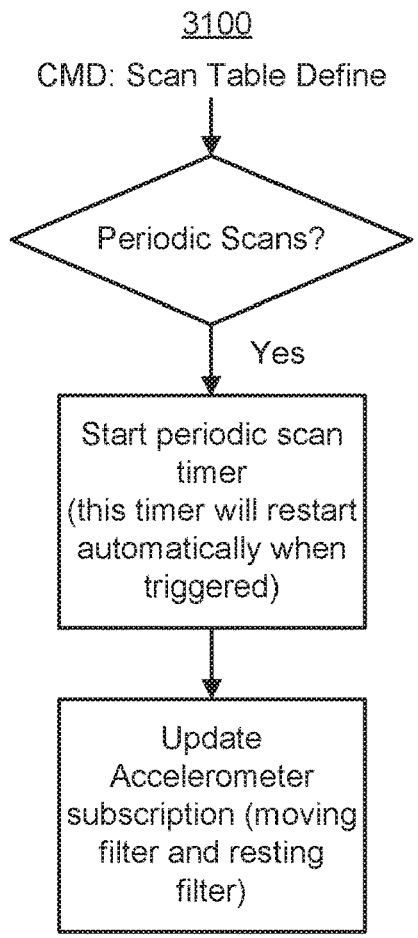
FIG. 31 shows an example relating to the CMD event handler of FIG. 30.
Figure 32:
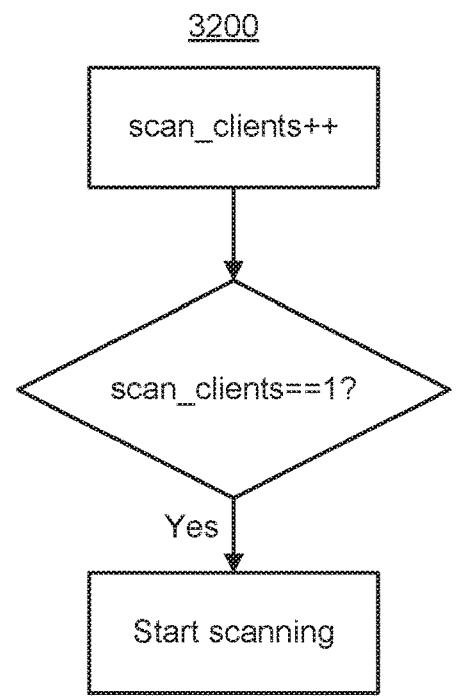
FIG. 32 shows an example relating to the CMD event handler of FIG. 30.
Figure 33:
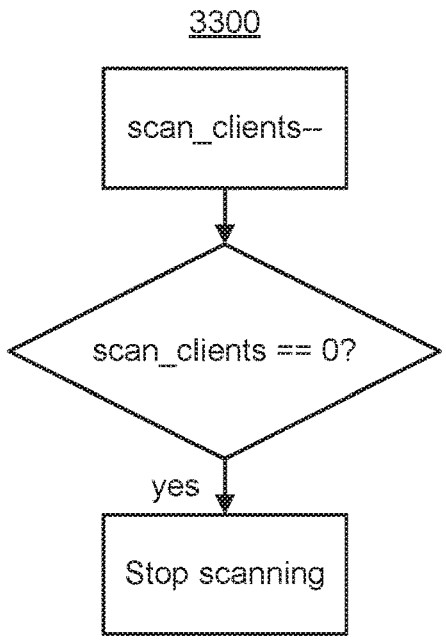
FIG. 33 shows an example relating to the CMD event handler of FIG. 30.
Figure 34:
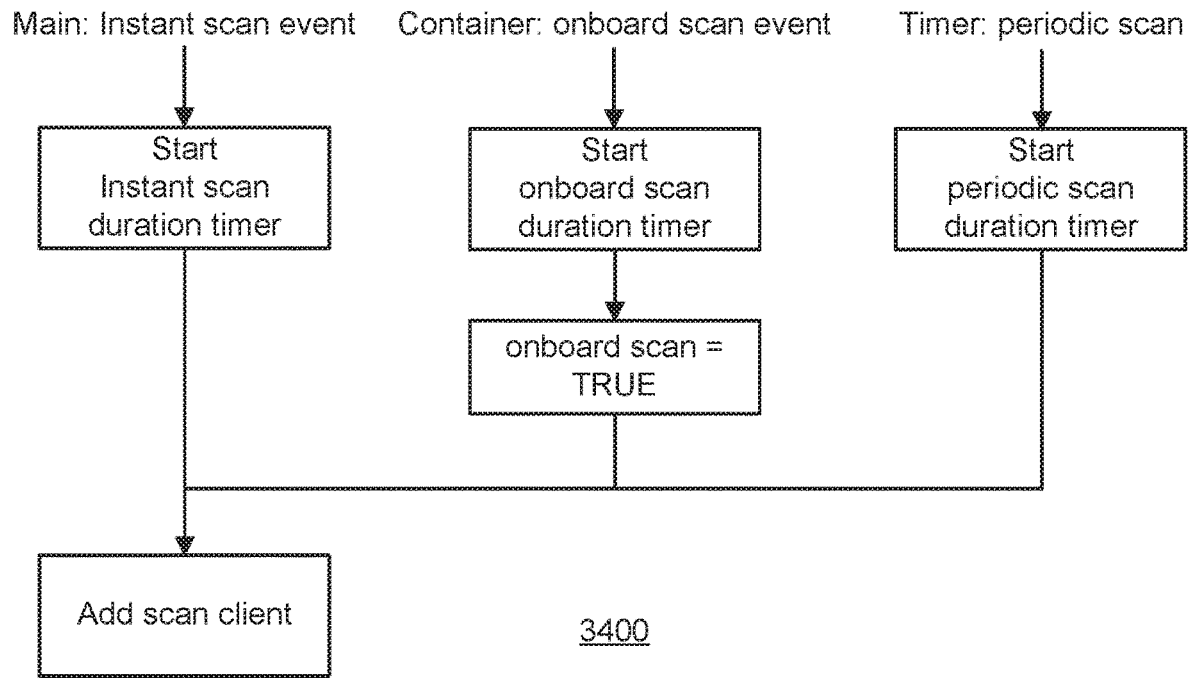
FIG. 34 shows an example relating to the scan event handler of FIG. 30.
Figure 35:
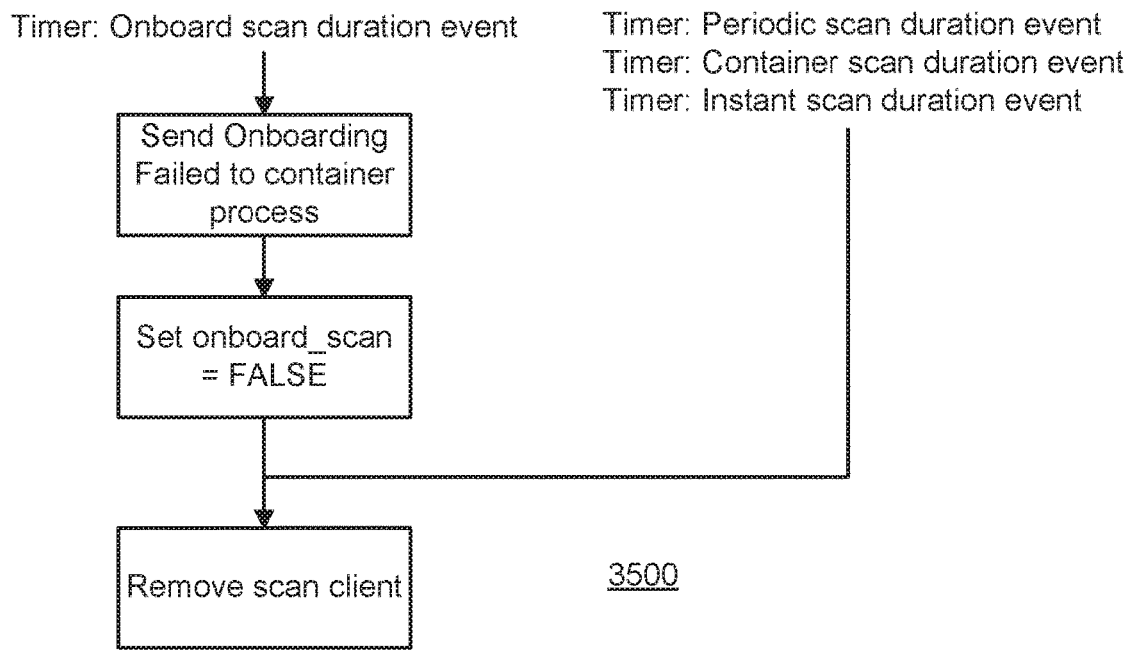
FIG. 35 shows an example relating to the scan event handler of FIG. 30.
Figure 36:
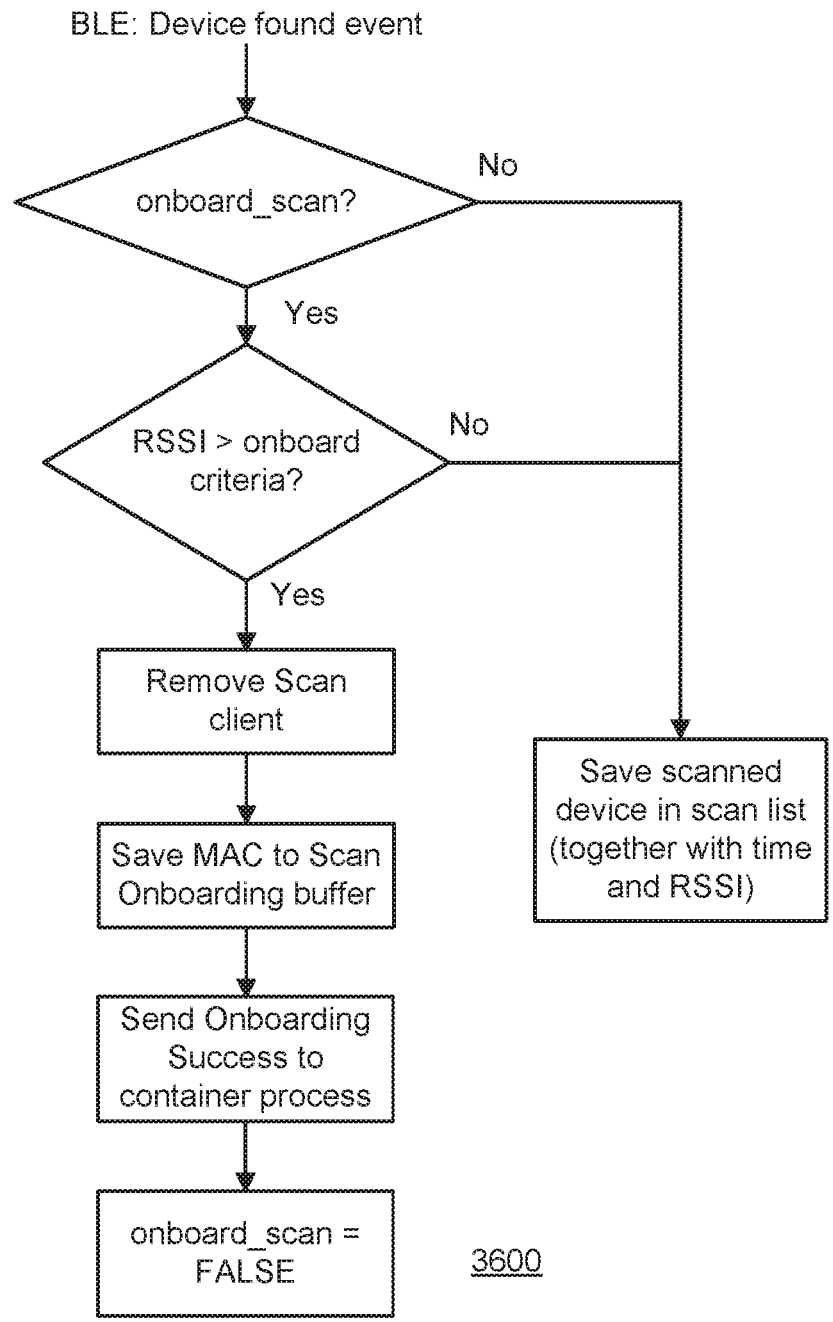
FIG. 36 shows an example relating to the BLE event handler of FIG. 30.
Figure 37:
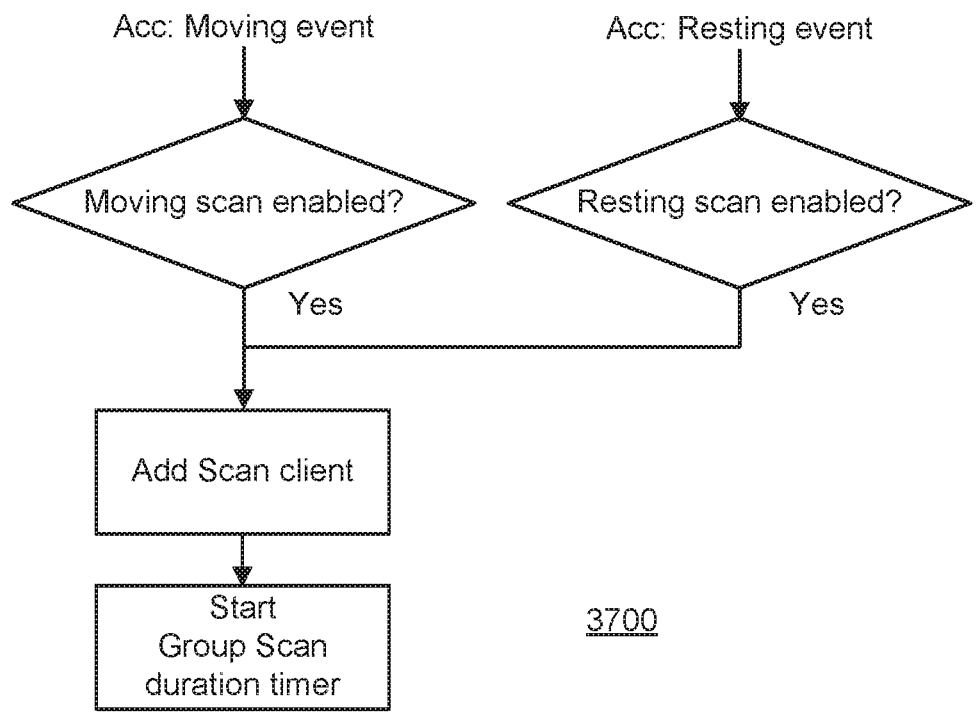
FIG. 37 shows an example relating to the Accelerometer event handler of FIG. 30.
Figures 38, 39:
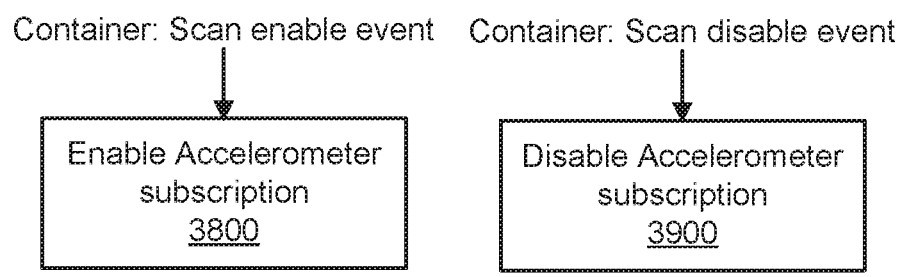
FIG. 38 shows an example relating to the Accelerometer event handler of FIG. 30, including a group: scan enable event with an enable accelerometer subscription.
FIG. 39 shows an example relating to the Accelerometer event handler of FIG. 30, including a group: scan disable event with a disable accelerometer subscription.

FIG. 28 shows an example of a top level state diagram 2800 with a scan init 2802 and a scan event handler 2804. FIG. 29 shows an example relating to the scan init 2802 of FIG. 28, including a register accelerometer subscription 2900. FIG. 30 shows an example 3000 relating to the scan event handler 2804 of FIG. 28. The example 3000 includes a CMD event handler 3002, a scan event handler 3004, a BLE event handler 3006, and an Accelerometer event handler 3008. FIG. 31 shows an example 3100 relating to the CMD event handler 3002 of FIG. 30. FIG. 32 shows an example 3200 relating to the CMD event handler 3002 of FIG. 30. The example 3200 relates to adding a scan client. FIG. 33 shows an example 3300 relating to the CMD event handler 3002 of FIG. 30. The example 3300 relates to removing a scan client. FIG. 34 shows an example 3400 relating to the scan event handler 3004 of FIG. 30. FIG. 35 shows an example 3500 relating to the scan event handler 3006 of FIG. 30. FIG. 36 shows an example 3600 relating to the BLE event handler 3008 of FIG. 30. FIG. 37 shows an example 3700 relating to the Accelerometer event handler 3008 of FIG. 30. FIG. 38 shows an example relating to the Accelerometer event handler 3008 of FIG. 30, including a group: scan enable event with an enable accelerometer subscription 3800. FIG. 39 shows an example relating to the Accelerometer event handler 3008 of FIG. 30, including a group: scan disable event with a disable accelerometer subscription 3900.

The following sections relate to a group process. The group process is responsible for:
Group configuration
Group item (child tag) onboarding
Group status event An internal API is made up of events that are queued from caller's context to the process context. It is here to make the flow charts easier to understand later in the document, and also give a fuller picture of what events the process is supposed to be able handle:

CMD: Group Settings; This event comes from the Libnano process (command handler) and indicates that the group settings has changed CMD: Group Item Table Define; This event comes from the Libnano process (command handler) and requests that a group item is added to the group.

CMD: Group Calibrate; This event comes from the Libnano process (command handler) and requests the group process to calibrate its group.

CMD: Group Item Status; This event comes from the Libnano process (command handler) and requests status of the group to be sent to the requester.

Scan: Group Onboarding Scan Success; This event comes from the Scan process as a result from a started child tag onboarding scan. It indicates that the scan was successful.

Scan: Group Onboarding Scan Failed; This event comes from the Scan process as a result from a started child tag onboarding scan. It indicates that the scan was failed Button: Long press event; This event indicates that the button has been long-pressed. The event is generated from a callback when subscribing to button events.

Button: Short press event; This event indicates that the button has been short-pressed. The event is generated from a callback when subscribing to button events.

BLE: Mobile Device connect event; This event indicates that Mobile Device has connected. The event is generated from a callback registered to handle BLE connect events. When a connection is made with the Tag this callback is executed. It will then see what type of device that was connected. If it was a Mobile Device this event is sent to the main process.

BLE: Mobile Device disconnect event; This event indicates that Mobile Device has connected. The event is generated from a callback registered to handle BLE disconnect events. When a connection is lost with the Tag this callback is executed. It will then see what type of device that was disconnected. If it was a Mobile Device this event is sent to the main process.

An external API can involve functions exposed to other processes.

Figure 40:
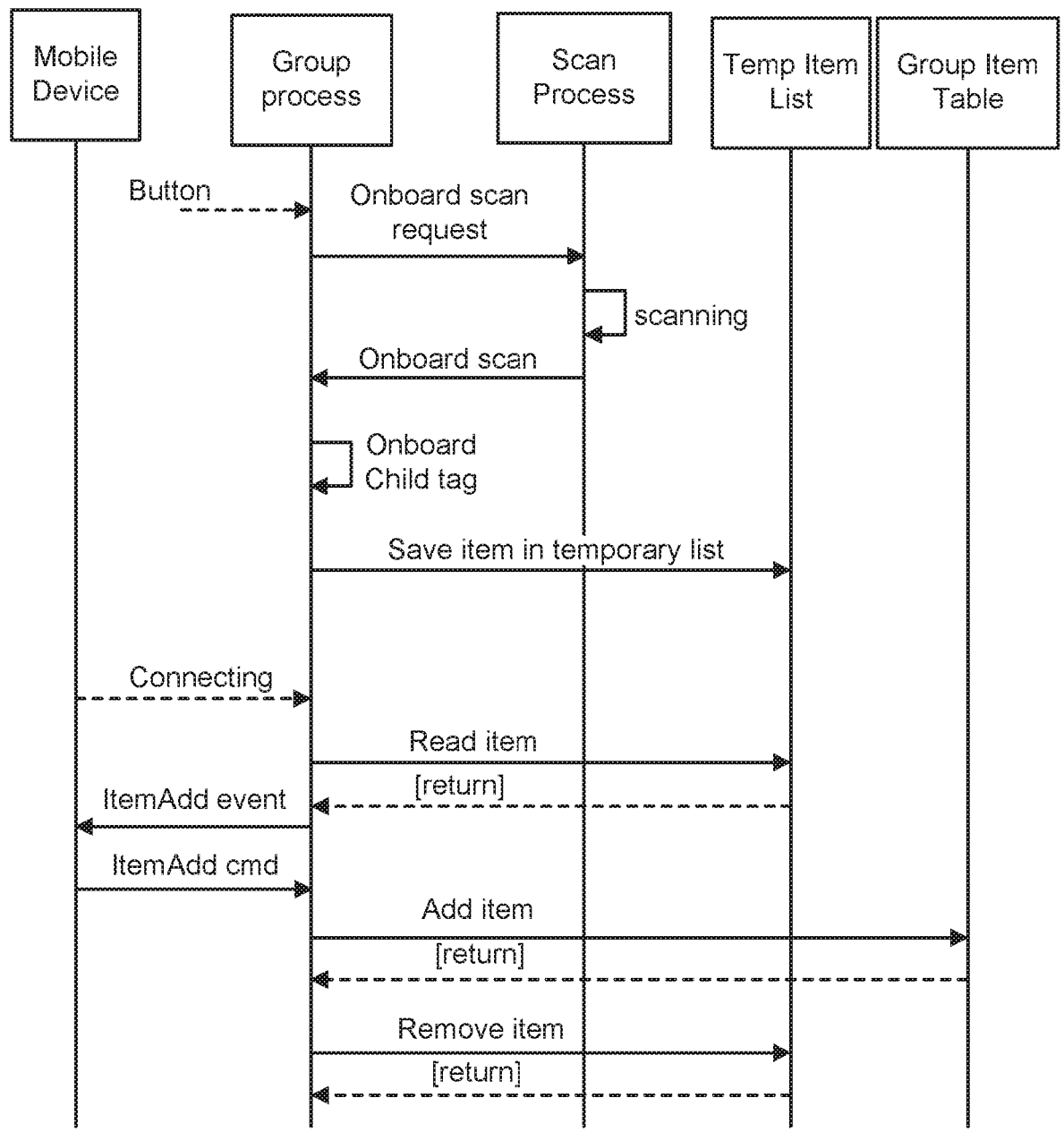
FIG. 40 shows an example of a child tag onboarding sequence.
Figure 41:
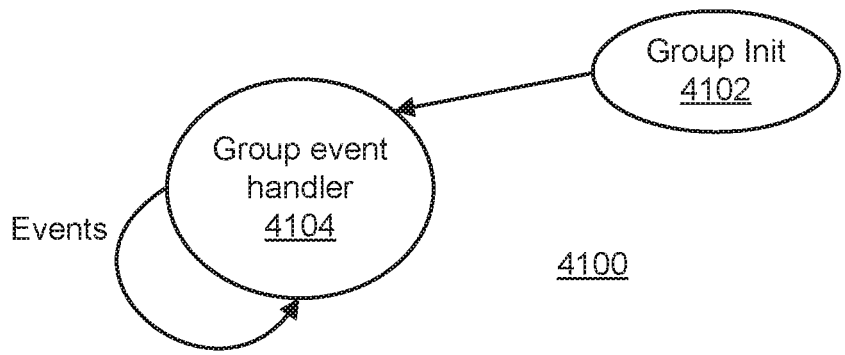
FIG. 41 shows an example of a top level state diagram.
Figure 42:
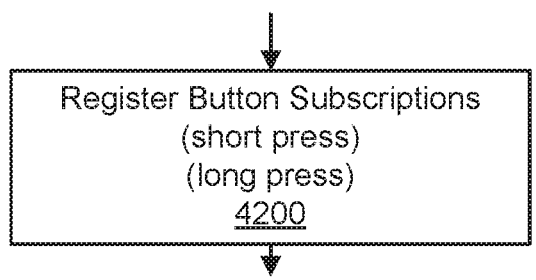
FIG. 42 shows an example relating to the group init of FIG. 41, including a Register Button Subscriptions.
Figure 43:
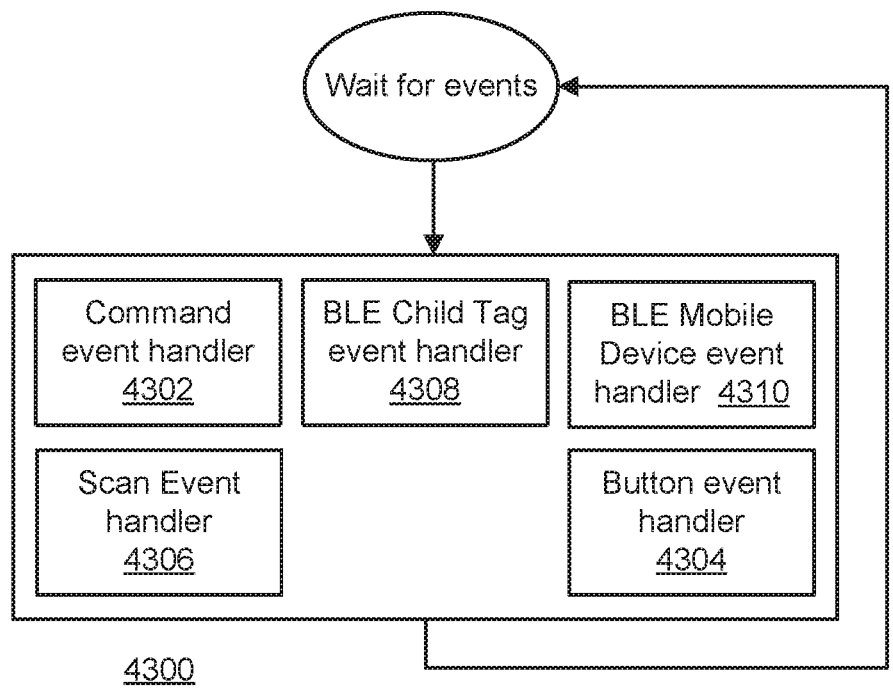
FIG. 43 shows an example relating to the group event handler of FIG. 41, including a command event handler, a button event handler, a scan event handler, a BLE child tag event handler, and a BLE mobile device event handler.
Figure 47:
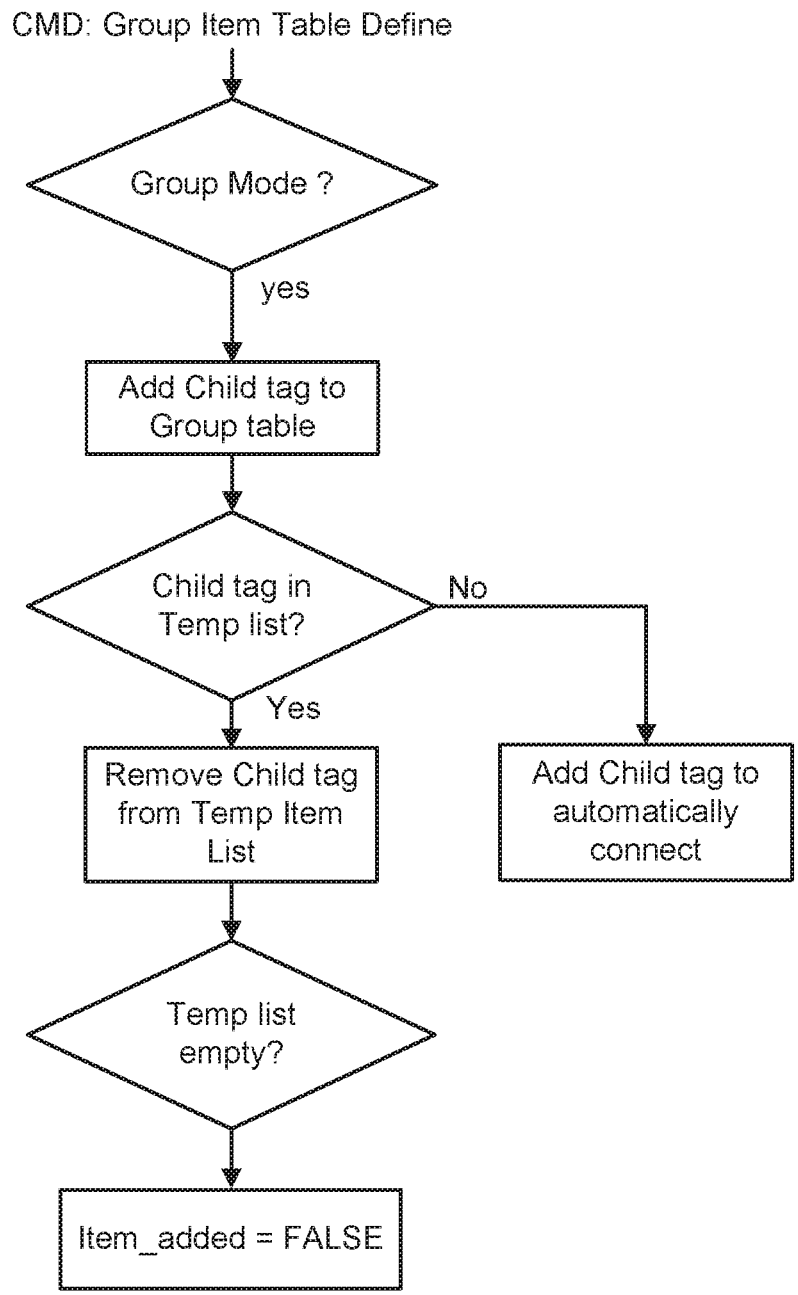
FIG. 47 shows an example relating to the command event handler in FIG. 43.
Figure 48:
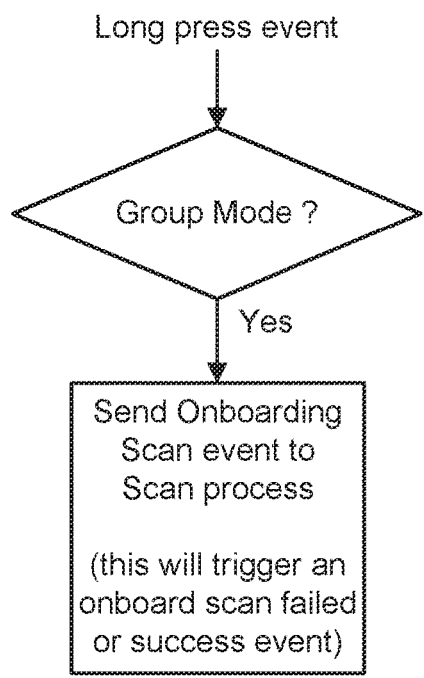
FIG. 48 shows an example relating to the button event handler in FIG. 43.
Figure 49:
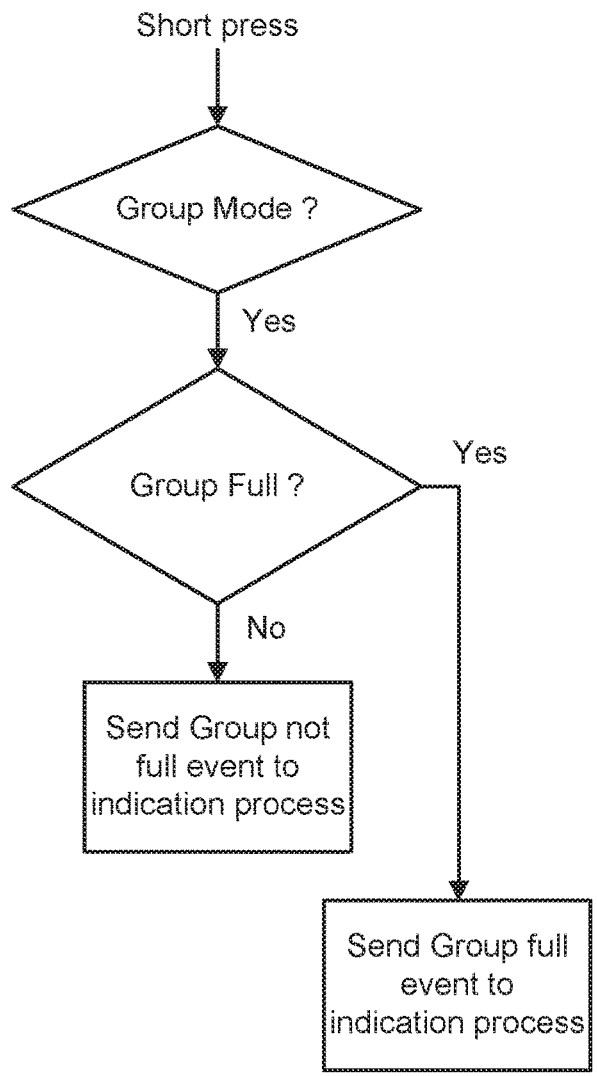
FIG. 49 shows an example relating to the button event handler in FIG. 43.
Figure 50:
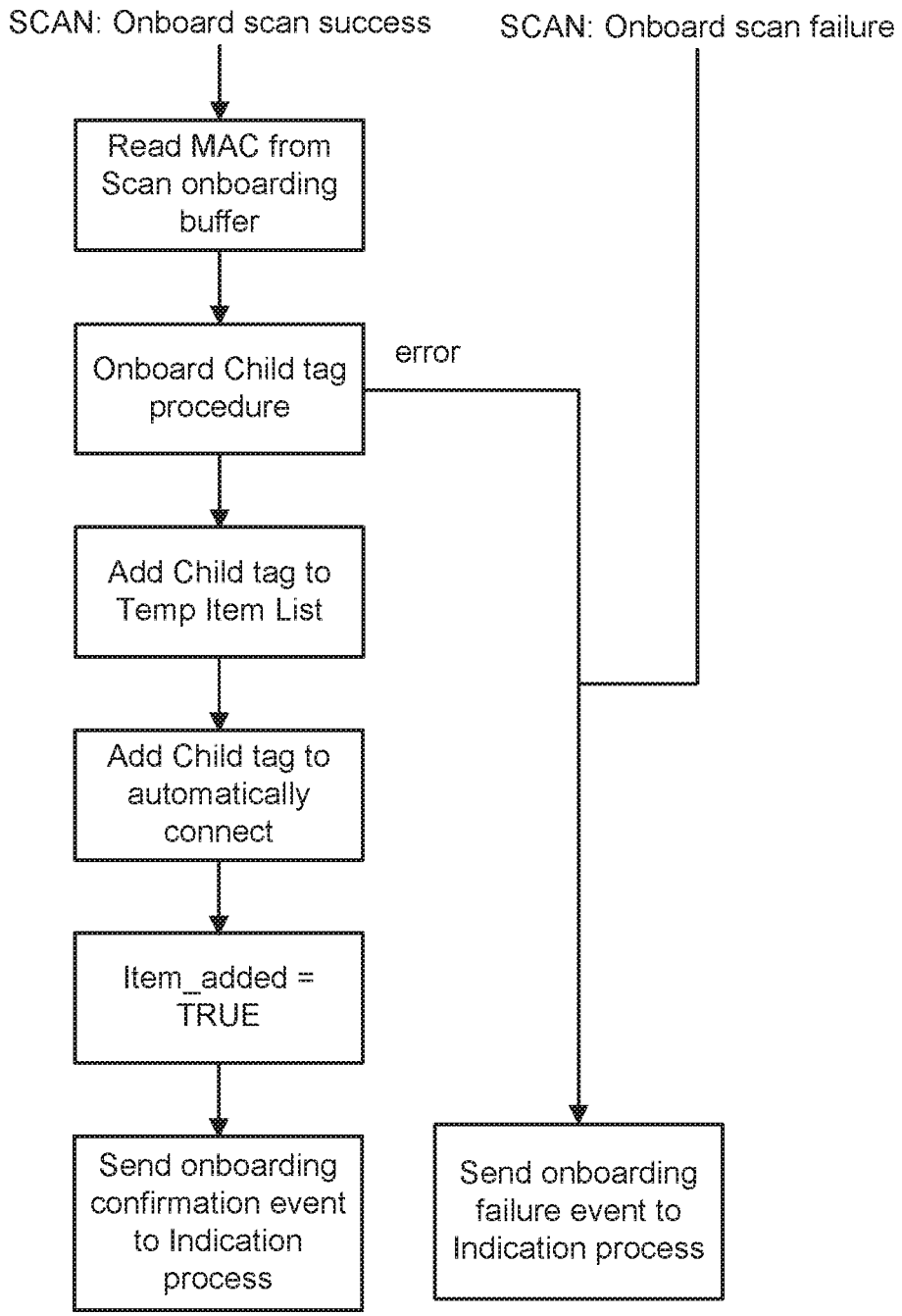
FIG. 50 shows an example relating to the scan event handler in FIG. 43.
Figure 51:
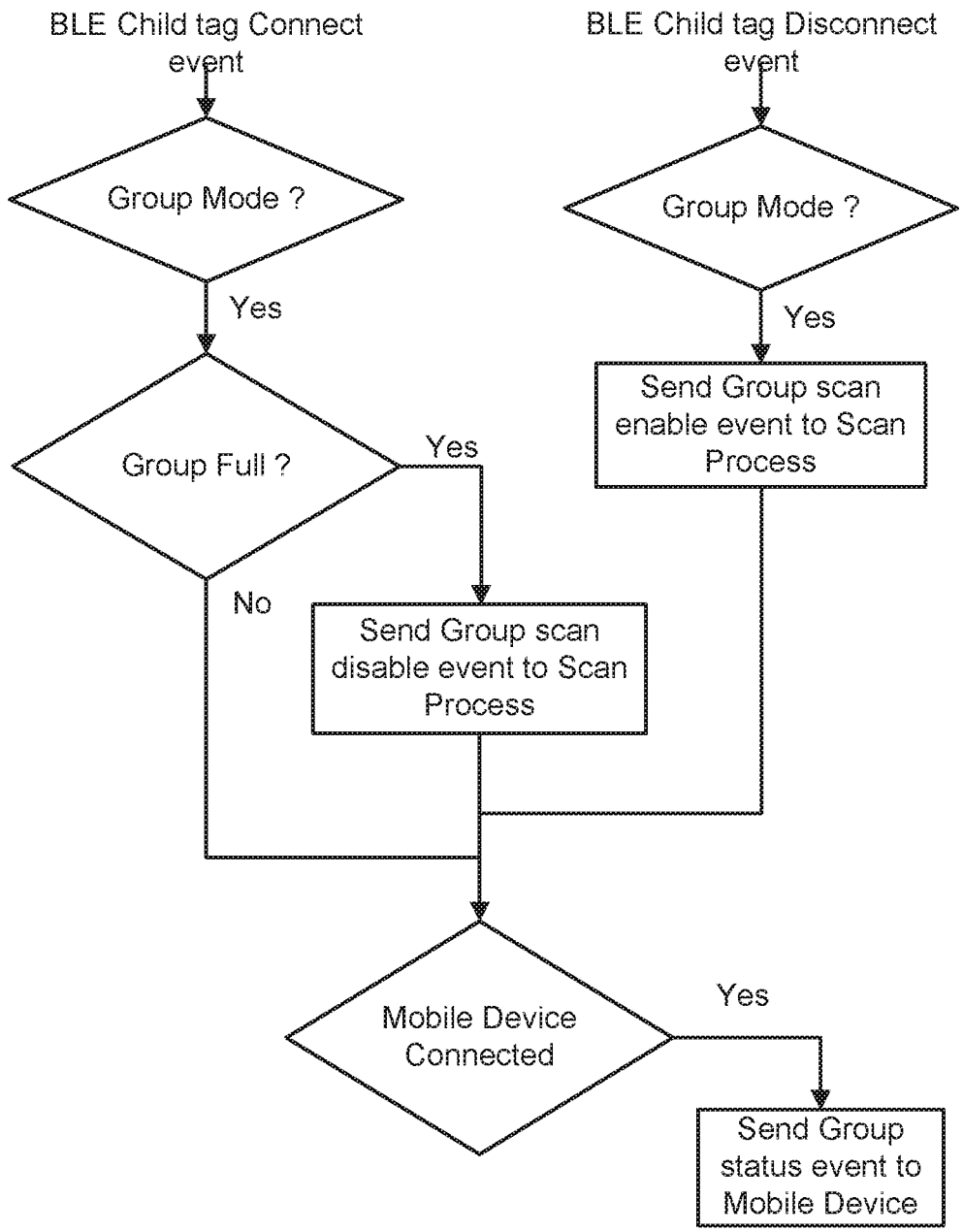
FIG. 51 shows an example relating to the BLE child tag event handler in FIG. 43.
Figure 52:
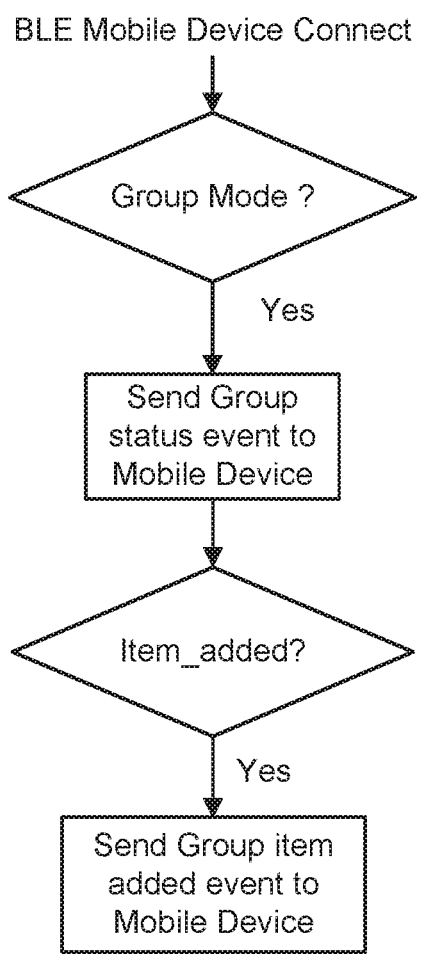
FIG. 52 shows an example of BLE mobile device: connect relating to the BLE mobile device event handler in FIG. 43.
Figure 53:
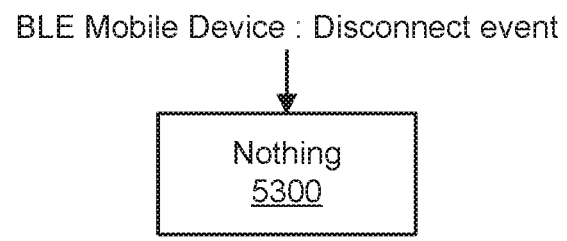
FIG. 53 shows an example of a BLE mobile device: disconnect event including a nothing event relating to the BLE mobile device event handler in FIG. 43.

The process depends on:
Libnano process
Indication process
Button process
Scan process FIG. 40 shows an example of a child tag onboarding sequence 4000. The following section relates to internal handling. State variables can include Item_added, which variable is set to TRUE if there are group items (child tags) added without the presence of the Mobile Device that are currently stored in a temporary location and not in the group item table. If the temporary table is empty then this is set to FALSE. FIG. 41 shows an example of a top level state diagram 4100. The top level state diagram 4100 includes a group init 4102 and a group event handler 4104. FIG. 42 shows an example relating to the group init 4102 of FIG. 41, including a Register Button Subscriptions 4200. FIG. 43 shows an example 4300 relating to the group event handler 4104 of FIG. 41, including a command event handler 4302, a button event handler 4304, a scan event handler 4306, a BLE child tag event handler 4308, and a BLE mobile device event handler 4310. FIG. 44 shows an example 4400 of CMD: group settings relating to the command event handler 4302 in FIG. 43. FIG. 45 shows an example 4500 of CMD: group calibrate relating to the command event handler 4302 in FIG. 43. FIG. 46 shows an example 4600 of CMD: group status relating to the command event handler 4302 in FIG. 43. FIG. 47 shows an example 4700 relating to the command event handler 4302 in FIG. 43. FIG. 48 shows an example 4800 relating to the button event handler 4304 in FIG. 43. FIG. 49 shows an example 4900 relating to the button event handler 4304 in FIG. 43. FIG. 50 shows an example 5000 relating to the scan event handler 4306 in FIG. 43. FIG. 51 shows an example 5100 relating to the BLE child tag event handler 4308 in FIG. 43. FIG. 52 shows an example 5200 of BLE mobile device: connect relating to the BLE mobile device event handler 4310 in FIG. 43. FIG. 53 shows an example of a BLE mobile device: disconnect event including a nothing event 5300 relating to the BLE mobile device event handler 4310 in FIG. 43.

Figure 54:
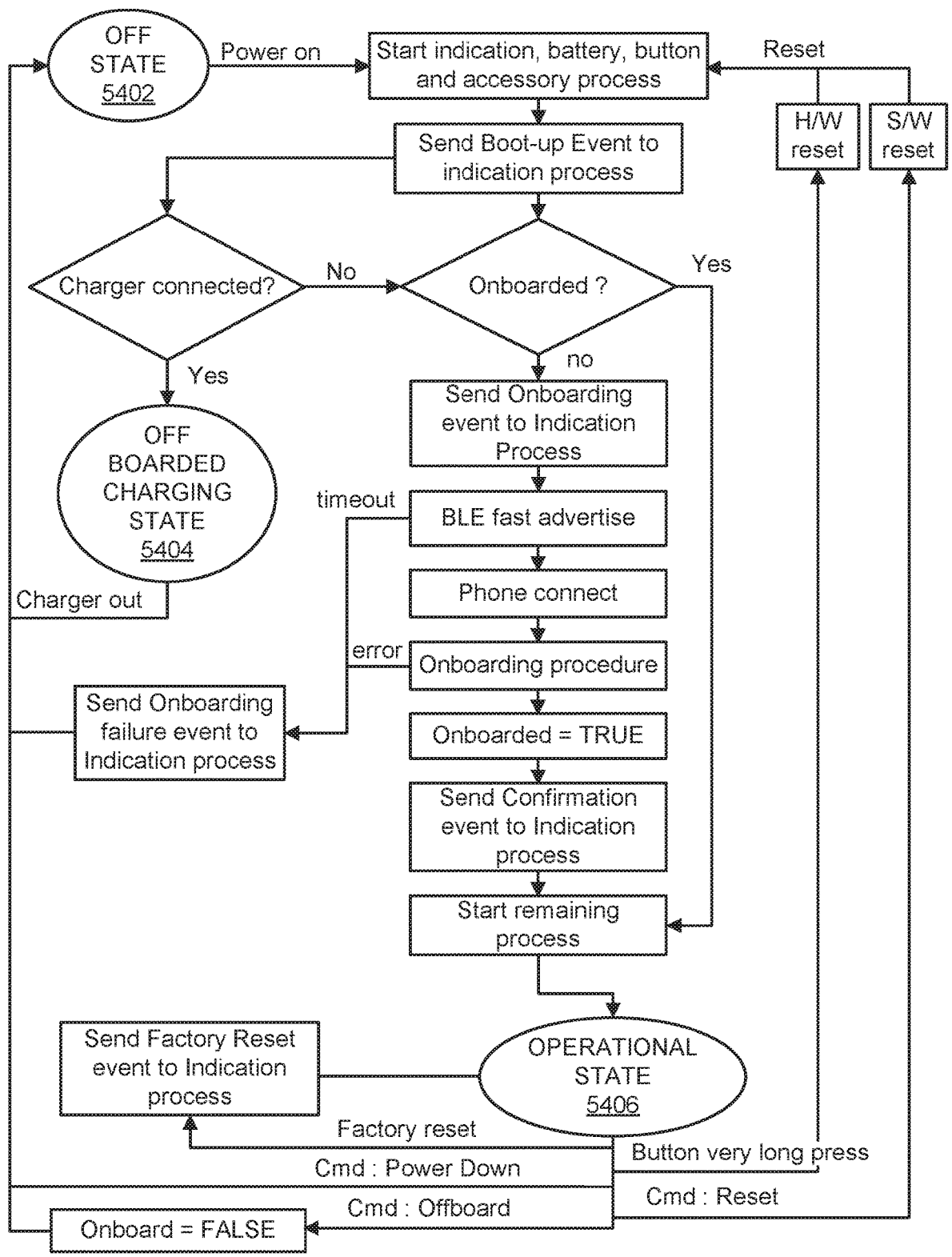
FIG. 54 shows an example of states.

The following sections relate to a main process. The main process is responsible for handling the:

Power on/off sequence
Power handling
Onboarding
Authentication
Location handling
Operational modes
Timer Event The following section relates to tag main states. FIG. 54 shows an example of states 5400. The tag may resume three main states. These are not only for the main process, and affect the entire system, but Main is the controlling thread during these phases and responsible for much of what needs to be performed during the state transitions.

An off state 5402 is the same as "shelf" mode (state). The battery will be disconnected with shelf logic and very little current will be consumed.

An off-boarded charging state 5404 is the state the tag enters when it is attached to the charger without have been on-boarded previously. Since the tag cannot distinguish between a button push and a charger attach event (both will trigger the HW to power up) this state is always entered if a charger is attached after power up.

In some implementations, this stage may always be reached after an onboarding attempt.

In some implementations, onboarding may start from this stage with a button press.

A normal operational state 5406 is entered once the tag has been on-boarded successfully and all processes are started. Once the main process enters the OPERATIONAL state it is ready to perform the task of the normal operational mode. The normal operational mode involves:

Power off and reset
Authentication
Handling of Locations
Handling of Operational modes
Handling of Time Events The internal API is made up of events that are queued from callers context to the process context. It is here to make the flow charts easier to understand later in the document, and also give a fuller picture of what events the process is supposed to be able handle:

CMD: Power OFF; This event comes from the Libnano process (command handler) and requests the Tag to go to OFF state.

CMD: Boot up Info Get; This event comes from the Libnano process (command handler) and requests the boot up information to be sent to the requester CMD: Boot up Info Reset; This event comes from the Libnano process (command handler) and requests the Tag to reset the Boot up information.

CMD: Location Set; This event comes from the Libnano process (command handler) and requests the Tag set its current location. The location is submitted in the argument field CMD: Time Event Create; This event comes from the Libnano process (command handler) and point to a Time-Event the should insert the time event list. The Time-Event data has already been written to the Time-Event table before the event is set to the process.

CMD: Time Event Delete; This event comes from the Libnano process (command handler) and requests the Tag remove the time event from the time event list.

ACC: Moving event; This event indicates that the Tag is moving. Sent from a callback that were submitted when subscribing to accelerometer events.

ACC: Resting event; This event indicates that the Tag is resting. Sent from a callback that were submitted when subscribing to accelerometer events.

Button: Reset sequence event; This event indicates that the button has been pressed 3 short time followed by a long press. The event is generated from a callback when subscribing to button events.

BLE: Mobile Device connect event; This event indicates that Mobile Device has connected. The event is generated from a callback that is registered in the startup of main. The callback is called every time a connection is made. If the connection is with a Mobile Device this event is sent.

BLE: Mobile Device disconnect event; This event indicates that Mobile Device has disconnected. The event is generated from a callback that is registered in the startup of main. The callback is called every time a device disconnects form the Tag. If the Mobile Device was connected this event is sent.

Timer: Location event; This event is sent when the location timeout timer expires. The event is generated from a timer callback that is submitted when initializing the timer.

Timer: Disconnecting event; This event is sent when the disconnecting timer expires. The event is generated from a timer callback that is submitted when initializing the timer.

Timer: Time-Event event; This event is sent when the Time Event timer expires. The event is generated from a timer callback that is submitted when initializing the timer.

Timer: Time-Event duration event; This event is sent when the Time duration timer expires. The event is generated from a timer callback that is submitted when initializing the timer.

An external API can involve functions exposed to other processes.

Figure 55:
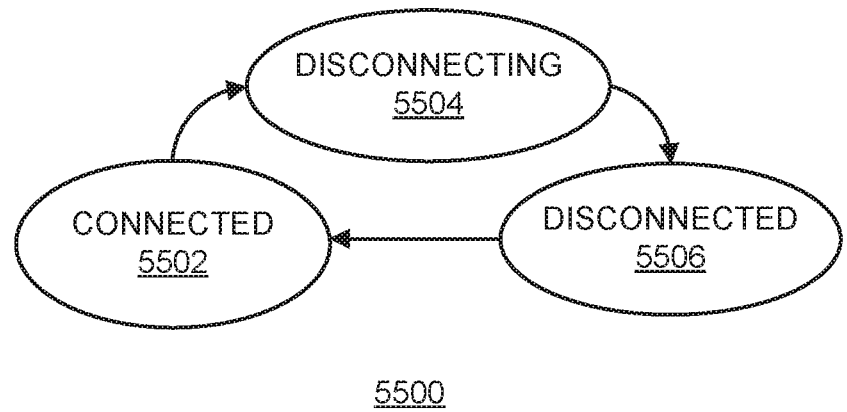
FIG. 55 shows an example of states.
Figure 56:
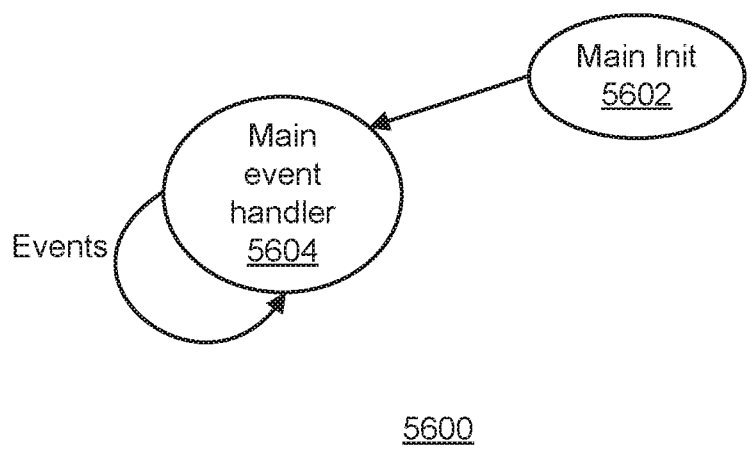
FIG. 56 shows an example of a top level state diagram including a main init and a main event handler.
Figure 57:
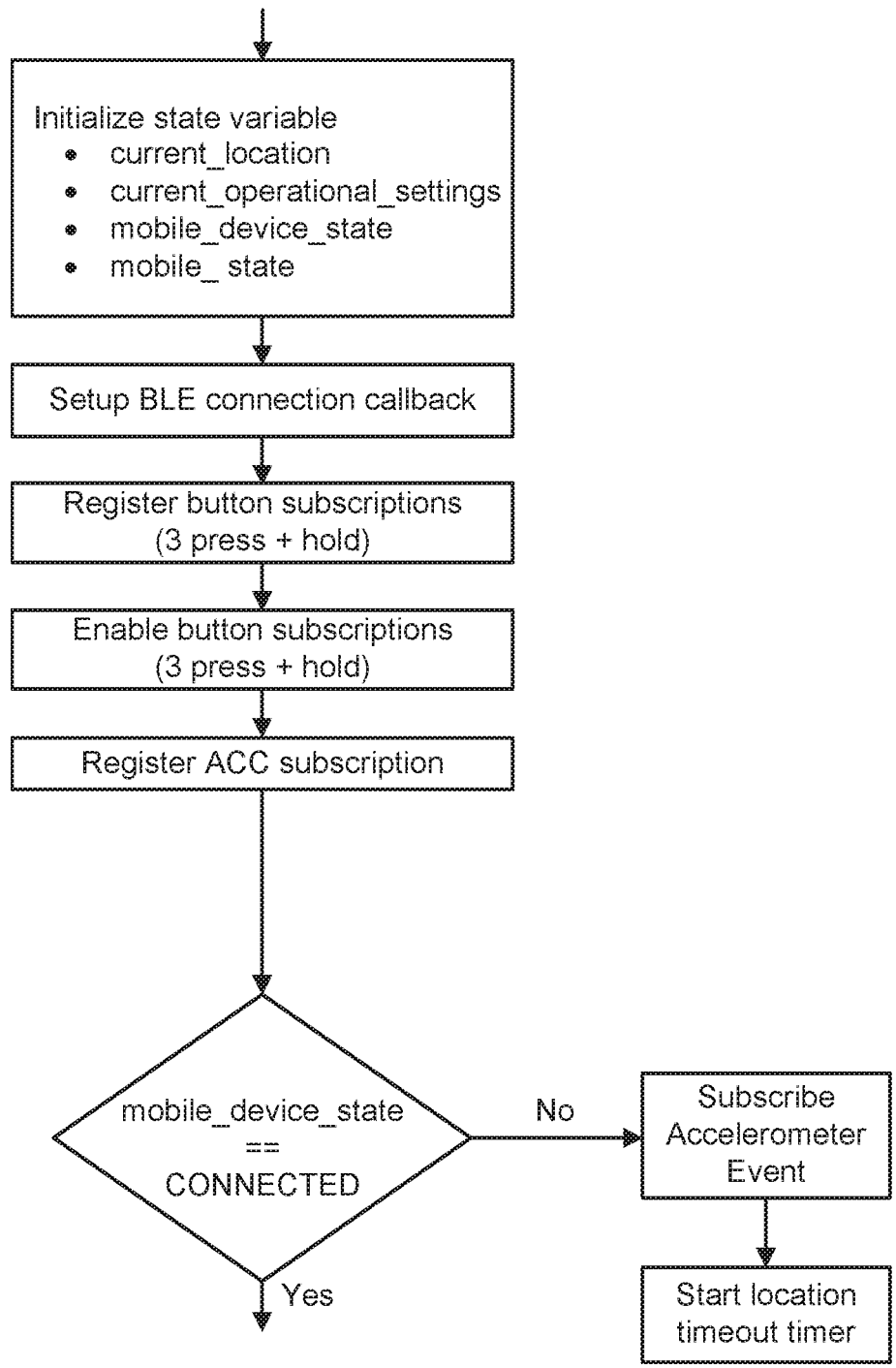
FIG. 57 shows an example relating to the main init of FIG. 56.
Figure 58:
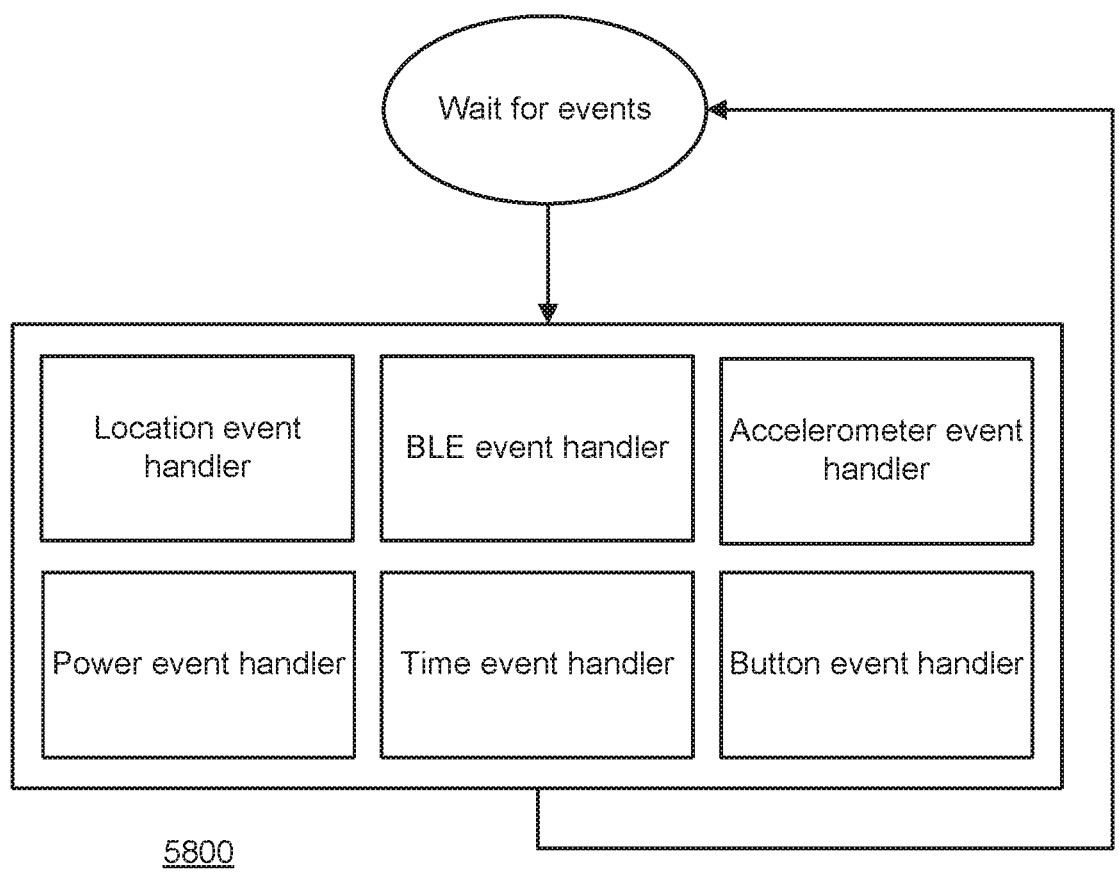
FIG. 58 shows an example relating to the main event handler of FIG. 56.

This process depends on:
Libnano process
Indication process
Button process
Accelerometer
Group process
Scan process State variables can include:
current_location, which holds an index to the current location setting
current_operational_settings: an operational setting that describes what advertising and alerts settings to have in different states
mobile_device_state, which shows the state of the Mobile Device connection with the Tag. FIG. 55 shows an example 5500 of states. In some implementations, it can resume three states—Connected 5502, Disconnecting 5504, and Disconnected 5506. The reason for having the disconnecting state is because it can be used it for changing advertising parameters and alert settings.
motion_state, which indicates if the Tag is moving or resting FIG. 56 shows an example of a top level state diagram 5600 including a main init 5602 and a main event handler 5604. FIG. 57 shows an example 5700 relating to the main init 5602 of FIG. 56. FIG. 58 shows an example 5800 relating to the main event handler 5604 of FIG. 56.

Figure 59:
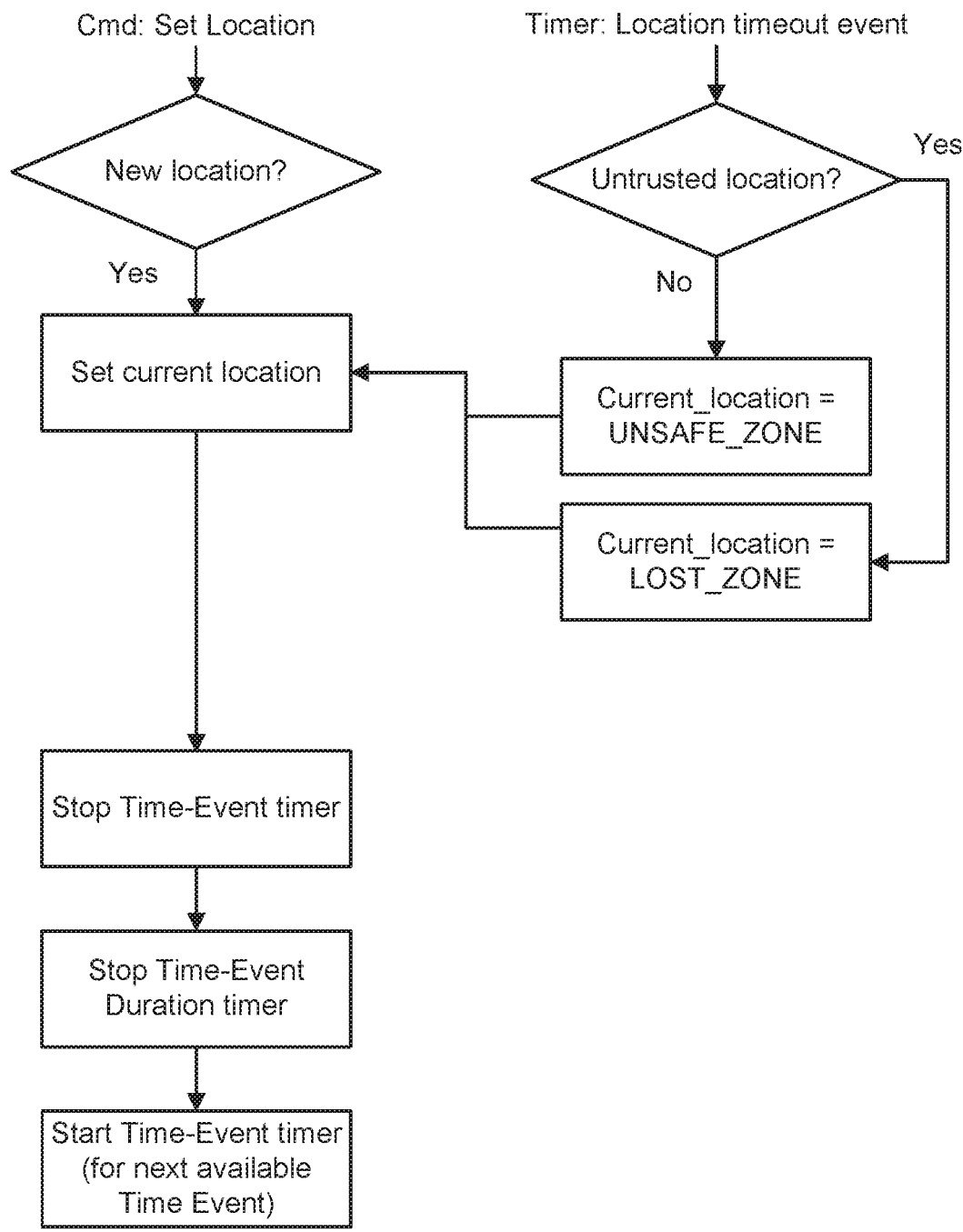
FIG. 59 shows an example of a location event handler.

FIG. 59 shows an example of a location event handler 5900.

Figure 60:
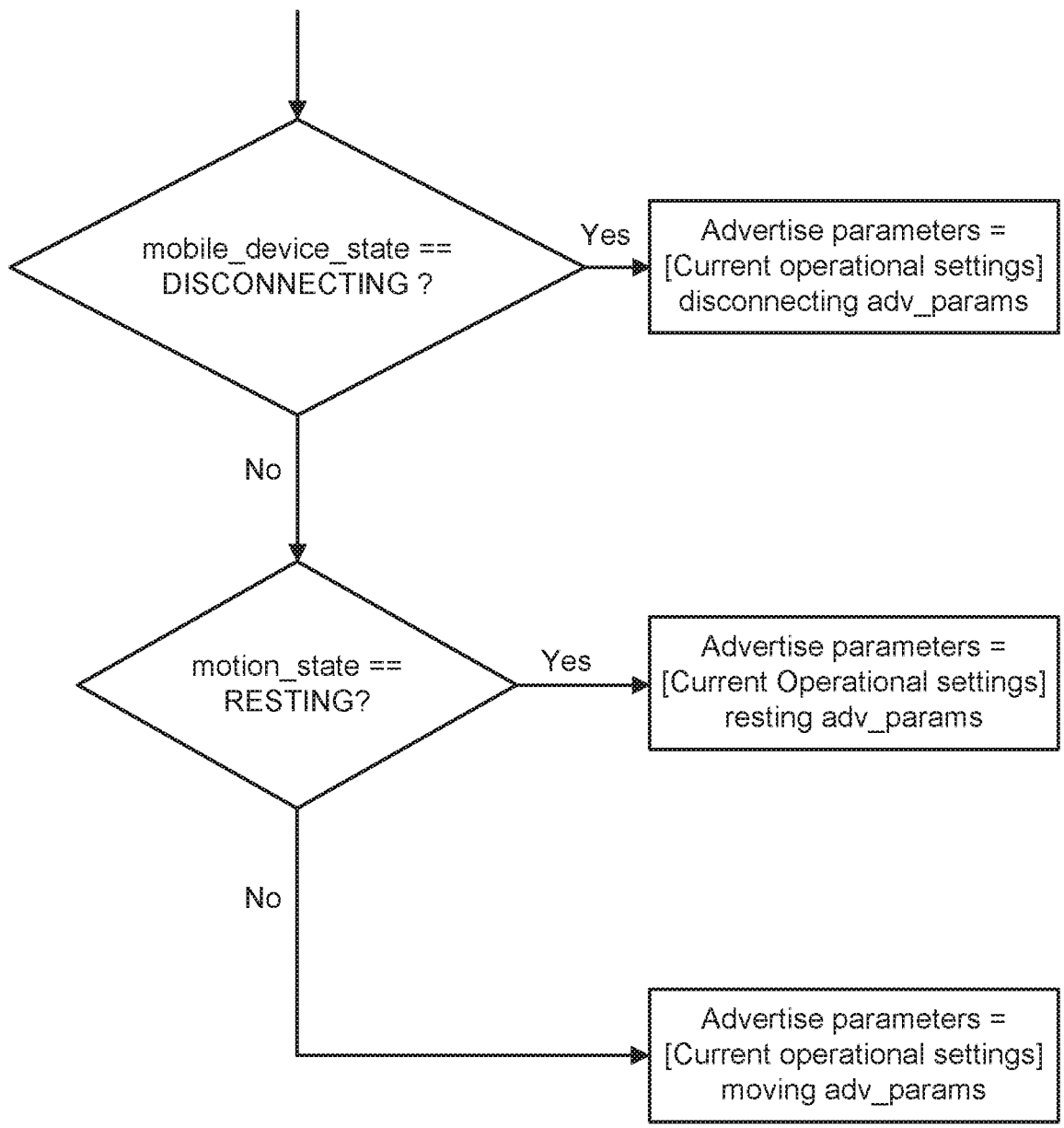
FIG. 60 shows an example of setting advertisement parameters.

FIG. 60 shows an example 6000 of setting advertisement parameters.

Figure 61:
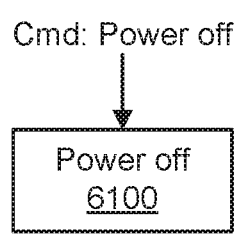
FIG. 61 shows an example relating to a power off of a power event handler.

FIG. 61 shows an example relating to a power off 6100 of a power event handler.

Figure 62:
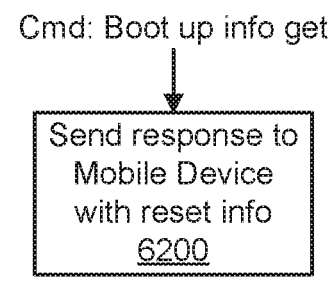
FIG. 62 shows an example relating to a send response of a power event handler.

FIG. 62 shows an example relating to a send response 6200 of a power event handler.

Figure 63:
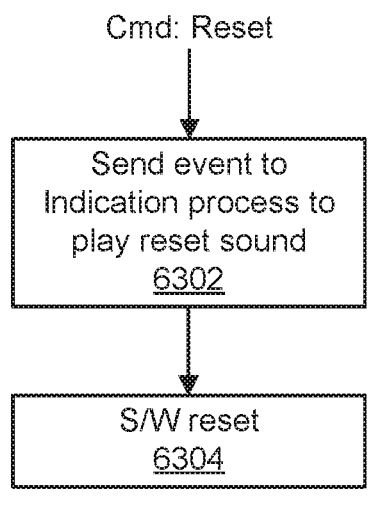
FIG. 63 shows an example relating to a send event and a S/W reset of a power event handler

FIG. 63 shows an example 6300 relating to a send event 6302 and a S/W reset 6304 of a power event handler.

Figure 64:
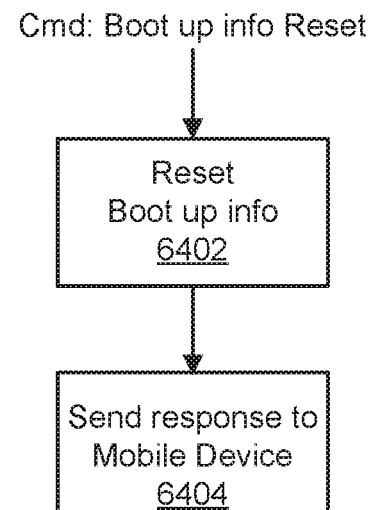
FIG. 64 shows an example relating to a reset and a send response of a power event handler.

FIG. 64 shows an example 6400 relating to a reset 6402 and a send response 6404 of a power event handler.

Figure 65:
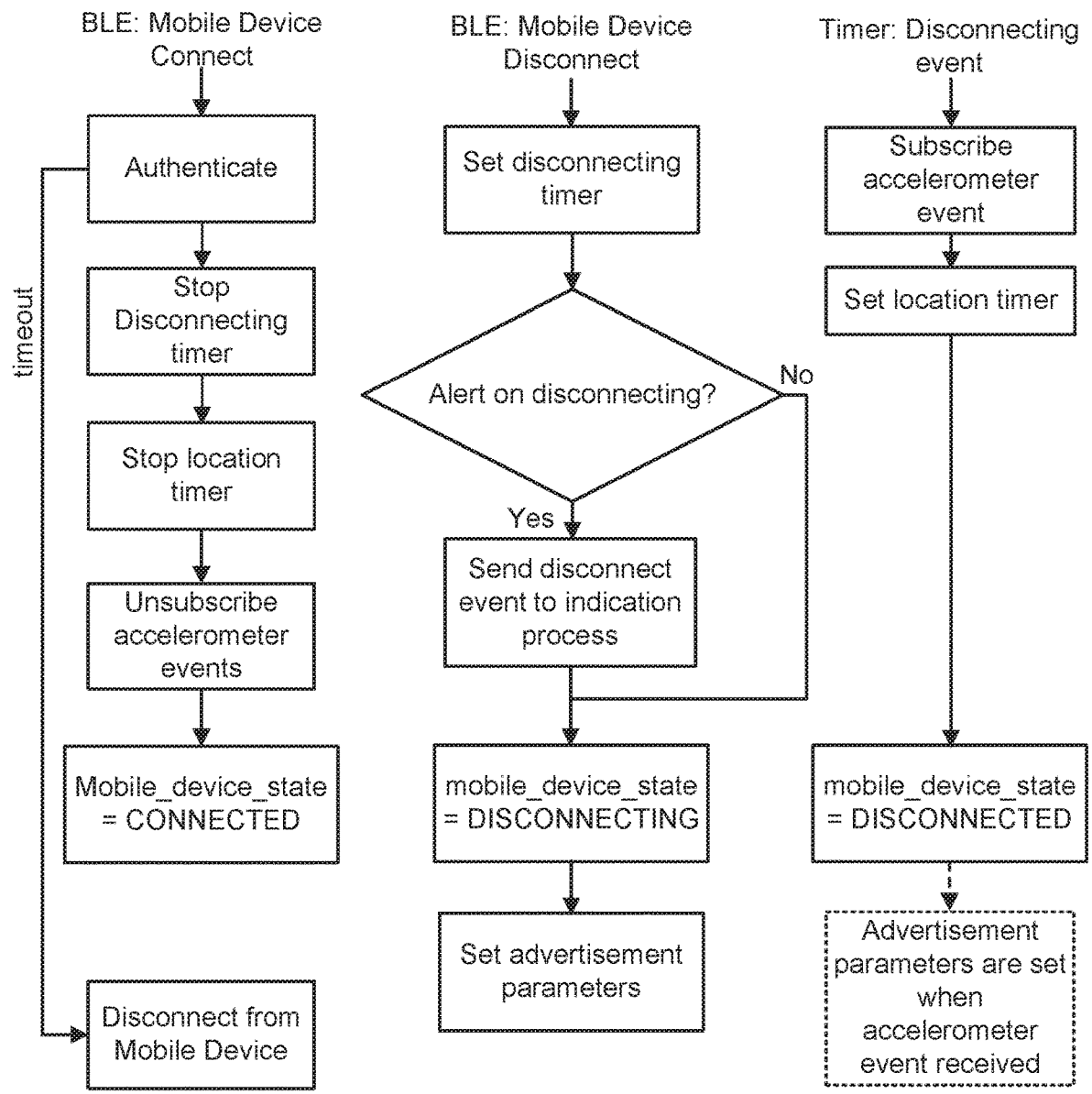
FIG. 65 shows an example relating to a connection event handler.

FIG. 65 shows an example 6500 relating to a connection event handler.

Figure 66:
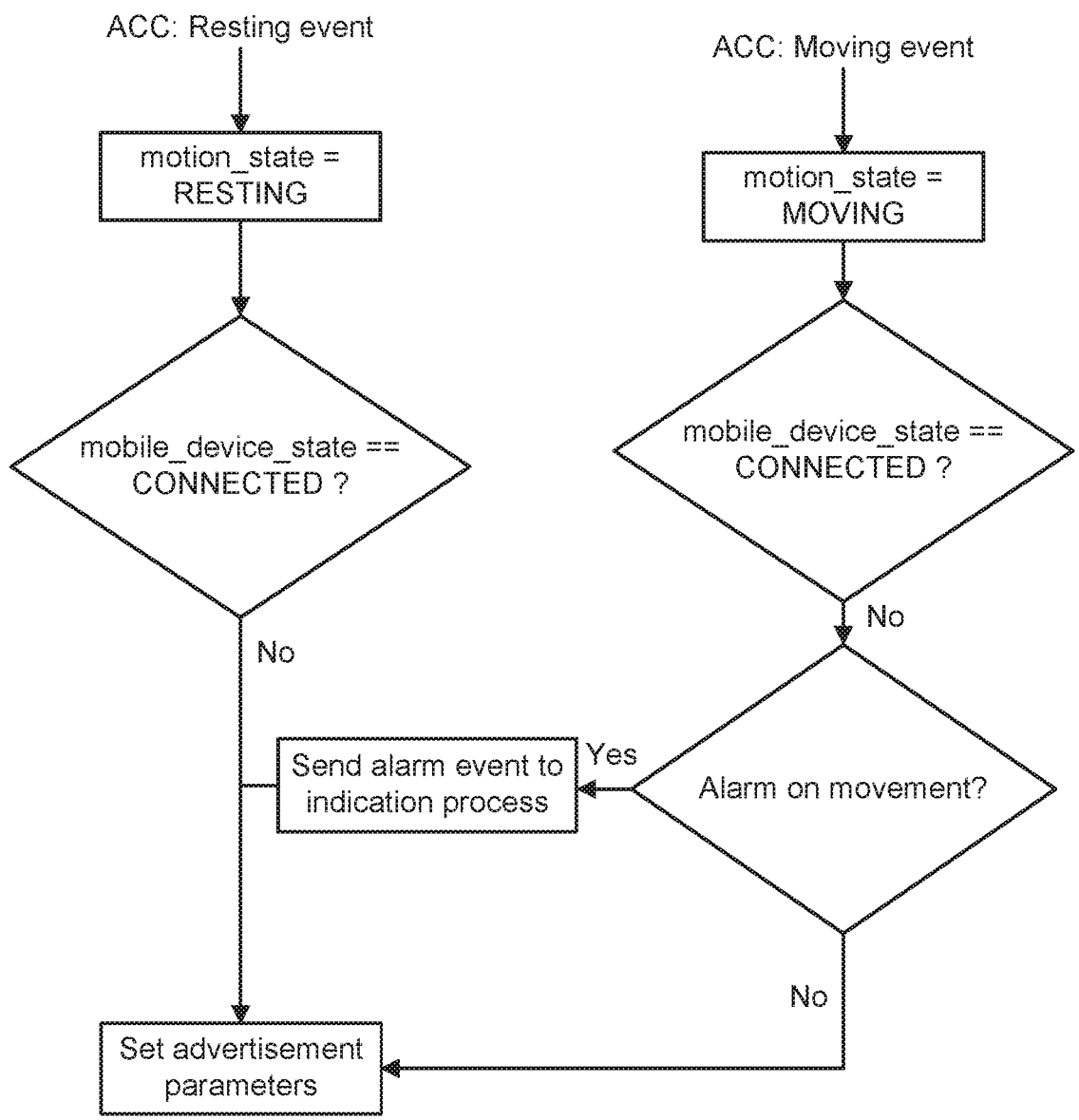
FIG. 66 shows an example relating to an acceleration event handler.

FIG. 66 shows an example 6600 relating to an acceleration event handler.

Figure 67:
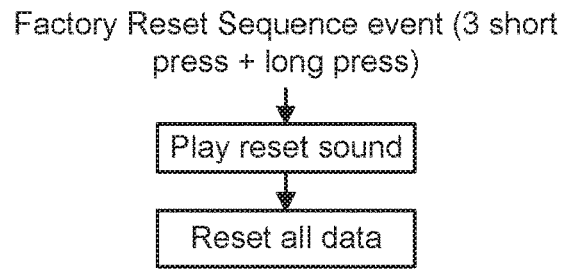
FIG. 67 shows an example relating to a button event handler.

FIG. 67 shows an example 6700 relating to a button event handler.

Figure 68:
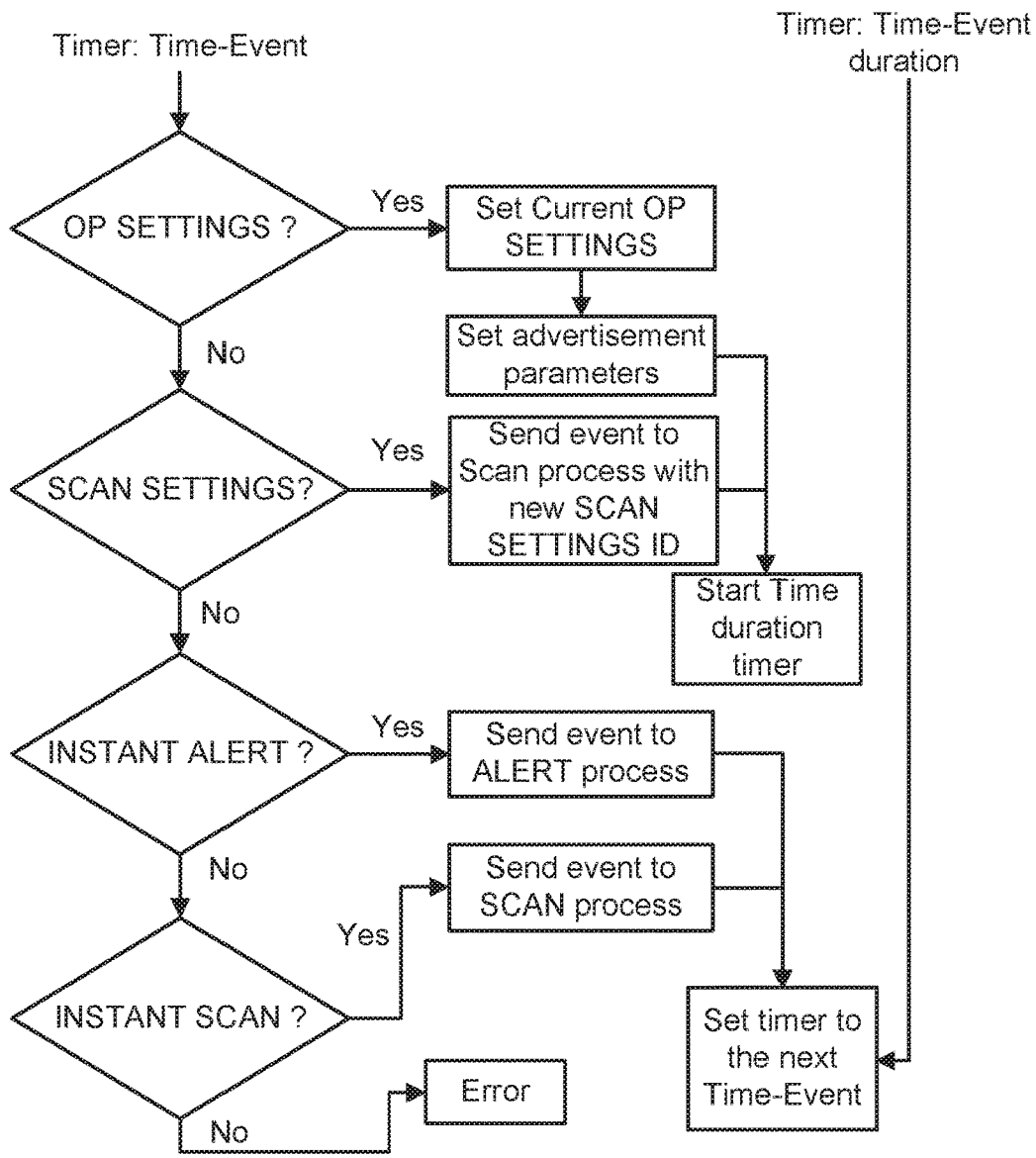
FIG. 68 shows an example relating to a button event handler.

FIG. 68 shows an example 6800 relating to a button event handler.

FIG. 69 shows an example 6900 relating to a time event handler.

FIG. 70 shows an example 7000 relating to a time event handler.

The following sections relate to an indication process. The indication process is responsible for:
Receiving indication events from other processes in the system.
Send out light and sound patterns based on the type of indication.
Prioritization of indication events in case one or more overlap.
Responsible for the alert, sound and light tables.
Handle enabling/disabling command for sound and light.

The internal API is made up of events that are queued from caller's context to the process context. It is here to make the flow charts easier to understand later in the document, and also give a fuller picture of what events the process is supposed to be able handle:

Sound Enable/Disable Event; This event comes from the Libnano process (command handler) and tells the indication process that the enable/disable sound settings has changed. The indication process will the read the setting and perform the appropriate action.

Light Enable/Disable Event; This event comes from the Libnano process (command handler) and tells the indication process that the enable/disable Lights settings has changed. The indication process will the read the setting and perform the appropriate action.

Start Alert Event; This event may come from any process that needs to start indicating something. The alert duration tells for how long the alarm should sound. If set to 0 it will use the default duration. The flags field will indicate special properties, e.g., if the indication should be allowed to be ended with a button press.

Stop Alert Event; This event may come from any process that needs to stop indicating. The flags field will indicate special properties e.g. if the stop is for only this alarm, all alarms, from this process, from all processes.

Button: Short press event; This event indicates that the button has been short-pressed. The event is generated from a callback when subscribing to button events.

Timer: Sound duration event; This event is sent when the Periodic duration timer expires. The event is generated from a timer callback.

Timer: Tone duration event; This event is sent when the Periodic duration timer expires. The event is generated from a timer callback.

Timer: Light duration event; This event is sent when the Periodic duration timer expires. The event is generated from a timer callback.

Timer: Color duration event; This event is sent when the Periodic duration timer expires. The event is generated from a timer callback.

The following sections relate to an external API. An external API can include Indication_proc_start_alert (alert_t, alert_duraton_t, alert_callers_id_t, flags_t).

A Start Alert Event to process can have the following arguments:
Alert—This specifies what type of alert it is. The implementer must specify a list (enum) of all possible alerts. This should be taken from a HW interaction description or other description of the sound and light patterns. This alert will point into the alert table, that further points into the sound and light table.
Alert duration—This describes for how long the alert will sound or light up. The alert table may also have a duration argument per alert. There may be use cases when the alert duration is needed. If this field is not 0 then it will override the duration setting in the alert table.
Alert callers Id—This field is used to identify the caller, so that a caller can stop his alert if necessary. Since alerts will have priorities this is important to know.

Flags—Current flags can be:
STOP_ON_BUTTON_PRESS: This allows the indication process to receive button indications and stop the alert on that.
HIGHEST_PRIORITY: If this flag is set the alert will interrupt any other ongoing alert.

An internal API can include Indication_proc_stop_alert (alert_t, alert_callers_id_t, flags_t. A send Stop Alert Event to process can have the following description. The system may be designed so that other processes should not have to stop their alert. The normal way of stopping an alert will be that the indication process subscribes on a button interrupt that stops the alert. There are some cases when a stop alert may be generated via this function e.g. when the stop command comes a Mobile Device/Hub (may be other use cases as well).

The following arguments can be used:
Alert—Specific alert to stop
Alert callers ID—Specifies the caller's id. If the caller has started a previous alert this is used to identify that specific alert.
Flags—Current flags are:
STOP_ALL_ALERTS
STOP_CALLERS_ALERT
STOP_SPECIFIC_ALERT
This process depends on:
Libnano process
Button process The following section relates to internal handling. Except for the state, the following can be defined:
List of possible Alerts—A list (enum) of all possible alerts can be specified. This should be taken from a HW interaction description or another description of the sound and light patterns. This alert will point into the alert table, that further points into the sound and light table.
Alert table—The structure of the alert table can be defined and populated for all possible alerts. The alert structure will contain:
Sound Pattern Index (or pointer)
Sound Duration
Light Pattern Index (or pointer)
Light Duration
Alert priority
Sound table(s)
It can be defined whether sound should be stored in one table or many small tables. It should be taken into account that requirements for user programmable sounds may come in the future and that the structure should be easy to extend without having to change much.
The structure of the sound table can be defined, and how data is organized and what special characters (tokens are used).
Light table(s)
It can be defined whether light should be stored in one table or many small tables. It should be taken into account that requirements for user programmable sounds may come in the future and that the structure should be easy to extend without having to change much.
The structure of the light table can be defined, and how data is organized and what special characters (tokens are used).
Alert Priority handling
Every alert will have a priority set to it. This specifies the priority in case several alerts happens at the same time. The alert with the highest priority has precedence. In case of same priorities it should be the last received alert that has precedence.

In some implementations, an alert that has been interrupted may be able to restart. If alerts are interrupted or cannot be started because of higher priority they can be saved temporarily.

State variables are indication_ongoing and current alert priority.

Figure 73:
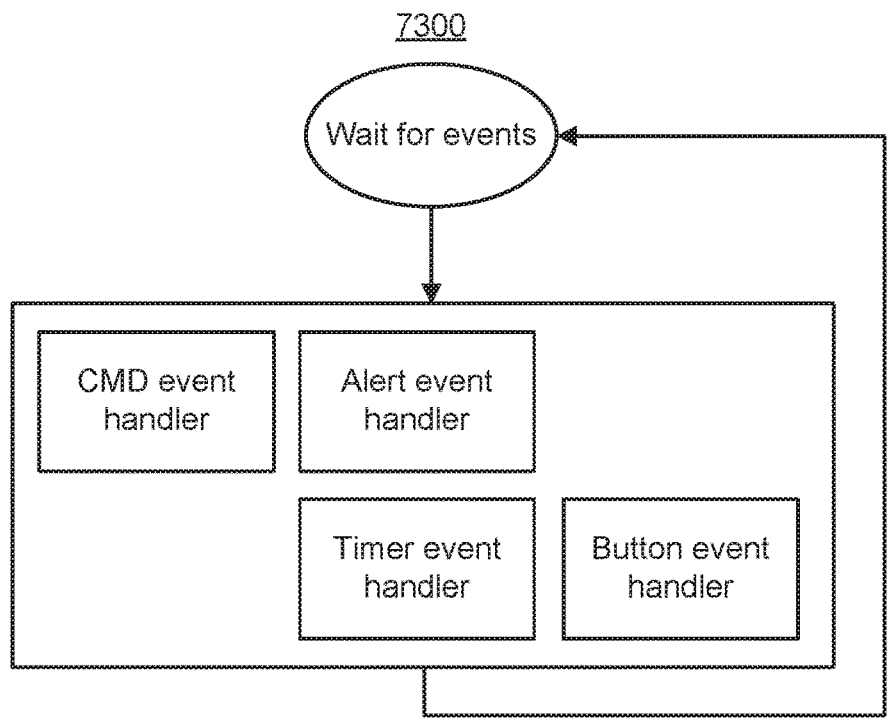
FIG. 73 shows an example relating to the indication event handler of FIG. 71.

FIG. 71 shows an example of a state diagram 7100 including an indication init 7102 and an indication event handler 7104. FIG. 72 shows an example 7200 relating to the indication init 7102 of FIG. 71. FIG. 73 shows an example 7300 relating to the indication event handler 7104 of FIG. 71.

Figures 74, 75:
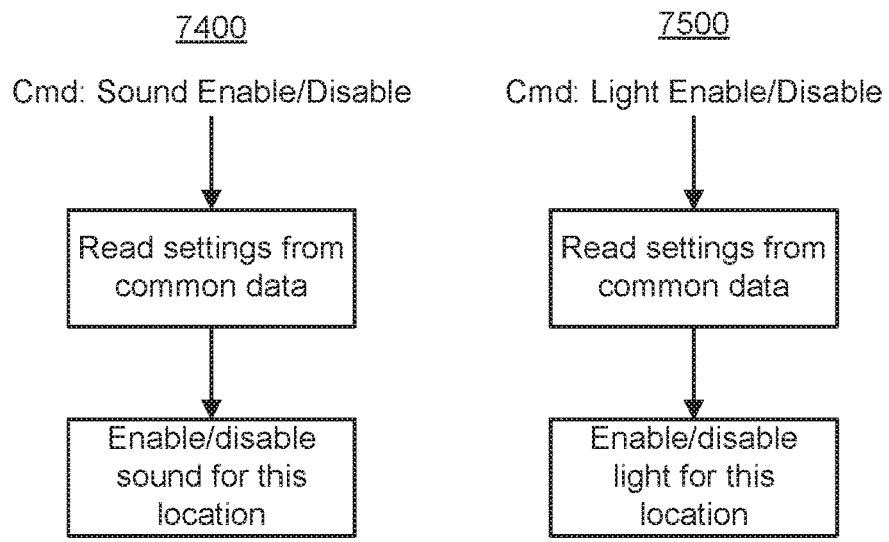
FIG. 74 shows an example relating to Cmd: Sound Enable/Disable of a CMD event handler.
FIG. 75 shows an example relating to Cmd: Light Enable/Disable of a CMD event handler.

FIG. 74 shows an example 7400 relating to Cmd: Sound Enable/Disable of a CMD event handler.

FIG. 75 shows an example 7500 relating to Cmd: Light Enable/Disable of a CMD event handler.

Figure 76:
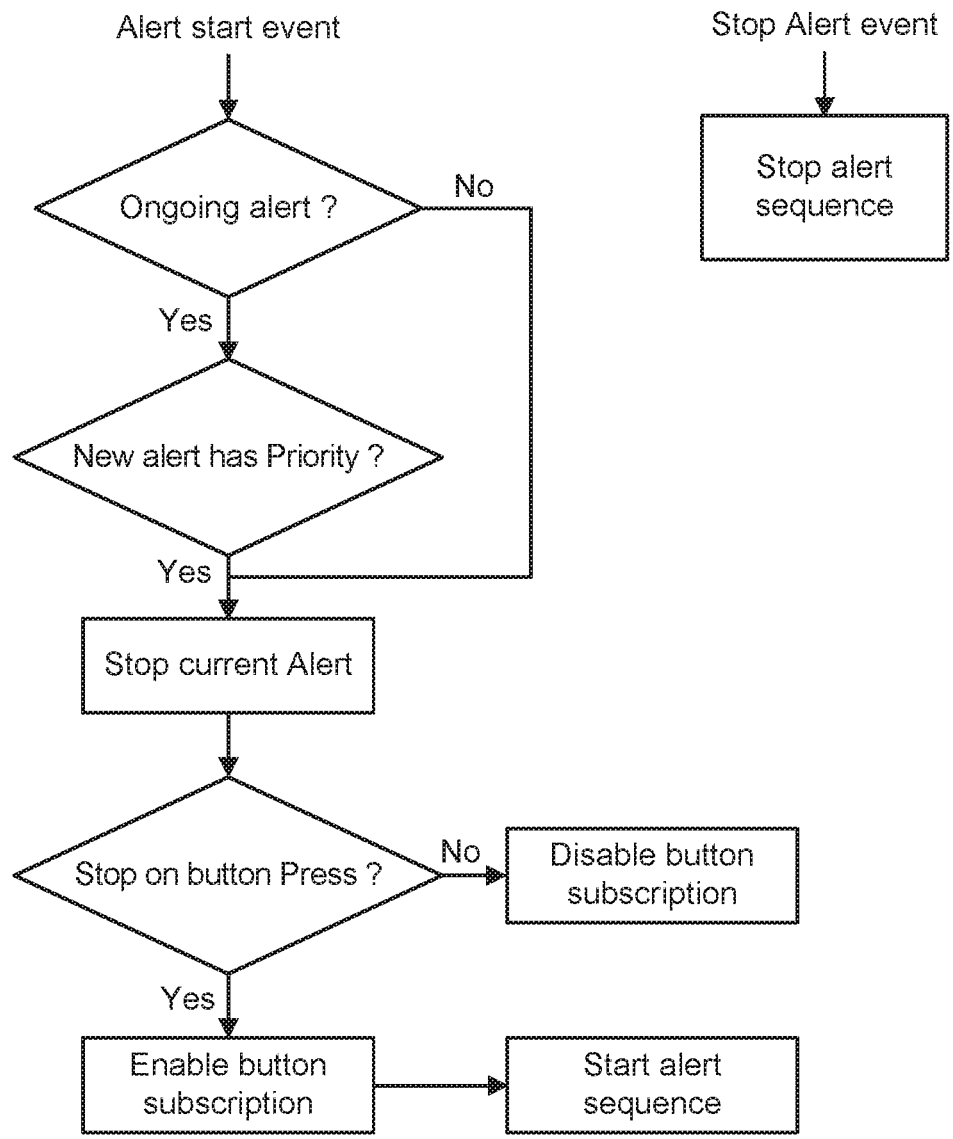
FIG. 76 shows an example relating to an alert event handler.

FIG. 76 shows an example 7600 relating to an alert event handler.

Figure 77:
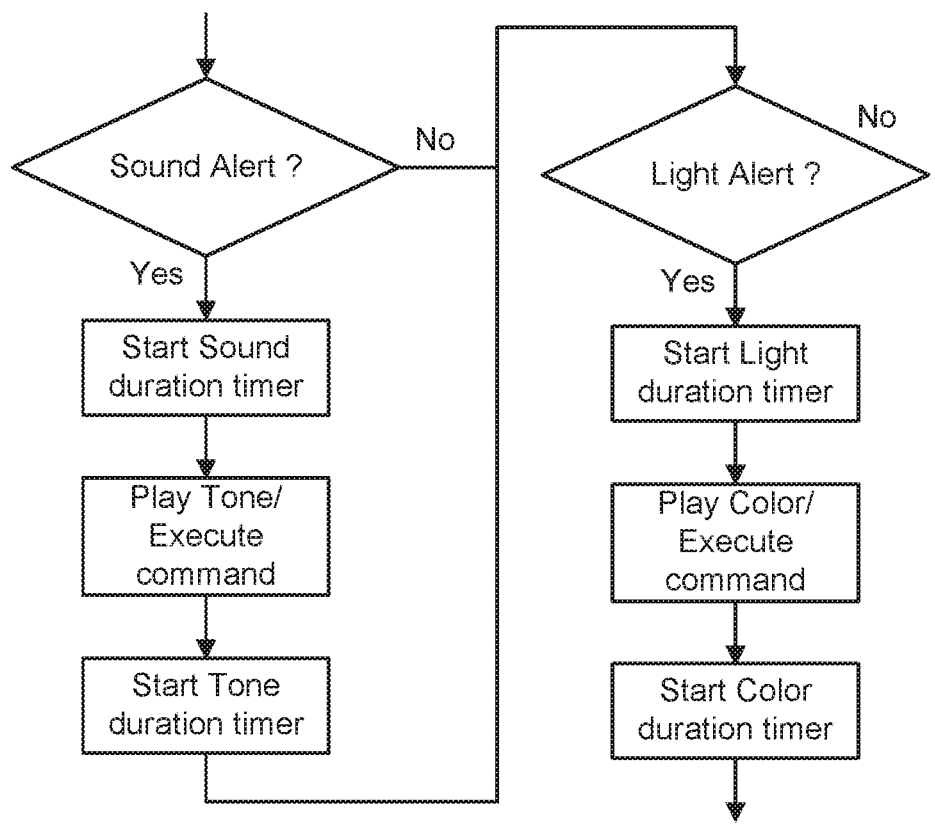
FIG. 77 shows an example relating to a start alert sequence.

FIG. 77 shows an example 7700 relating to a start alert sequence.

Figure 78:
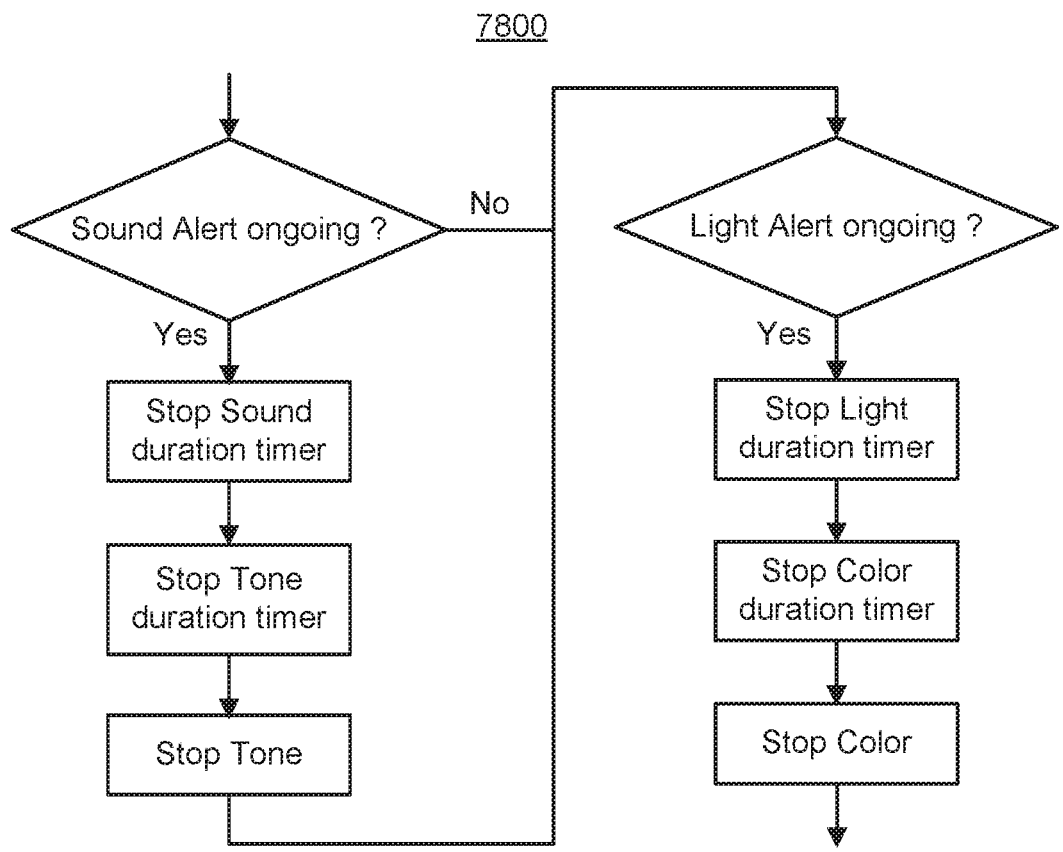
FIG. 78 shows an example relating to a stop alert sequence.

FIG. 78 shows an example 7800 relating to a stop alert sequence.

Figure 79:
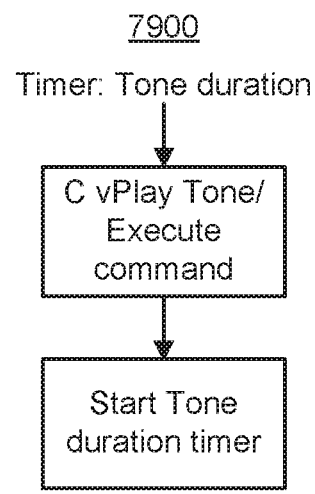
FIG. 79 shows an example relating to a timer event handler.

FIG. 79 shows an example 7900 relating to a timer event handler.

Figure 80:
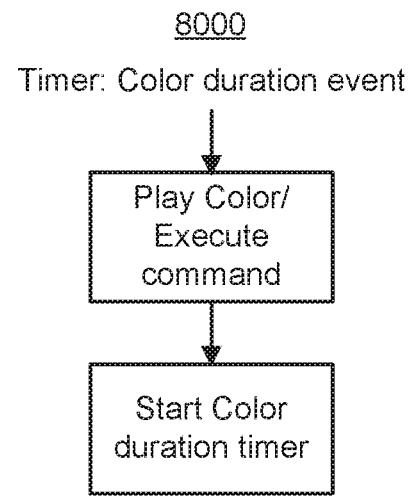
FIG. 80 shows an example relating to a timer event handler.

FIG. 80 shows an example 8000 relating to a timer event handler.

Figure 81:
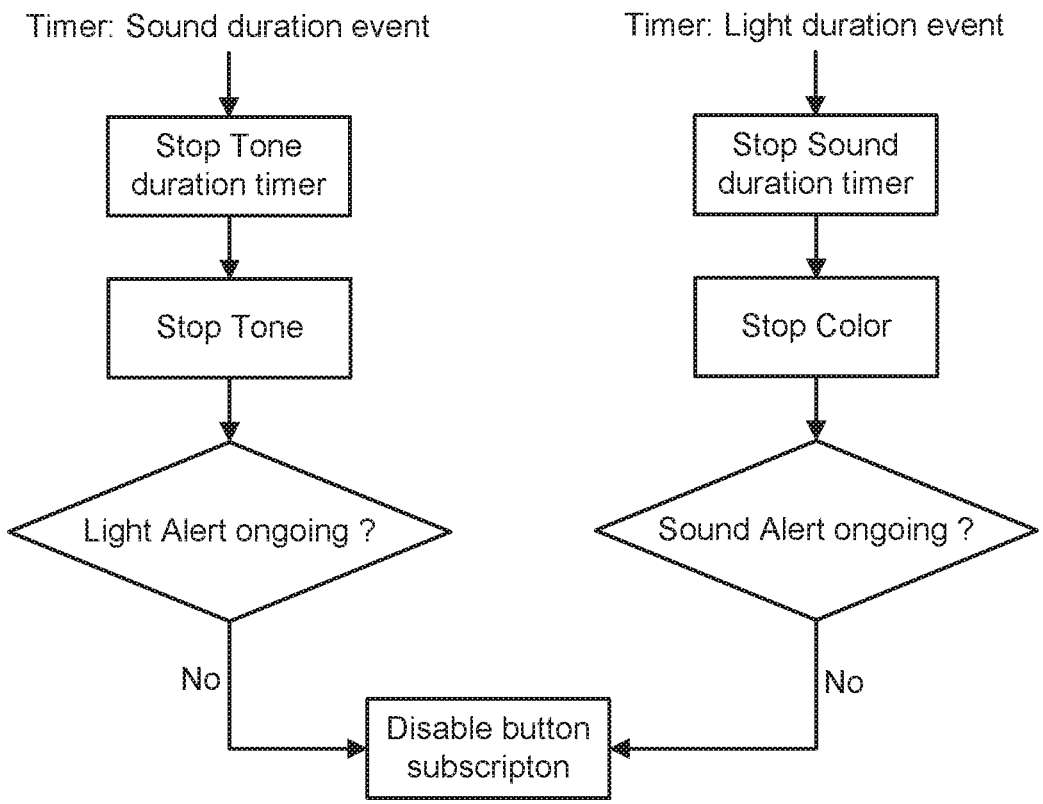
FIG. 81 shows an example relating to a timer event handler.

FIG. 81 shows an example 8100 relating to a timer event handler.

Figure 82:
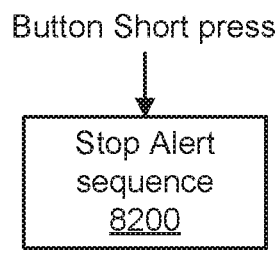
FIG. 82 shows an example relating to a button event handler involving a stop alert sequence.

FIG. 82 shows an example relating to a button event handler involving a stop alert sequence 8200.

The following sections relate to a button process. The button process is responsible for:
Receiving button sequence subscription requests from other processes in the system.
Dynamically enabled/disabled the subscriptions.
Interpret button presses as a sequence of long and short presses, and invoke callbacks to subscribers if the correct sequence is matched.

The internal API is made up of events that are queued from callers context to the process context. It is here to make the flow charts easier to understand later in the document, and also give a fuller picture of what events the process is supposed to be able handle:
Subscription enable event: This event enables an already registered button subscription. The event may be generated only by a process that has already registered a subscription with the button process.
Subscription disable event: This event disables an already registered button subscription. The event may be generated only by a process that has already registered a subscription with the button process.
GPIO Interrupt: button event; This event indicates that a GPIO interrupt has happened. The event is generated from a callback when subscribing to GPIO events.
Timer: Debounce event: This event is sent when the debounce timer expires. The event is generated from a timer callback.
Timer: Multi-press event; This event is sent when the Multi-press timer expires. The event is generated from a timer callback.

An external API can include
button_proc_subscription_register(
button_subscription_ref_t*,
button_sequence_t, button_sequence_lengh_t,
button_sequence_priority_t,
button_flags_t,
(*call_back) ( )))

This will register a callback within the button process for a given button sequence. Arguments can include:
button_subscription_ref—An 8 bit handle that identifies this subscription.
button_sequence—An unsigned integer where '1' represents a short press and '1' a long press.
button_sequence_lenght—An integer saying how long the button sequence is
button_priority—To avoid confusion only one sequence will trigger exactly one call callback. If there are more subscriptions for the same pattern this is used to tell what callback to invoke.
button_flags—Can be of the following types: BUTTON_IMMEDIATE_RESPONSE—used when the subscriber needs a response as soon as the sequence has been matched, this means that longer sequences with the same starting patter will not trigger.
call_back—When the correct sequence is matched the call back function is invoked if the subscription has been enabled. Default state is disabled. This function executes in the callers context.

A button_proc_subscription_enable(button_subscription_ref_t) sends Subscription enable event to process.

A button_proc_subscription_disable(button_subscription_ ref_t) sends Subscription disable event to process.

This process has no dependencies.

The following section relates to internal handling. With GPIO Interrupt Callback, whenever a button interrupt is triggered the callback handler for this event will first disable the interrupts for the button before sending an event to the button process. The button GPIO interrupt is later read and enabled from within the process context.

Figure 83:
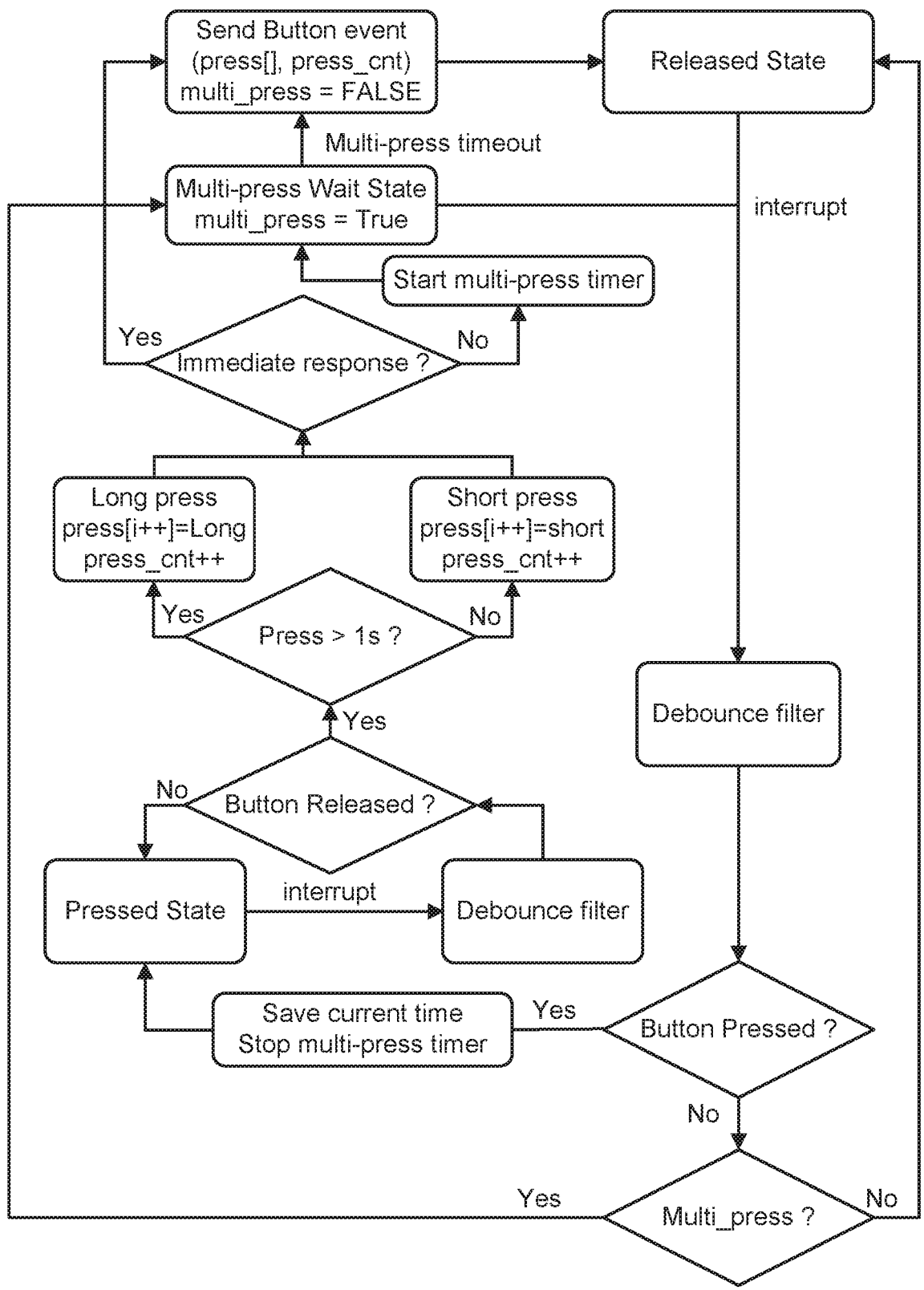
FIG. 83 shows an example of a state diagram.

FIG. 83 shows an example of a state diagram 8300. This is what a state-flow diagram of the button may look like. The reason for this is just to give an overview to better understand the way the flow charts are drawn. In some implementations, three main states can be used:
Released State: In this this state the system can wait for a button press
Pressed state: In this this state the system can wait for a button release
Multi-press Wait: The system can wait to see if there are any more button presses coming. This is to be able to detect button sequences. If a subscription for an already matched sequence have the immediate response flag set this state is bypassed.

Figure 84:
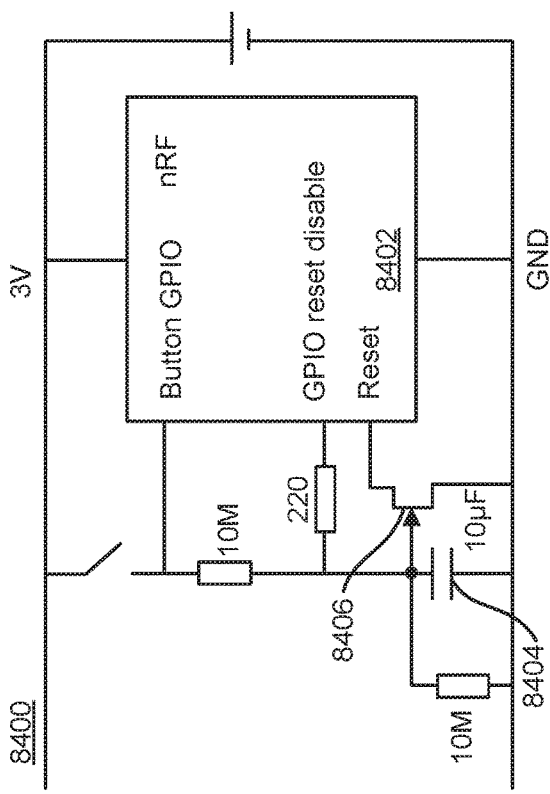
FIG. 84 shows an example of a circuit.

The following section relates to button reset logic. FIG. 84 shows an example of a circuit 8400. There is a HW reset logic 8402 connected to the button. If the button is pressed for a long time it will automatically reset the HW. It is designed in a way that every time the button is pressed it slowly charges a capacitor 8404 and when reaching the threshold level of a transistor 8406 it resets the SoC (nRF).

This is a function that is more or less necessary since the system uses a rechargeable battery that cannot be removed to power cycle the device. Also when a HW WD (watch dog) is used this function may be vital in case the system faults in a way where it is partly functioning but the user cannot connect to it.

Potential problems: The logic may also bring problem with it. The button reset times may vary, depending on temperature (and other parameters), and the size of the capacitor cannot be any larger due to the small design. In some implementations, the HW reset will trigger after about 6 seconds after the button has been pressed. The user may because of this accidently reset the device.

Solution: Some simple logic can be added that can disable the HW reset at any time, and this can be enabled whenever the tag is attached to a charger. To do that a GPIO pin (GPIO reset disable) was added that can "discharge" the capacitor at any time. It take (R×C)=10 uF×220=2.2 ms to discharge to ≈36.8% of initial voltage. By waiting 5 ms this can come down to around 10%.

The firmware will at every button press set a timer to about 2-3 seconds. When this timer expires the button process will request information from the accessory process to see if a charger is attached. If not, the FW will quickly enable the "reset enable pin" to discharge the capacitor. This is repeated in case the button is held for a longer time. In the case where a charger is present nothing is done, and the tag will after some time reset.

State variables can include Button_state—in the flow charts these are just named state and indicate the 3 states described above.

Figure 86:
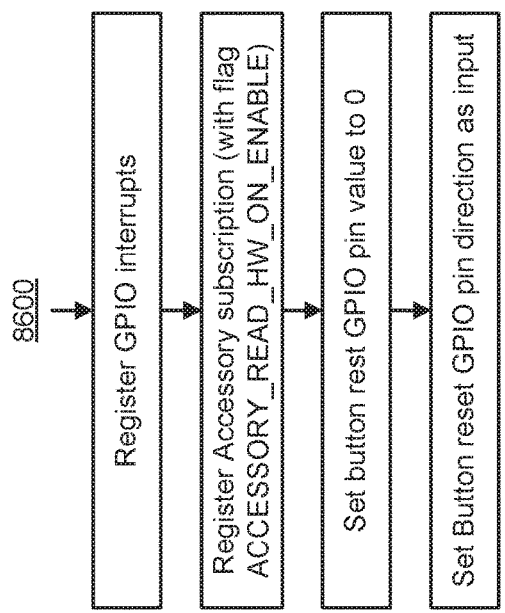
FIG. 86 shows an example relating to the button init of FIG. 85.
Figure 87:
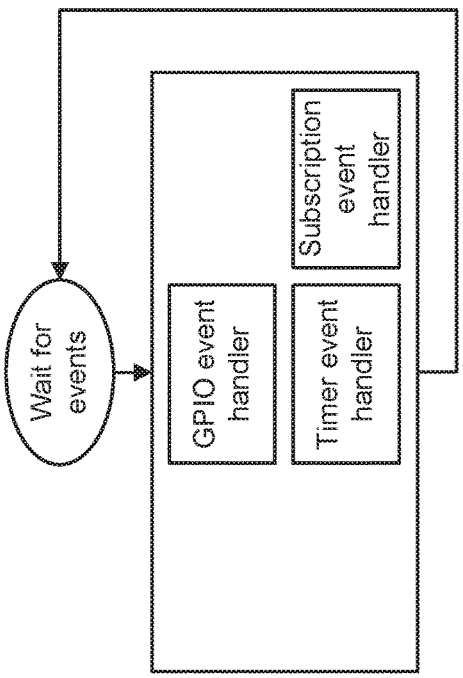
FIG. 87 shows an example relating to the button event handler of FIG. 85.
Figure 85:
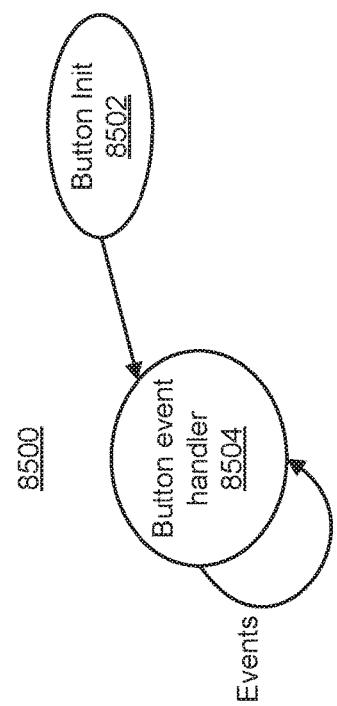
FIG. 85 shows an example of a top level state diagram including a button init and a button event handler.

FIG. 85 shows an example of a top level state diagram 8500 including a button init 8502 and a button event handler 8504. FIG. 86 shows an example 8600 relating to the button init 8502 of FIG. 85. FIG. 87 shows an example 8700 relating to the button event handler 8504 of FIG. 85.

Figure 88:
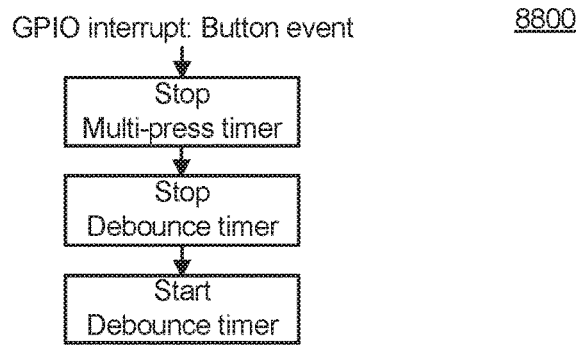
FIG. 88 shows an example relating to a GPIO event handler.

FIG. 88 shows an example 8800 relating to a GPIO event handler.

Figure 89:
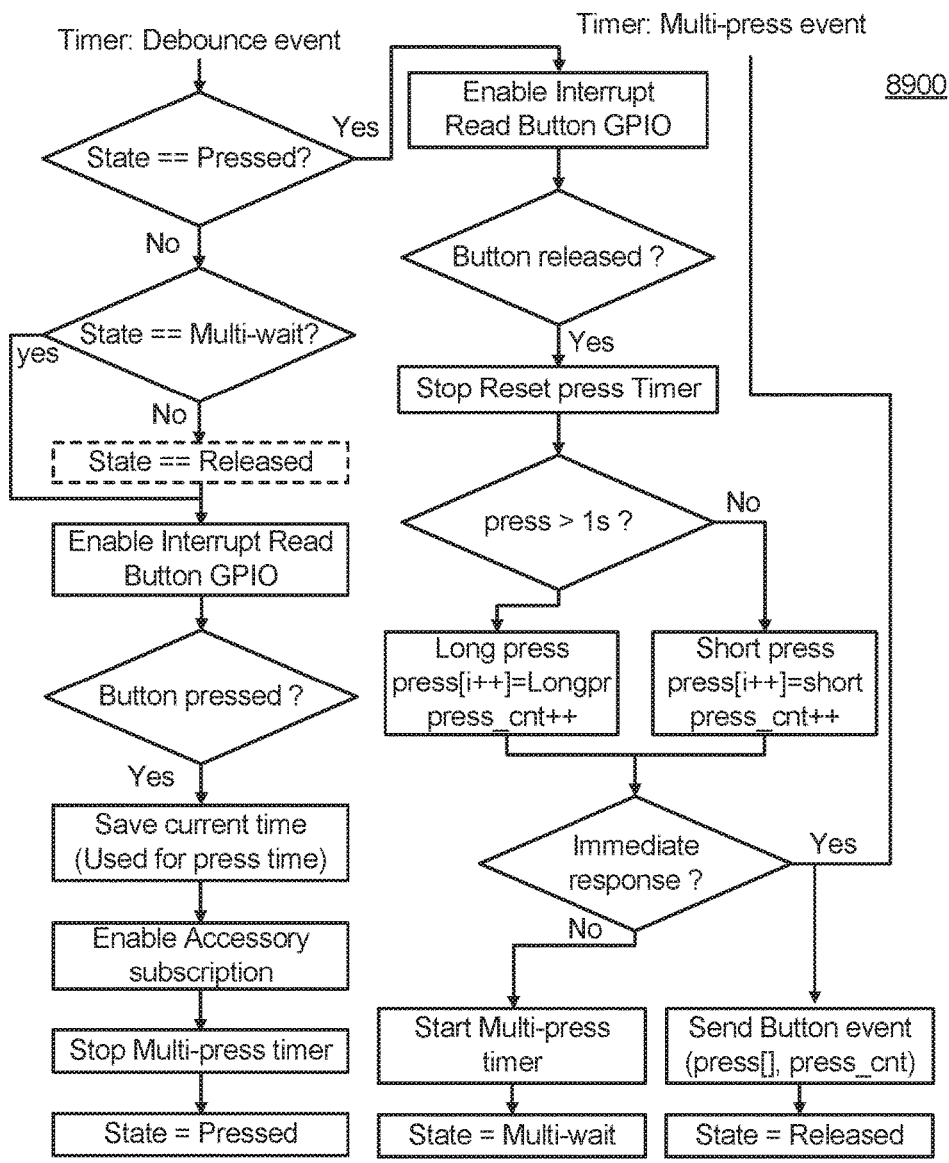
FIG. 89 shows an example relating to a timer event handler.

FIG. 89 shows an example 8900 relating to a timer event handler.

Figure 90:
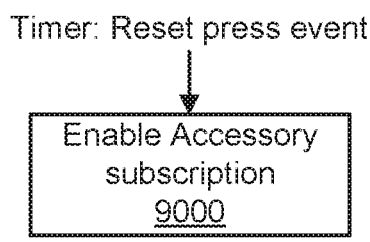
FIG. 90 shows an example relating to a button reset event handler involving an enable accessory subscription.
Figure 91:
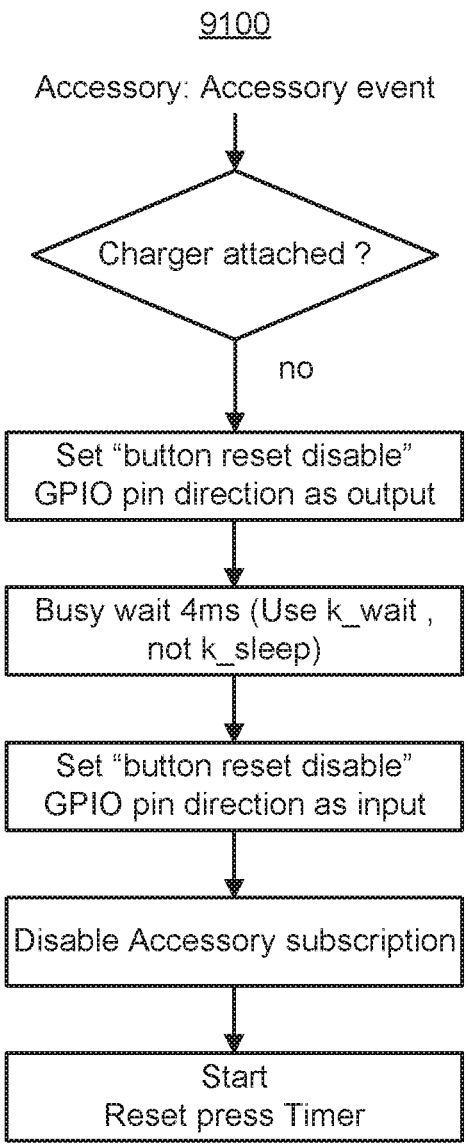
FIG. 91 shows an example relating to a button reset event handler.
Figure 92:
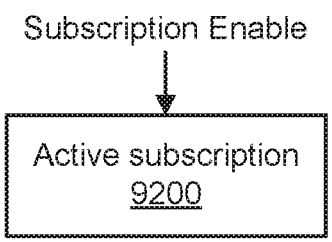
FIG. 92 shows an example relating to a button reset event handler involving an activate subscription.
Figure 93:
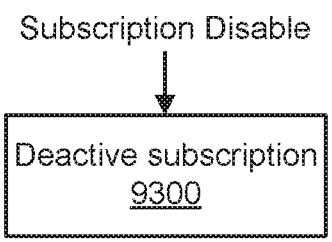
FIG. 93 shows an example relating to a button reset event handler involving a deactivate subscription.

FIG. 90 shows an example relating to a button reset event handler involving an enable accessory subscription 9000. FIG. 91 shows an example 9100 relating to a button reset event handler. FIG. 92 shows an example relating to a button reset event handler involving an activate subscription 9200. FIG. 93 shows an example relating to a button reset event handler involving a deactivate subscription 9300.

The following sections relate to an accelerometer process. The accelerometer process is responsible for:
Receiving subscription requests from other processes in the system. Other processes may subscribe on movements or resting events.
Dynamically enable/disable the subscriptions.
Interpret if the Tag is moving or resting according to the subscription criteria and invoke a callback to the subscriber.
For movements the subscriber may define a movement filter as part of the movement criteria.
For resting the subscriber may define a resting filter as part of the resting criteria.

The following section relates to movement and resting criteria. The movement filter is a value in milliseconds. It filters out movements that last shorter than this time, and callbacks are only triggered if the Tag has been continuously moving for this time. Once the accelerometer detects a movement it will set a timer to the first shortest subscribed moving filter. If the Tag has not come to rest until this timer expires, it will trigger a callback to that subscriber. It then repeats the same procedure for the other subscriptions The following section relates to a resting filter. Resting filter is a value in milliseconds. It filters out any resting event shorter than this time and callbacks are only triggered if it has been resting for this time. Once the accelerometer senses that it has comes to rest it will set a timer to the first shortest subscribed resting filter. If the Tag has not moved until this timer expires it will trigger a callback to that subscriber. It then repeats the same procedure for the other subscriptions.

The following section relates to an internal API. The internal API is made up of events that are queued from callers context to the process context. It is here to make the flow charts easier to understand later in the document, and also give a fuller picture of what events the process is supposed to be able handle:

Subscription enable event: This event enables an already registered accelerometer subscription. The event may only be generated by a process that already has registered a subscription with the accelerometer process.

Subscription disable event: This event disables an already registered accelerometer subscription. The event may only be generated by a process that already has registered a subscription with the accelerometer process.

Subscription update event: This event indicates that the parameters for an already registered accelerometer subscription has been updated. The event may only be generated by a process that already has registered a subscription with the accelerometer process.

ACC_driver: Wakeup event; This event indicates that the accelerometer driver has detected a movement. The wakeup duration of the accelerometer HW shall be configured short. The event is generated from a callback from the accelerometer driver.

ACC_driver: Sleep event; This event indicates that the accelerometer driver has detected that the Tag has come to rest. The sleep duration of the accelerometer HW shall be set to 1-2 seconds. The event is generated from a callback from the accelerometer driver.

Timer: Movement Filter timer; This event is sent when the Movement filter timer expires. The event is generated from a timer callback.

Timer: Resting Filter timer; This event is sent when the Resting filter timer expires. The event is generated from a timer callback.

An external API can include
acc groc_subscription_register(
　acc_subscription_ref_t*
　movement_filter_t,
　resting_filter_t,
　(*call_back) (motion_state_t*))

This will register a callback within the accelerometer process that will be invoked every time the criteria for movement or resting is met. Arguments can include:

acc_subscription_ref—An 8 bit handle that identifies this subscription.

movement_filter—Number of milliseconds the Tag has to be moving for before the callback is invoked.

resting_filter—Number of milliseconds the Tag has to be at rest for before the callback is invoked call_back—Sends motion information to the subscriber. The motion_state holds the status if the tag is moving or resting, and is further described later in this document.

An external API can include
acc_proc_subscription_update(
　acc_subscription_ref_t,*
　movement_filter_t,
　resting_filter_t)

This updates the Moving filter and the Resting filter for an already registered subscription. and then sends a Subscription update event to process.

An external API can include:
acc_proc_subscription_enable(acc_subscription_ref_t*)
This sends Subscription enable event to process.

An external API can include:
acc_proc_subscription_disable(acc_subscription_ref_t*)
This sends Subscription disable event to process.
This process depends on Accelerometer driver.

The following section relates to internal handling. Accelerometer Driver/Hardware:

On Wakeup interrupt:
　It shall disable Wakeup interrupt and enable Sleep interrupt On Sleep interrupt:
　It shall disable Sleep interrupt and enable Wakeup interrupt.

This may be the default functionality of the hardware and the driver. This is important so that the process is not fed with multiple events of the same type.

Accelerometer hardware settings:
　Accelerometer Wakeup duration should be set to as small as possible.
　Accelerometer Sleep duration should be set to 1-2 seconds.

The following section relates to state variables. In a general motion state, the process must know of its current state, whether it is moving or resting. This is the motion state sent (only once) to subscribers at the time when the subscription is enabled.

In a Subscription motion state, since the subscriptions will have different settings for moving filter and resting filter, every subscription must have their own state variable indicating the motion state for that subscription. This means that even if the moving filter condition is met, the motion state of the subscription must also be set to resting if the call-back should be invoked. Same holds for resting filter conditions. This is the motion state sent to the subscribers when their callbacks are invoked (except for when sending the initial motion state).

Figure 94:
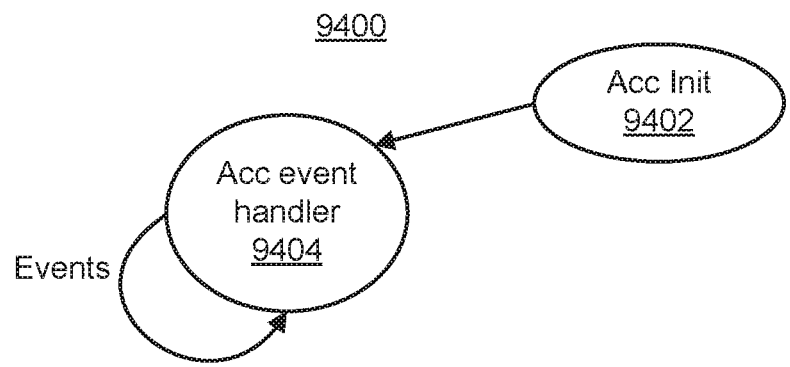
FIG. 94 shows an example of a top level state diagram involving an Acc init and an Acc event handler.
Figure 95:
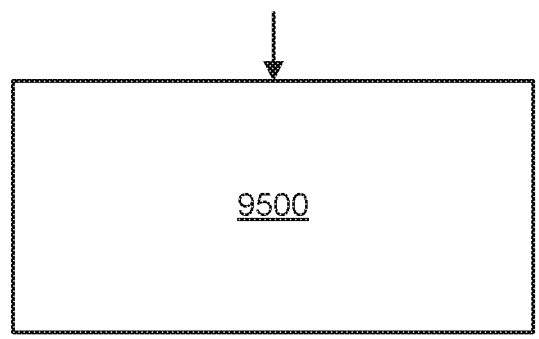
FIG. 95 shows an example relating to the Acc init of FIG. 94.
Figure 96:
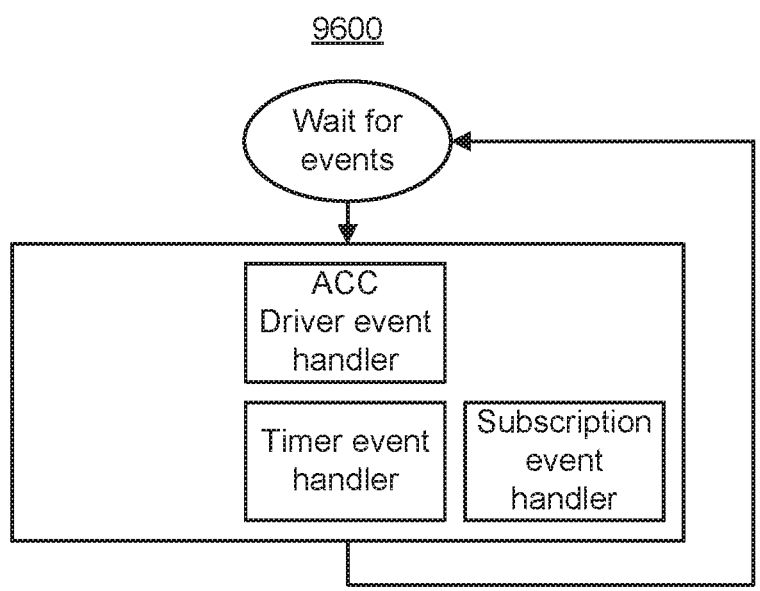
FIG. 96 shows an example relating to the Acc event handler of FIG. 94.

FIG. 94 shows an example of a top level state diagram 9400 involving an Acc init 9402 and an Acc event handler 9404. FIG. 95 shows an example 9500 relating to the Acc init 9402 of FIG. 94. FIG. 96 shows an example 9600 relating to the Acc event handler 9404 of FIG. 94.

Figure 97:
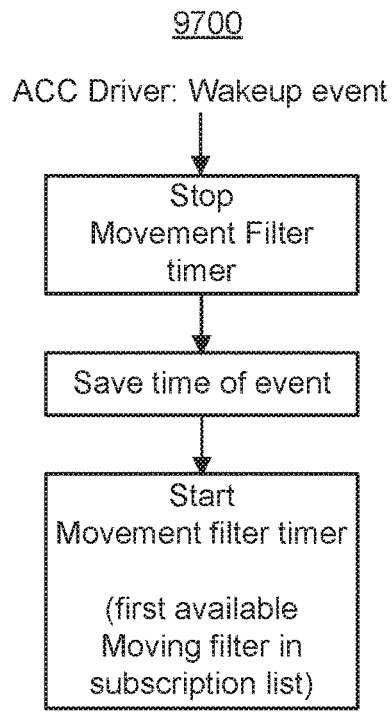
FIG. 97 shows an example relating to an Acc driver event handler.
Figure 98:
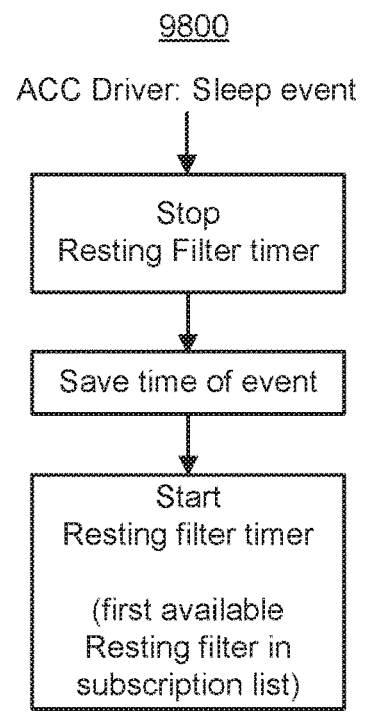
FIG. 98 shows an example relating to an Acc driver event handler.
Figure 99:
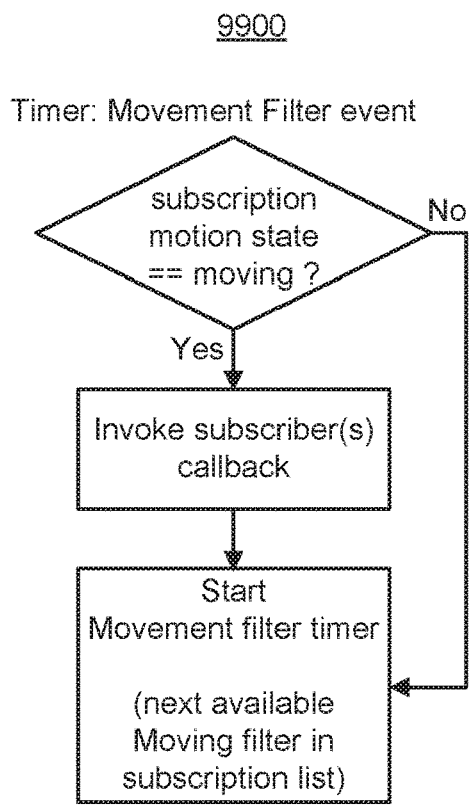
FIG. 99 shows an example relating to a timer event handler.
Figure 100:
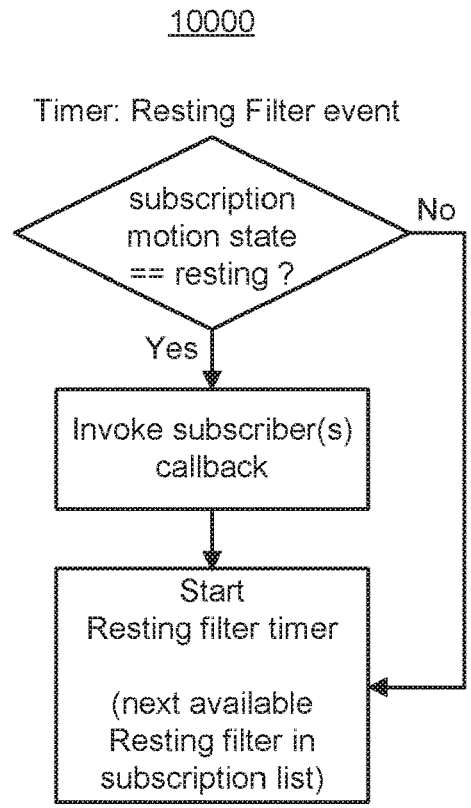
FIG. 100 shows an example relating to a timer event handler.

FIG. 97 shows an example 9700 relating to an Acc driver event handler. FIG. 98 shows an example 9800 relating to an Acc driver event handler. FIG. 99 shows an example 9900 relating to a timer event handler. FIG. 100 shows an example 10000 relating to a timer event handler.

Figure 101:
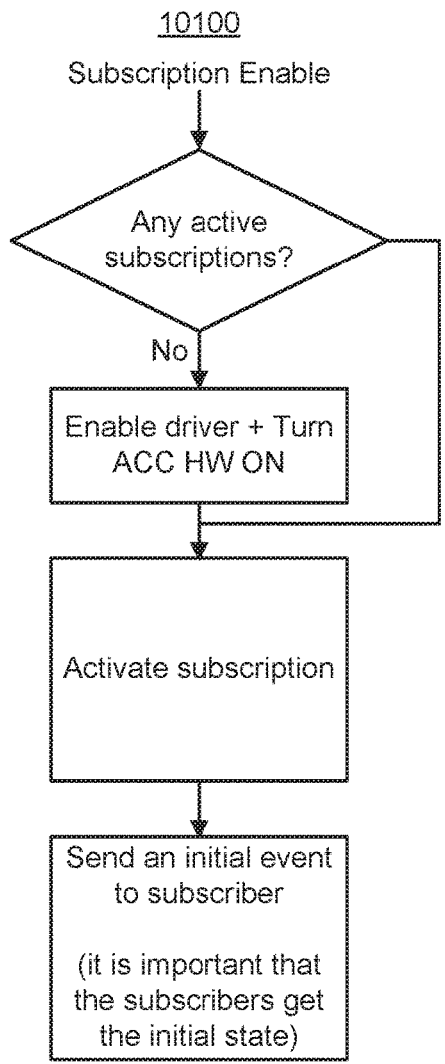
FIG. 101 shows an example relating to a subscription event handler.
Figure 102:
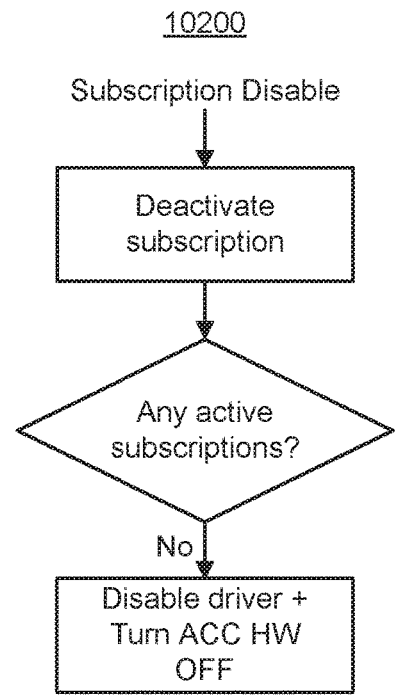
FIG. 102 shows an example relating to a subscription event handler.

FIG. 101 shows an example 10100 relating to a subscription event handler. FIG. 102 shows an example 10200 relating to a subscription event handler.

The following sections relate to a battery process. The battery process is basically a software fuel gauge. It is responsible for:

Periodically read the voltage level of the battery.
Periodically reading the temperature of the tag.
Calculating an average voltage estimating over several samples
Using the average voltage estimate together with the temperature to look up a battery level from a fuel gauge lookup table.
Receiving events from the accessory process to know if charger is attached or not. This is used to decide how frequent to measure the voltage. It may also be necessary to know which fuel gauge table to use.
Report battery voltage level to the BLE battery service and to the BLE advertising data.

The internal API is made up of events that are queued from callers context to the process context. It is here to make the flow charts easier to understand later in the document, and also give a fuller picture of what events the process is supposed to be able handle:

Accessory: Charger In event; This event indicates that a charger has been attached to the Tag.

Accessory: Charger out event; This event indicates that a charger has been detached from the Tag.

Timer: Initial Poll event; This event is sent when the Initial poll timer expires. The event is generated from a timer callback.

Timer: Battery Poll event; This event is sent when the Batter poll timer expires. The event is generated from a timer callback.

The battery process can have an external API.

This process depends on accessories process.

The following section relates to internal handling. State variables can include charger_attached and current_temperature.

The task of the fuel gauge algorithm is to make the best estimate of the current voltage. Just reading the current voltage level may not be sufficient: since the battery is a chemical process it will give different voltage reading if the battery is or has been under load. The Battery level lookup table will give very different values on small voltage differences. Therefore it is important to filter out deviations.

One approach would be to take an average over several sampled voltage levels. For example, a circular buffer of samples can be taken, and used for calculating the average voltage over 10 samples. Every time a new voltage value sampled it overwrites the oldest sample value in the circular buffer. An average value is at the same time calculated for entire list by taking the ((new value)−(oldest value that got overwritten))/10 and a adding that to the last calculated average.

The same could be done with several average samples to try to project the current voltage.

Another way (or perhaps complementary way) is it to try to filter out extreme (incorrect) values.

To map the voltage into a percentage of power left in the battery, a fuel gauge table can be used. This table will also depend on the temperature. The temperature can either be read from the SoC or from the Accelerometer HW.

A special lookup table can be used while the Tag is placed into the charger.

There will be three battery threshold levels:
HIGH
LOW
CRITICAL

It is important that once the current level intersects a threshold that it doesn't jump back and forth. In some implementations, different levels can be used when going from a lower state to a higher than from a higher to a lower battery state.

An external regulator is used to regulate down the voltage from VBAT to VSYS. Because of this the VBAT needs to be divided down to able to read from the SoC. This voltage divider must also first be enabled before measurements can take place. The SAADC block in the SoC is used to read the voltage. So the following steps must be taken:
Enable voltage divider (drive GPIO pin)
Read voltage via SAADC block
Please see schematics what pins to use.

Figure 104:
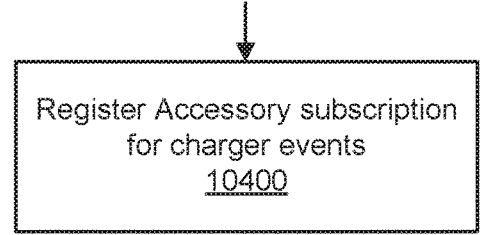
FIG. 104 relates to the battery init in FIG. 103 and involves a register accessory subscription.
Figure 103:
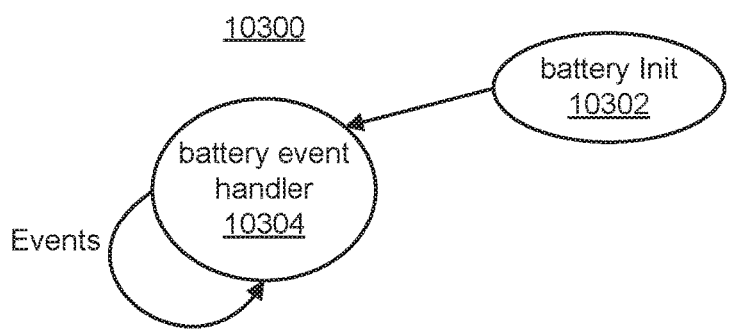
FIG. 103 shows an example of a top level state diagram involving a battery init and a battery event handler.
Figure 105:
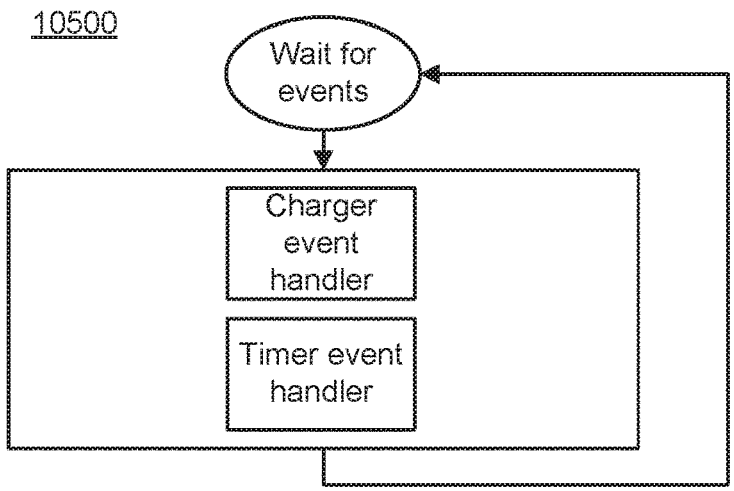
FIG. 105 shows an example that relates to the battery event handler in FIG. 103.

The following are examples of how frequently to poll the battery level:
When attached to charger—every 2 seconds
When detached from charger—every 1 min FIG. 103 shows an example of a top level state diagram 10300 involving a battery init 10302 and a battery event handler 10304. FIG. 104 shows an example that relates to the battery init 10302 in FIG. 103 and involves a register accessory subscription 10400. FIG. 105 shows an example 10500 that relates to the battery event handler 10304 in FIG. 103.

Figure 106:
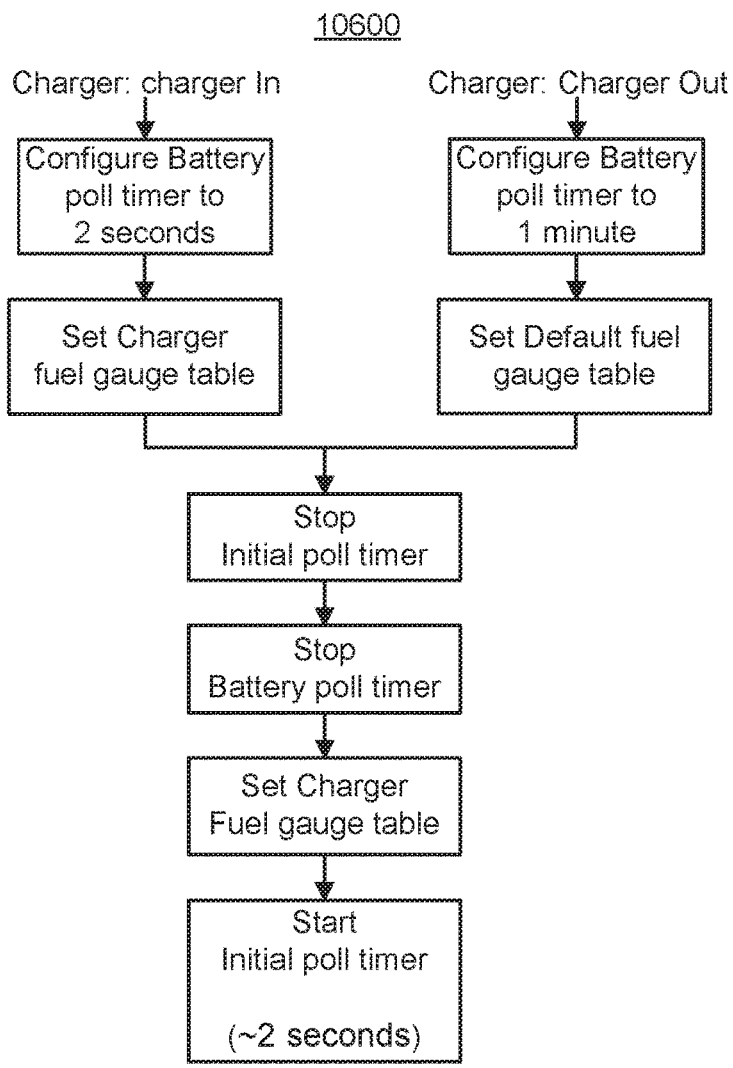
FIG. 106 shows an example that relates to a charger event handler.

FIG. 106 shows an example 10600 that relates to a charger event handler.

Figure 107:
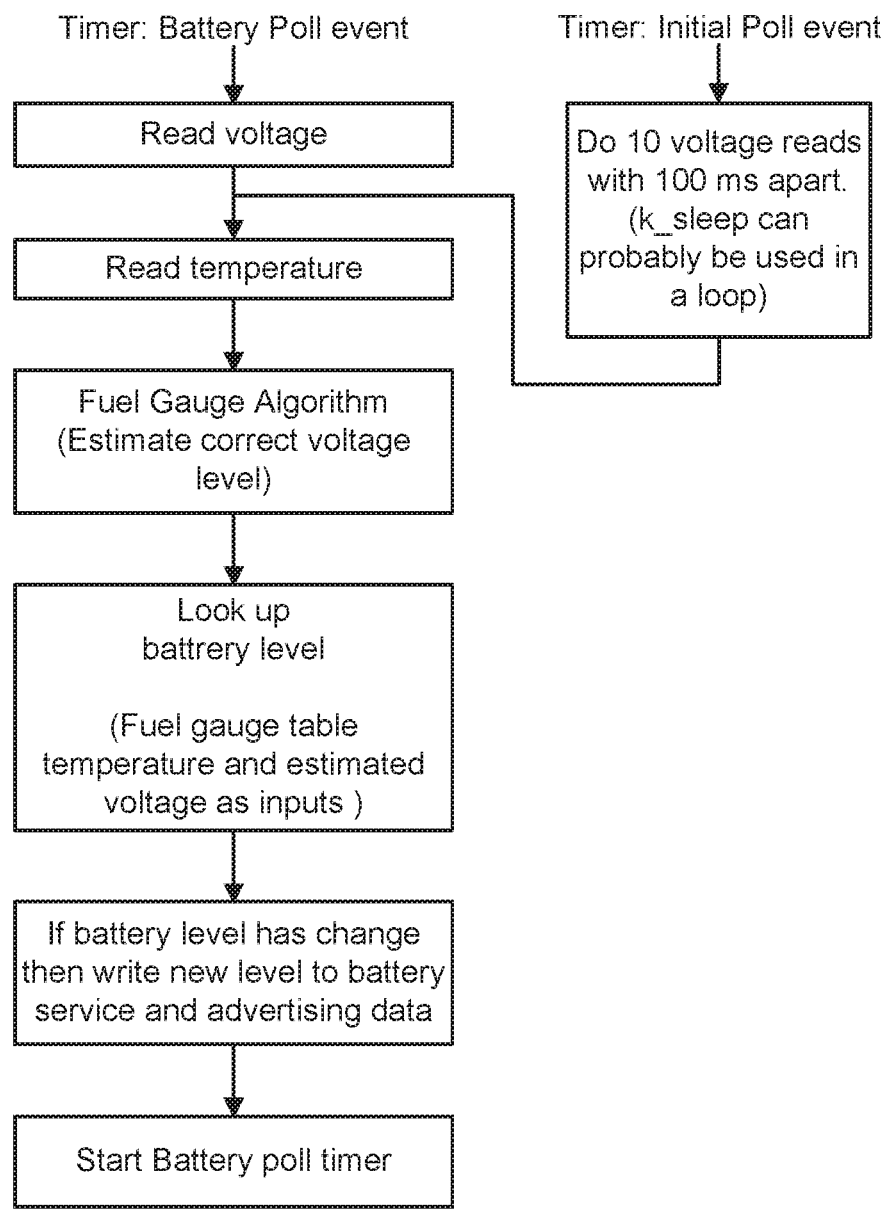
FIG. 107 shows an example that relates to a timer event handler.

FIG. 107 shows an example 10700 that relates to a timer event handler.

The following sections relate to an accessories process. The accessories process is responsible for:

Detecting when external devices (accessories) are connected or disconnected with the Tag.

Able to identify the type of accessory. This can be of the following types:
Smart Charger
Battery Sleeve
Partner ID Sleeve
Smart Sleeve Handle charging functionality. Since the smart charger is the only type of accessory that is currently available it doesn't make sense to split this process up into several. In the future it may be changed to allow for more types of accessories to subscribe to.

The internal API is made up of events that are queued from callers context to the process context. It is here to make the flow charts easier to understand later in the document, and also give a fuller picture of what events the process is supposed to be able handle:

Subscription enable event: This event enables an already registered accessory subscription. The event may be generated only by a process that has already registered a subscription with the accessory process Subscription disable event: This event disables an already registered accessory subscription. The event may be generated only by a process that has already registered a subscription with the accessory process GPIO Interrupt: SCL event: This event indicates that a GPIO interrupt occurred on the $I^2C$ scl line. The event is generated from a callback when subscribing GPIO events.

GPIO Interrupt: SDA event: This event indicates that a GPIO interrupt occurred on the $I^2C$ sda line. The event is generated from a callback when subscribing GPIO events.

Timer: Debounce event: This event is sent when the debounce status timer expires. The event is generated from a timer callback.

Timer: Charger status event; This event is sent when the charger status timer expires. The event is generated from a timer callback.

An external API can include
accessories_proc_subscription_register(
  accessory_subscription_ref_t*
  accessory_flags_t,
  (* call_back) (accessory_state_t))

This will register a callback within the accessories process that is invoked whenever an accessory is attached or removed. It will report the current accessory state of what accessory is attached or not. State variables are described elsewhere herein.

After registration the default setting of the subscription is in disabled state.

Arguments can include:
accessory_subscription_ref—An 8 bit handle that identifies this subscription.
accessory_flags—Hold specific subscriber requests. Can have the following values: ACCESSORY_READ_HW_ON_ENABLE This will be used by the button process requires the accessory process to read accessory state from HW (rather than just from a saved variable) when the button subscription enable is received. It will be used to disable the button HW reset logic for a very short time and the nature of this function requires it to be as little dependent on SW. Therefore the HW read is necessary.

An external API can include accessories_proc_subscription_enable(accessories_subscription_ref_t), which sends Subscription enable event to process.

An external API can include accessories_proc_subscription_disable(accessories_subscription_ref_t), which sends Subscription disable event to process.

The following section relates to internal handling. The detection of accessories involves a number of steps. The main focus here is to save power for the Tag. The design must be interrupt driven with low leakage currents when an accessory is attached or detached with/from the Tag.

Figure 108:
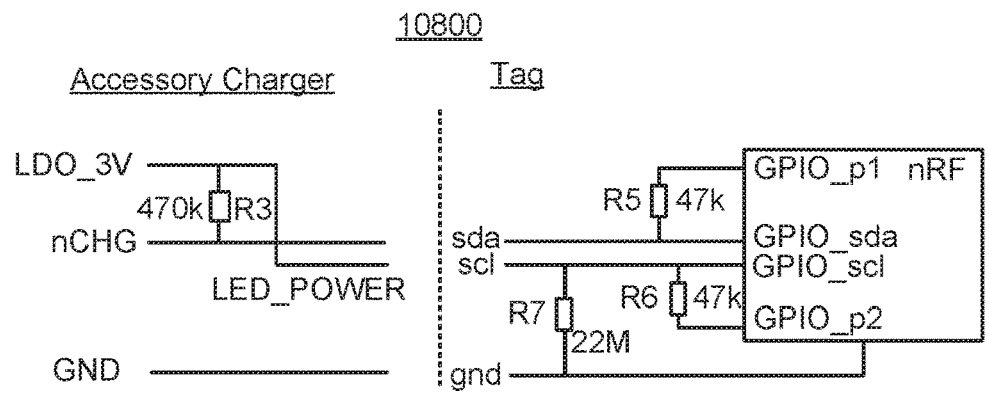
FIG. 108 shows a diagram relating to an accessory charger.
Figure 109:
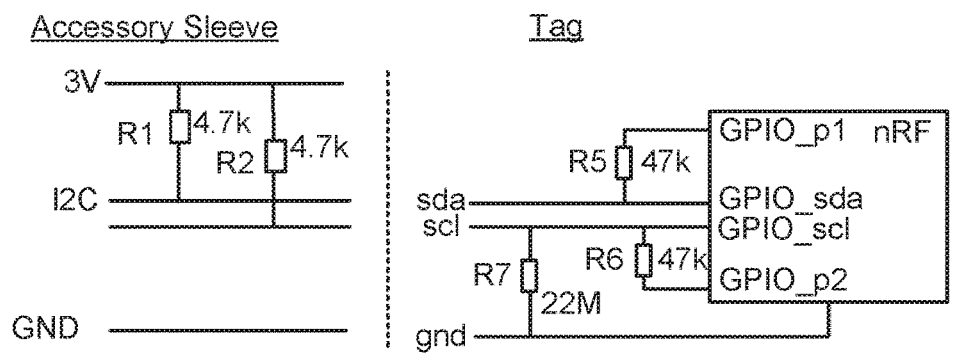
FIG. 109 shows a diagram relating to an accessory sleeve.

Accessories can be categorized into two groups depending on how HW detection is done:
  Chargers. FIG. 108 shows a diagram 10800 relating to an accessory charger.
  Sleeves. FIG. 109 shows a diagram 10900 relating to an accessory sleeve. Sleeves may be of several types (id sleeves, battery sleeves, smart sleeves) but that is something that is later detected via the I²C interface.

The diagrams above shows the differences between the different type of accessories—smart chargers and smart sleeves.

When no accessory is attached to the Tag the system can be in a detached state. In this state the configuration of the different GPIO should be accordingly:
  GPIO_p1: disable pull-down (input)
  GPIO_p2: enable pull-down (drive low)
  GPIO_scl: interrupt is set to trigger when this pin goes HIGH (input)
  GPIO_sda: disabled (input)

The following section relates to an attachment detect procedure. When a charger or accessory is attached this will give an interrupt on the GPIO_scl. Once the interrupt is received and confirmed, the strong pull-down of scl is removed by setting GPIO_p2 to input. This is done to limit the current leakage.

Once detected the next step is to identify what type of accessory it is. To do this a stronger pull-down is added to sda by driving GPIO_p1 low. The GPIO_sda is then read:
  If GPIO_sda==low; This means that a charger is attached.
  if GPIO_sda==high; This means that another type of sleeve is attached.

The GPIO_p1 is then set to input again to disable the pull down of GPIO_sda.

The following section relates to an attached state. The attached state depend a little on the type of accessory since the I²C may be configured to transmit/receive data to/from the accessory. This should only be done during short times and in-between that it should use a default configuration, which is also used when attached to a charger:
  GPIO_p1: disable pull-down (input)
  GPIO_p2: disable pull-down (input)
  GPIO_scl: interrupt is set to trigger when this pin goes LOW (input)
  GPIO_sda: disabled (input)

The following section relates to a detachment detect procedure. When a charger or accessory is detached this will give an interrupt on the GPIO_scl. Once the interrupt is received and confirmed a strong pull-down is configured for scl by driving GPIO_p2 low. This is done to get a more defined input that is not as sensitive to external inputs.

The following section relates to a GPIO interrupt callback. When the SCL_GPIO interrupt is received the GPIO callback will first disable SCL interrupt and then send the SCL event to the process. The SCL GPIO interrupt is later read and enabled from within the process context.

The following section relates to state variables. Accessory_state—this state variable shows the main state of the accessory process. It can take the following values:
  ACCESSORY_CHARGER_ATTACHED
  ACCESSORY_SLEEVE_ATTACHED
  ACCESSORY DETACHED This is also the value that is sent via the callback to subscriber.

Figure 110:
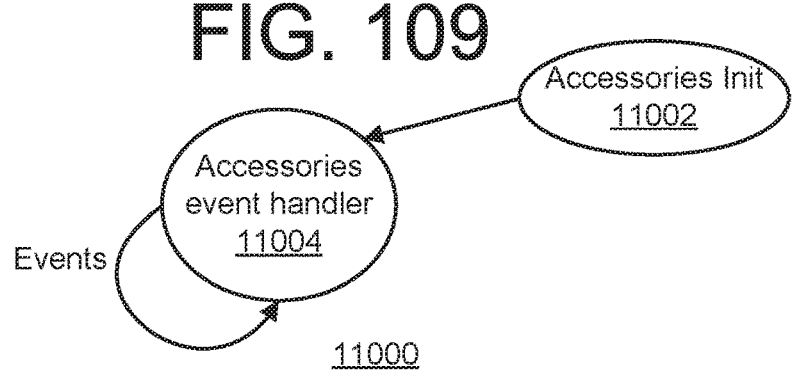
FIG. 110 shows an example of a top level state diagram including an accessories init and an accessories event handler.
Figure 111:
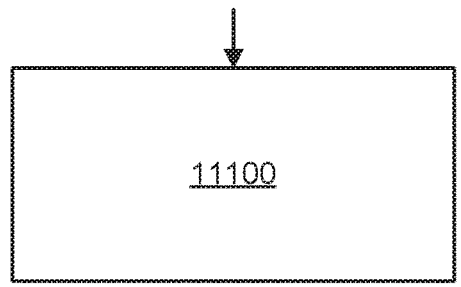
FIG. 111 shows an example relating to the accessories init in FIG. 110.
Figure 112:
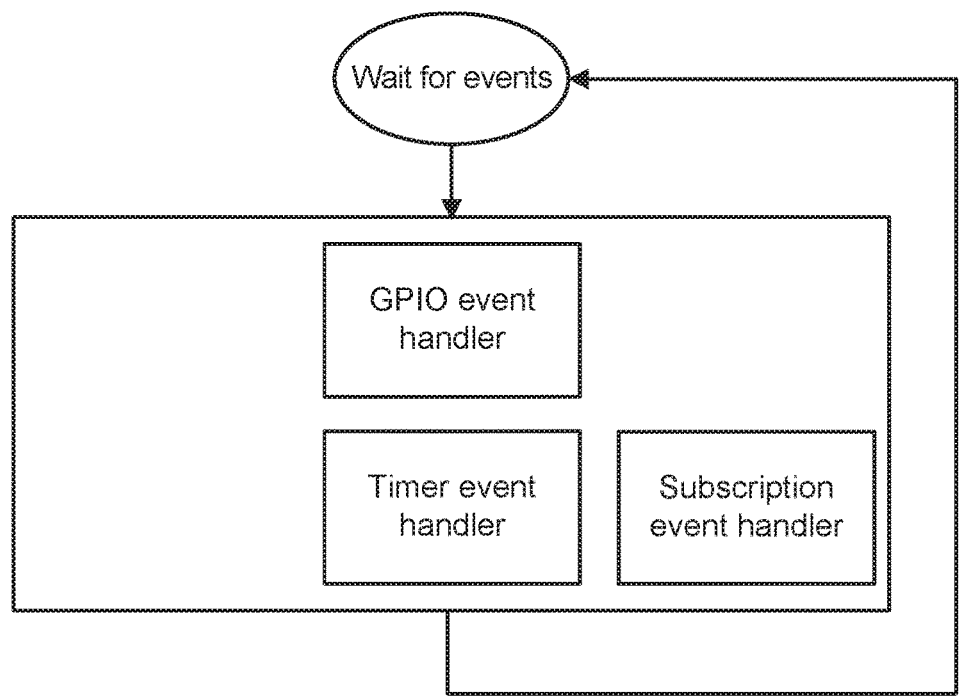
FIG. 112 shows an example that relates to the accessories event handler in FIG. 110.

FIG. 110 shows an example of a top level state diagram 11000 including an accessories init 11002 and an accessories event handler 11004. FIG. 111 shows an example 11100 relating to the accessories init 11002 in FIG. 110. FIG. 112 shows an example 11200 that relates to the accessories event handler 11004 in FIG. 110.

Figure 113:
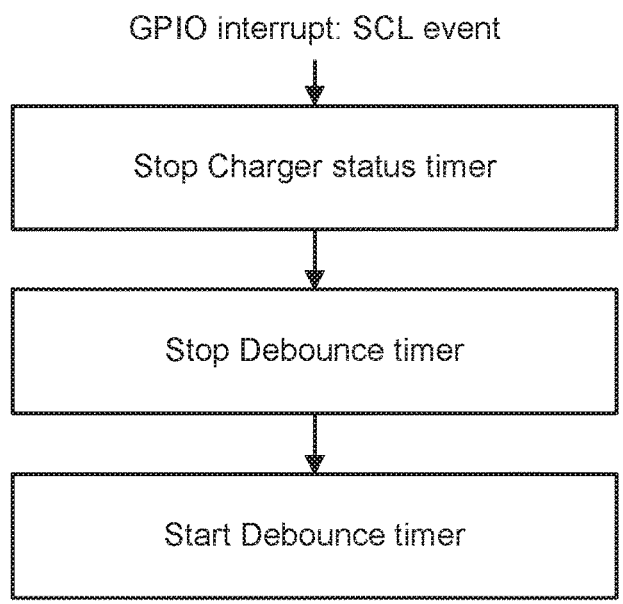
FIG. 113 shows an example relating to a GPIO event handler.

FIG. 113 shows an example 11300 relating to a GPIO event handler.

Figure 114:
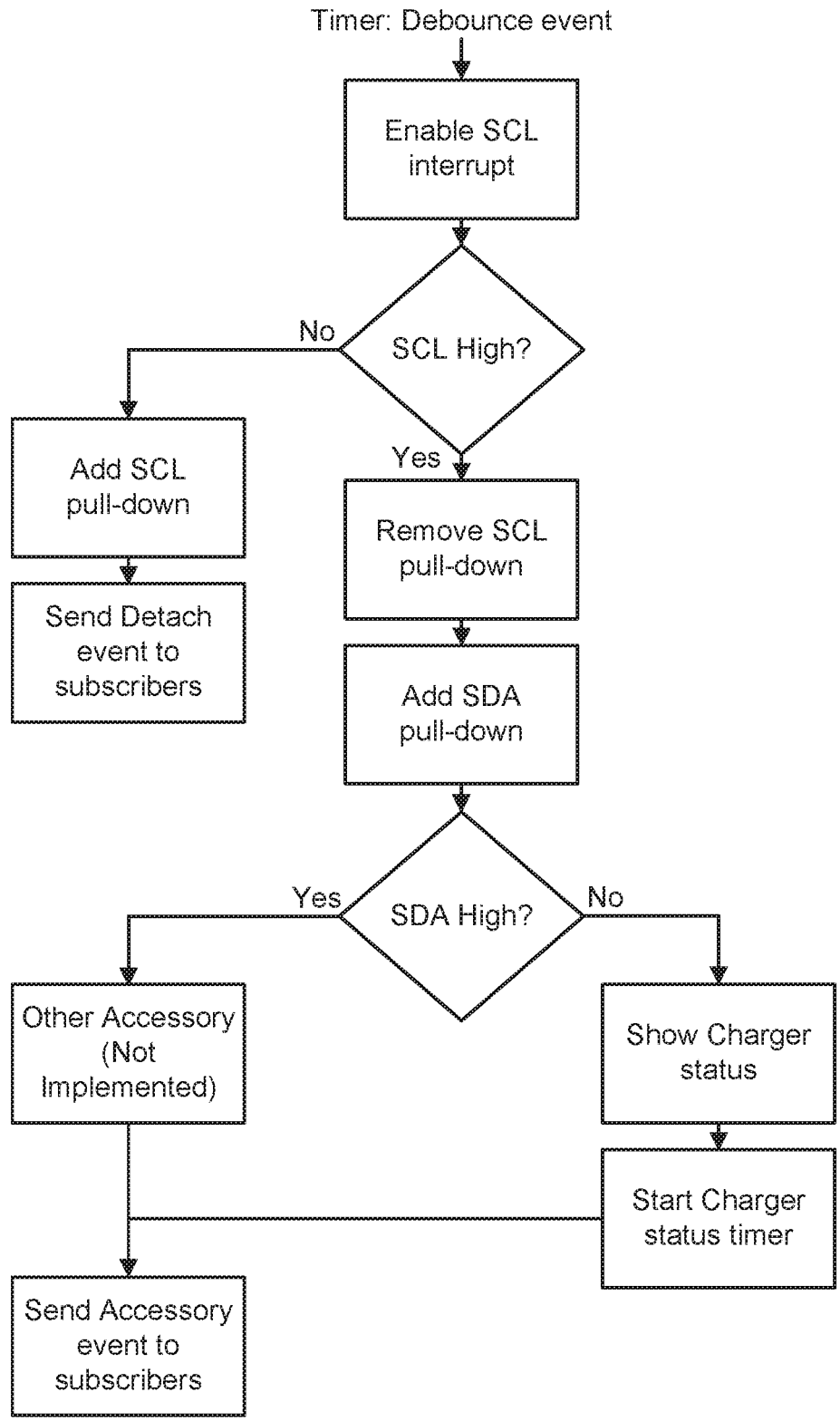
FIG. 114 shows an example relating to a timer event handler.
Figure 115:
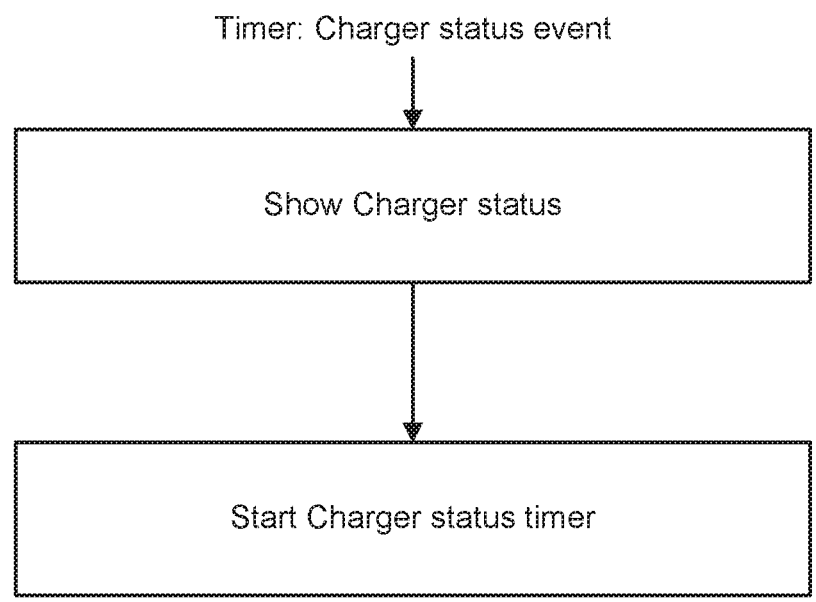
FIG. 115 shows an example relating to a GPIO event handler.

FIG. 114 shows an example 11400 relating to a timer event handler. FIG. 115 shows an example 11500 relating to a GPIO event handler.

Figure 116:
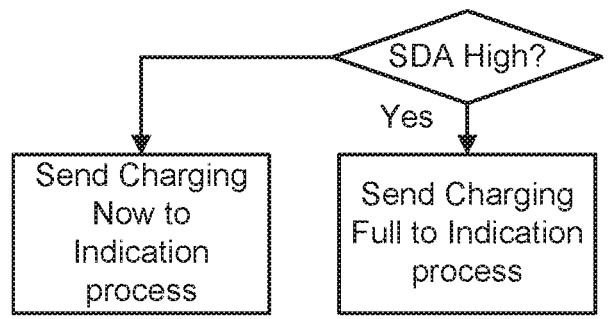
FIG. 116 shows an example relating to a show charger status.

FIG. 116 shows an example 11600 relating to a show charger status.

Figure 117:
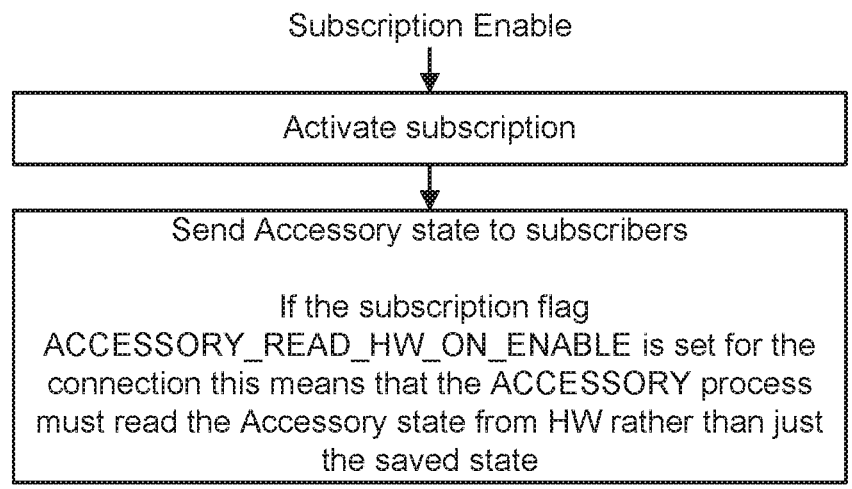
FIG. 117 shows an example relating to a subscription event handler.
Figure 118:
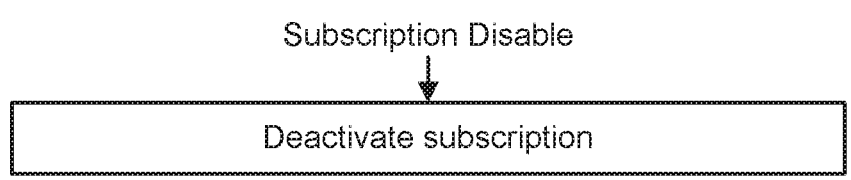
FIG. 118 shows an example relating to a subscription event handler involving a deactivate subscription.

FIG. 117 shows an example 11700 relating to a subscription event handler. FIG. 118 shows an example relating to a subscription event handler involving a deactivate subscription 11800.

Figure 119:
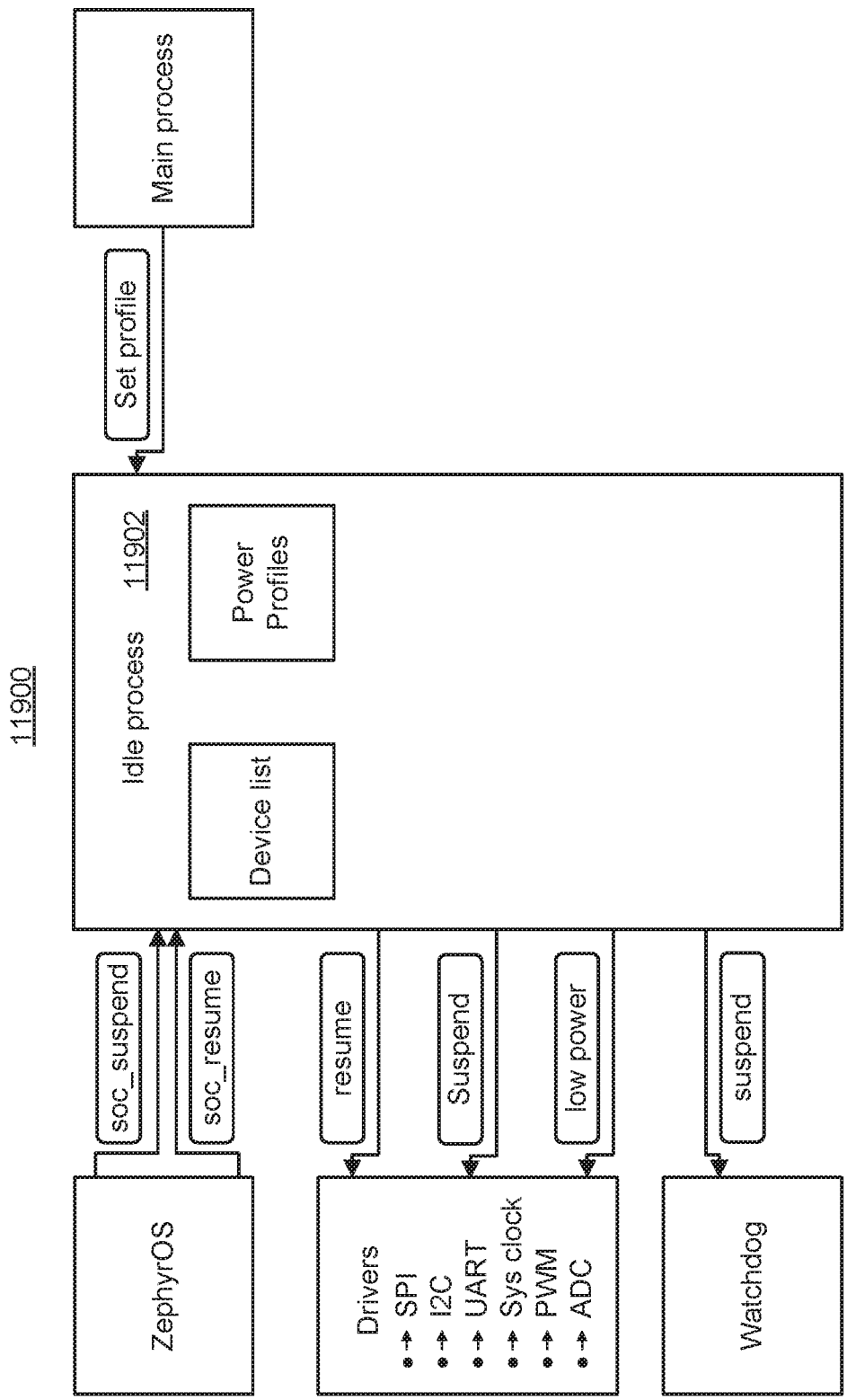
FIG. 119 shows an example involving an idle process.

The following sections relate to an idle process. Idle process handles power modes and implements SoC peripherals management, to reduce power consumption when system is idle. FIG. 119 shows an example 11900 involving an idle process 11902.

Idle process should disable watchdog in sleep state.

The following examples relate to power saving:
  Idle using WFI
  Low power state Constant Latency (TASKS_CONSTLAT) on WFE
  Low Power State (TASKS_LOWPWR) on WFE
  Deep Sleep or System Off state—Device will reset on exit from this state The following examples relate to handling of Zephyr idle state. Idle process should use standard ZephyrOS API:
  int_sys_soc_suspend(s32_t ticks); Request from Idle thread to enter into low power mode or deep sleep state.
  void_sys_soc_resume(void); This notification is called from the ISR of the event that caused exit from kernel idling after PM operations.

The following section relates to indication. A Tag has available two peripherals to provide Indications to the User, those peripherals are LED and Piezo. This section first will describe each of the two main Indication Types separately. Light Indication from the LED and Sound Indication from the Piezo are described elsewhere herein. After the operations of each Indication Type are described, the Indication Process and the way the two Indication Types are linked, and working together, will be described.

The following section relates to light indication from LED. The available LED on the Tag is tricolor RGB; for example, if white light is needed it can be generated by mixing each of the colors with the appropriate saturation. There are two aspects to interfacing the LED, hardware and software.

The hardware aspect is covered by RGB LED Driver NCP5623C. It is controlled over I2C interface by the Tag Firmware. The NCP5623C provides Triple Output to control each color independently. The benefit of having the LED Driver is its capability to receive and preserve LED output settings—Color saturation, which allows for power saving functionality. And also, enabled the Firmware to "set and forget", instead of having to constantly manage the LED.

Figure 120:
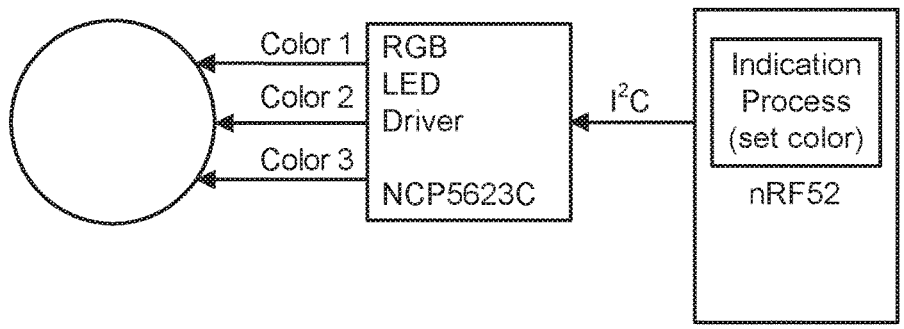
FIG. 120 shows an example relating to a System Overview from RGB LED Driver perspective.

FIG. 120 shows an example 12000 relating to a System Overview from RGB LED Driver perspective. The RGB Led Driver is fully controlled by the Indication Process and no other Firmware Unit has the control over it. This design can provide efficient control.

The following section relates to sound indication from piezo. The available Piezo on the Tag can provide very audible sound given the appropriate Voltage Level and adequate Frequency. While the second matter can be completely solved and controlled by the Tag Firmware, the first matter of Voltage Level depends on the Hardware implementation. And this is a specific challenge, because the Tag is Battery-operated device. To solve this problem the Tag Hardware Design incorporates a Piezo sound driver, which can work at 3V level. There is no communication interface required to interact with the sound drive, because it takes the exact same Frequency as the Piezo would, if it was directly driven by the Microcontroller. This allows for simpler control logic. And the Piezo sound driver architecture takes care of the necessary Voltage Level Boost.

Then, the software aspect needs to handle both parameters—Voltage Level (Boost) and the (Sound) Frequency. This way, adjusting both parameters, the Tag FW can control Loudness and Sound at the same time.

Voltage Level—Is realized through GPIO control of two inputs to the Piezo Sound driver IC.

Sound Frequency—Is realized by the FW using the available in Microcontroller PWM output.

Figure 121:
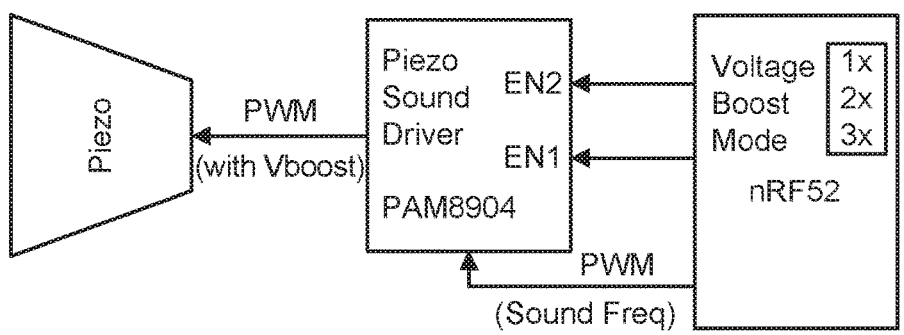

FIG. 121 shows an example 12100 relating to a System Overview from the Piezo Sound Driver perspective. The Sound Driver PAM8904 is fully controlled by the Indication Process and no other Firmware Unit has the control over it. This is the intended design for the purposes of efficient control.

The following section relates to process integration. The Indication Process provides straightforward API for other Processes to set Indication. Provided is set of internal commands which can set new Light and/or Sound Event.

StartIndicationEvent(ind_event_id, duration)—ind_event_id matches to one of predefined Indication behaviors (described in Chapter 7.6); duration is the time the behavior should remain active (in the case of Stop, naturally this argument has no effect). StopIndicationEvent(ind_event id)—Request to turn off the current indication. This can be approved by the Indication Process only if the ind_event_id matches with the currently running Indication and the process requesting it has the needed priority level to override it.

Figure 122:
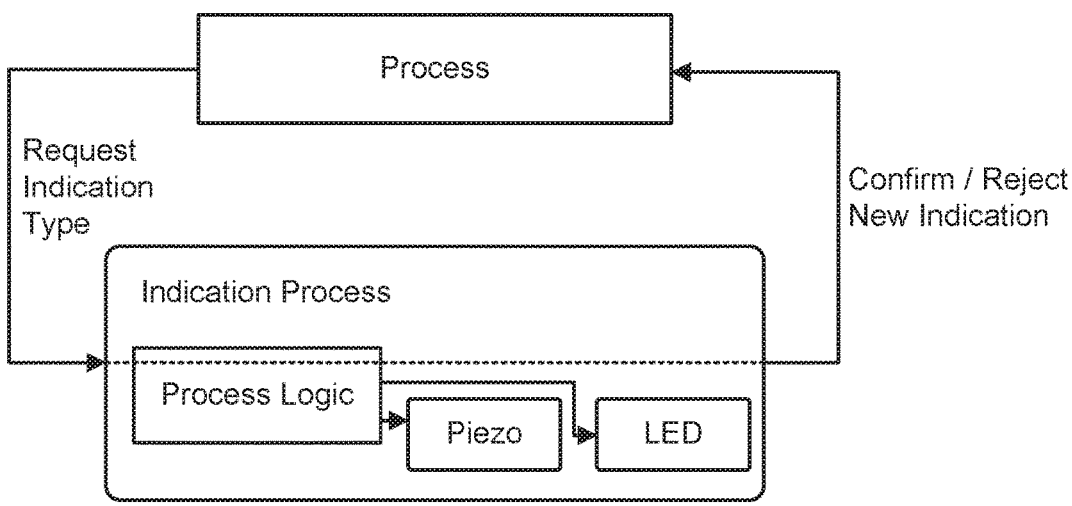

FIG. 122 shows an example 12200 relating to an overview of the Indication Process integration The following section relates to a process overview. The Indication Process may be solely responsible for the direct control of the Sound and Light behaviors of the Tag. To do so it has predefined tables of structures for each type of behavior. Where for each Indication type there is a specific ID, separated in two groups, LightEventID and SoundEventID.

External Processes can then request a predefined Indication Event. And the Indication Process will evaluate their request based on predefined set of Indication Priorities for each external Process. If there is no current Indication running with higher priority than the requested one, the new request will be translated by the Indication Process to low-level instructions to the RGB LED Driver and Piezo Driver. Visualization of the algorithm is provided herein.

Figure 123:
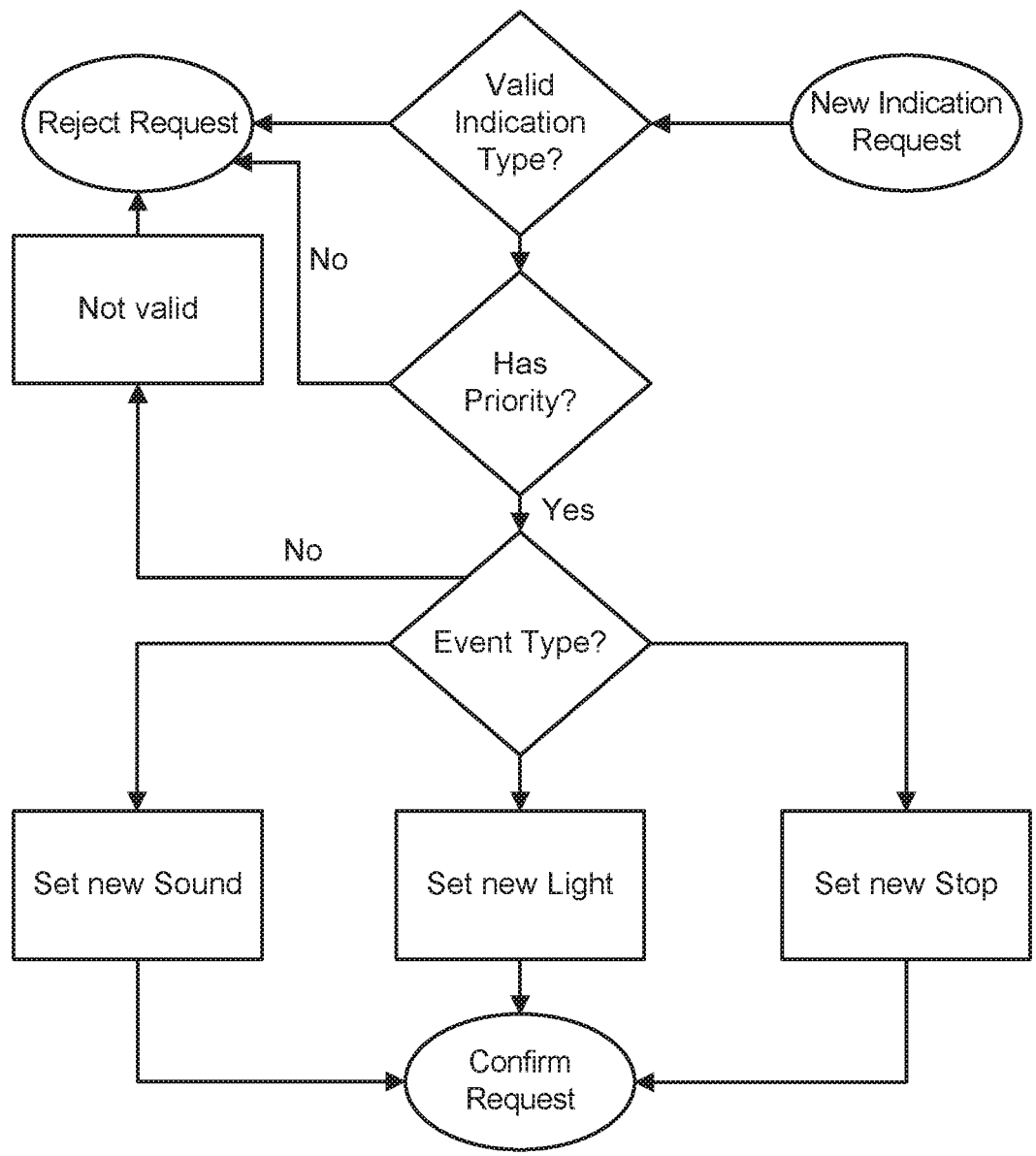

FIG. 123 shows an example 12300 relating to indication process logic. As seen from the Diagram, there are two main steps for any Process to set new Indication: first to get a New Request ID and second, using this Request ID to put New Event Request. Depending on the Priority set for this Process, the Indication process will reject or confirm.

The Indication Process is also responsible for managing periodic events necessary for the proper display of Indications. For example, setting fading of RGB LED colors could require periodic change of settings, the Accelerometer Process should handle this internally and the External Process requesting the indication should rely solely on the Indication Process for the accuracy of the Indication, whatever the type (sound, light or sound+light). The MCU DMA feature called "EASYDMA list", which allows Linked List like use of the DMA, may be used. Therefore enabling the MCU to prepare data in specific format, so fading of light and/or sound can happen without the need of periodic intervention of the MCU.

The following section relates to use of an indication process. The Indication Process is a Service, which allows other Process to Request their necessary Indication. The internal Process Logic decides if a Request can be satisfied or not based on Process priority. For example, there could be an Alert happening while another Event is requesting new Indication. Then the Logic will recognize the higher priority process, prepare and set the Sound and Light accordingly, and report the result: Reject request for the one Process and Confirm the Indication for the other Process. The order of requests should have no impact, because Process Priority drives change of Indication. The chosen type of Indication can be any of the Predefined Types the Firmware Version supports. The following table lists the defined indication types.

| Indication Type | Light indication/LED | Sound Indication/Piezo |
|---|---|---|
| Hardware Start | | |
| Boot | | |
| Connect | | |
| Disconnect | | |
| Onboard | | |
| Reset | | |
| Ring | | |
| Confirmation | | |
| Failure | | |
| Alert | | |

There can be Indication Type which sets only Light or only Sound.

The following section relates to sensors. The Accelerometer on the Tag provides vital functionality for the system behavior. Therefore all related functionalities run in separate Process. This process is responsible for the proper configuration of the Accelerometer as well and the dependent runtime operations.

The output of the Accelerometer Process are validated and filtered Accelerometer Events. Mainly Movement detection, used as trigger for different Events and Conditions. Here is a list of System behaviors, which are considered to make use of the Accelerometer Events:

Wakeup (Leaving sleep mode)—Triggers wakeup on the detection of movement

Entering sleep mode—Flags lack of movement, which condition for sleep mode

Group—Accelerometer will play essential part in the Group functionality

Safe Zones—a special Accelerometer Process feature will allow creation of Accelerometer Scan Filters, a filter match triggers Event to Safe Zones Process.

Localization—Accelerometer events will be used for the Localization algorithm

Figure 124:
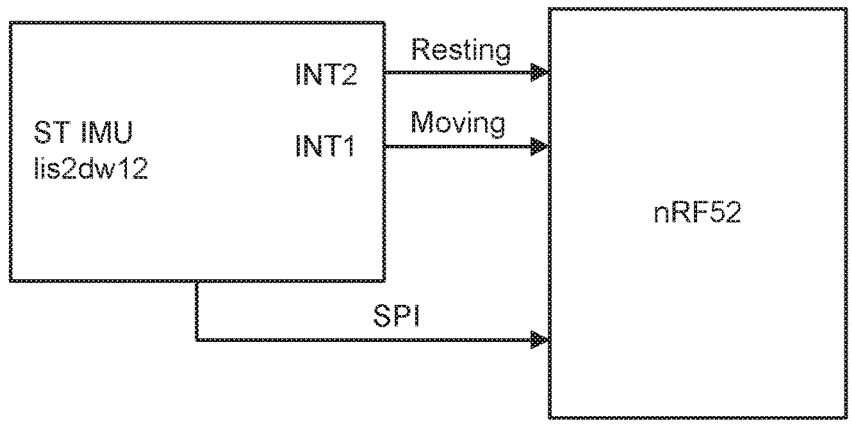

FIG. 124 shows an example 12400 relating to a system overview from accelerometer perspective. LIS2DW12 has a dedicated internal engine to process motion and acceleration detection including conditions. The following is list of Events used in the Tag Operations:

Group A: wakeup [in use]

Group B: activity/inactivity [in use], stationary/motion detection [in use]

Group C: highly configurable single/double-tap recognition [possible future use]

Figure 125:
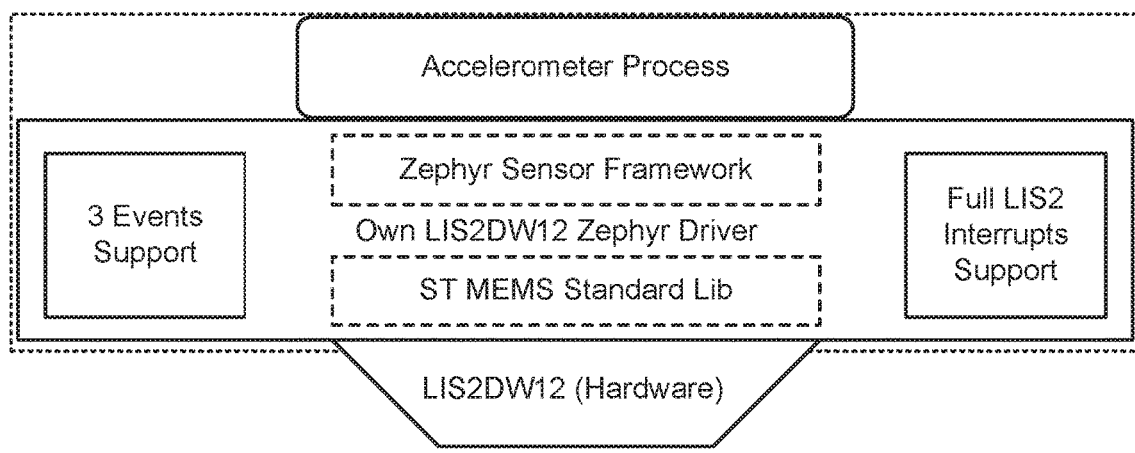

FIG. 125 shows an example 12500 relating to a 6D/4D orientation. To utilize all of these modes, the employed IMU driver has to support multiple Event types. For this reason, developed was own IMU driver. The IMU driver first leverages the ST Microelectronics MEMS Standard library and builds around it new fully functional Zephyr Platform Driver. Shown below is the building block diagram of the lis2dw12t driver.

A brief comparison is here provided of the some aspects between two Zypher drivers.

| Feature vs Driver | lis2dw12 | lis2dw12t |
|---|---|---|
| Interrupts | Configurable: INT1 & INT2 Uses only one at a time | Configurable: INT1 & INT2 Uses Both in parallel |
| Events | Only one: DataReady | Three: DataReady Activity/Inactivity Stationary/Movement Possible to add Tap Events |

The following section relates to process integration. For integration the Accelerometer Process offers the following parameters:

movement_filter—specifies the amount of time (in milliseconds), that an Accelerometer Event should have been continuously present, for the Accelerometer Process to consider it valid.

Movement_filter with value of zero means every matched Event will be sent to the Process.

movement_accuracy(optional)—is a value in percentage (0-100%) and specifies the amount of scrutiny the Accelerometer Process should impose on certain Accelerometer Events. For example, if there has been a short period of no movement (%) but the overall major part of the time(movement_filter specifies) has been in-movement, then the Event is taken as valid.

The following API commands are offered:

SubscribeAccelMovementEvent/Unsubscribe . . . —Allows the subscription to the Movement detection fo the Accelerometer. The event is described by movement_filter or by the combination together with movement_accuracy. The calling Process for subscription must provide also an Event Handler to be called when there has been a matching Accel. Event.

SubscribeAccelRestingEvent/Unsubscribe . . . —Similar to the Movement Event, this API command allows for External Process to subscribe to the Resting Event. The command takes the same set of parameters and requires an Event Handler for matchingAccel.

Events.

The following section relates to process overview and operations. Firmware should have the information when the Tag is "in motion" or is "resting". This is achieved through the Accelerometer Process. It provides an interface for receiving the Accelerometer Events. In a Driver, multiple Events may be supported. All the internal doings with the Accelerometer Hardware are being handled by the Process itself and exposed are filtered Accelerometer Events.

Figure 126:
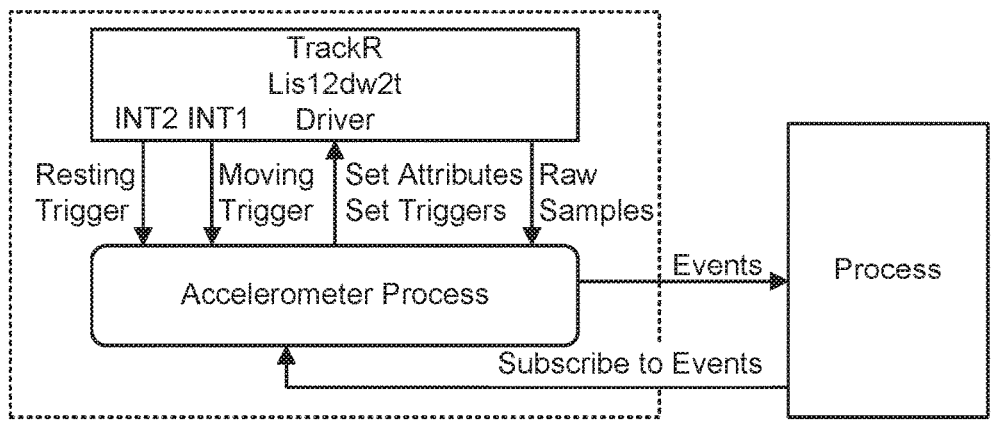

FIG. 126 shows an example 12600 relating to a process overview. As seem from the Diagram, any user of the Accelerometer Process needs to subscribe to the desired Events and the Accelerometer Driver handling is done internally without the need of extra functionality in the External Processes.

Figure 127:
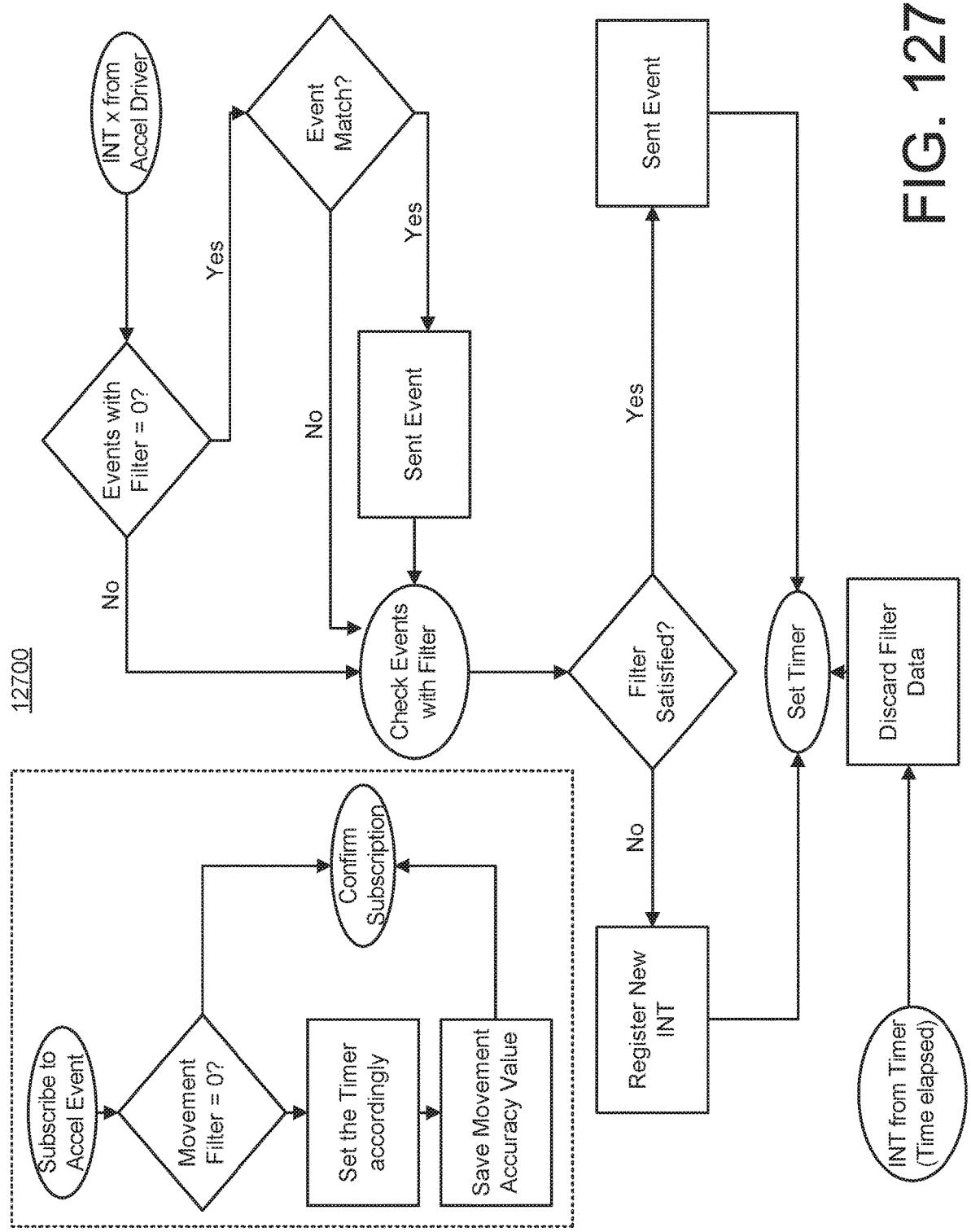

FIG. 127 shows an example 12700 relating to logic lFlow inside the accelerometer process. First step is the subscription to an Accelerometer Event, and this saves the required parameters for movement detection (movement_filter and accuracy). Together with this the timer is adjusted if needed, to detect with higher precision and more frequent polling interval. This is done to achieve Power Savings. After the subscription has been confirmed the calling External Process waits for the Accelerometer Process to call the provided Event Handler. Only filtered Accelerometer Events with valid match will be sent to the External Process The following are examples of requirements related to accelerometer functionality:

Movement duration should be logged

Report change of movement and not just movement

Based on movement Beaconing should be optimized

The following section relates to a button process. The Button process provides button events to the rest of the system, i.e. other processes.

One dedicated GPIO can be used for button functionality. And this button is used for all physical User Interactions. The exact User Interactions are defined by the UX Requirements and are not subject of this chapter. Instead here described is how the Button Process handles the GPIO and provides as result only confirmed Button events. List of events below:

Press, button is pressed and hold for a short period of time

Long Press, button is pressed and hold for a long period of time

In order to distinguish between the Events the Button Process has internal Event Detection. A main purpose of this algorithm is to properly identify and validate each of the Button Events. For this purpose it uses Timer together with tracking information from Last and New State. The two main criteria for Event Detection are the transitions between Released and Pressed, combined with the Timer measuring the duration of each Press. Depending on the stage of Event Detection the Timer is also used for Debounce Technique in initial stage. More complex case is sequence of different presses. Additionally the Button Process will be able to distinguish and Button Sequences. And any Process will be able to subscribe to the Sequences the same way a Process can subscribe to the standard Button Events. The detection of Sequences is realized through the use of mapping between type of Button Events and repetition of each type. This way patterns become possible for recognition.

The following section relates to process integration. For integrating with the rest of the System the Button Process offers the ability for other Processes to subscribe to Button Events, including Sequences of Button Events.

To specify the type of Button Event or Sequence the subscribing Process must provide a proper mapping of Types and Number of occurrence for each type.

Mapping has the following format:
One value representing the types of Button Events called "sequence_events"
Each bit of this value specifies the type of Button Event
Valid types are: ShortPress(=0) and LongPress=(1)
In addition to this, there is a second value called "sequence_length", which specifies the number of Button Events which make a given sequence.

For example:
How one Process can subscribe to Single Long Press:
sequence_events=0x01 sequence length=0x01
Having sequence length of one indicates a single press. And sequence_events having value of one at first bit (bit0) indicates Long Press, but if the first bit was zero then it is Short Press.
How one Process can subscribe to Sequence of Button Presses (Button Events):
sequence_events=0x05, sequence length=0x04
Sequence length is four, which means there are four separate Button events that need to occur in order for this sequence to be validated by the Button Process. Then, the sequence_events describes those events as(right to left):
Long Press(bit0), Short Press(bit1), shortPress(bit2), LongPress(bit3).
Through simple API the Button Process offers the following functionality: Subscribe to Button Events(Sequences)—Process X provides the Button Events mapping for describing the Sequence(sequence_length together with sequence_events). And also Event Handler which is to be called by the Button Process once there is a match registered.
Unsubscribe—Eliminate previously made subscription for Event Handler of Process X. The benefit of having such simplistic API is that the External Processes will receive only validated input, being either Event output from Accelerometer Process or matched Sequence from Accelerometer Process. So that the other Processes do not have to create complex logic to handle multiple Button Events. And when one Process wants to handle different Button events each one can have own Handler through the Subscription API.

Figure 128:
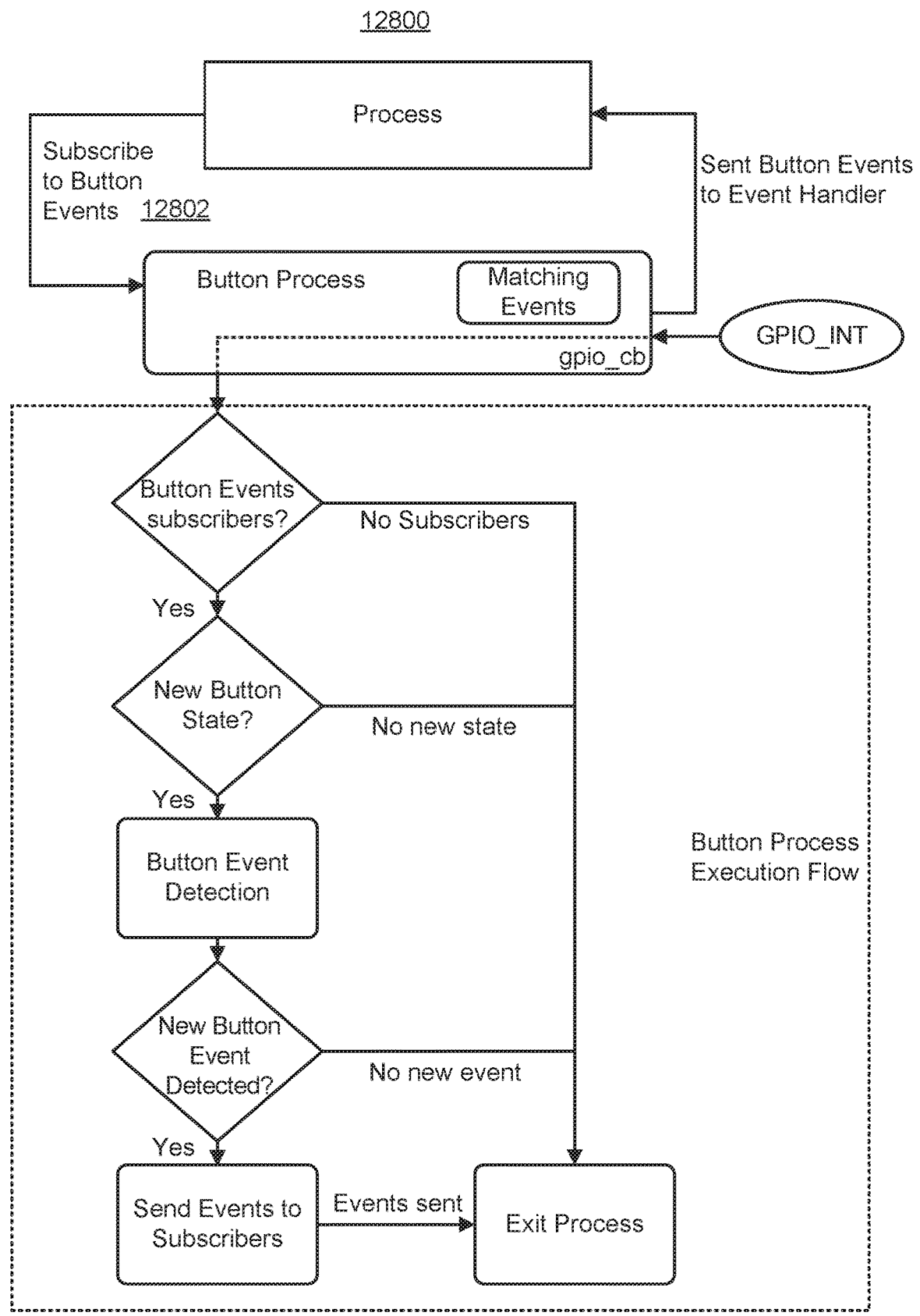

FIG. 128 shows an example 12800 relating to process overview and execution flow of the button process. Execution flow starts at the first instance of the Subscription call 12802.

The moment a Process subscribes to any Button Event or Sequence the Timer used for the Detection is being started or adjusted. Then, depending on the User Interactions one of the possible outcomes will occur—Timer will expire and the timer will be restarted, registering no change of state(Release/Press) from last time. Or the User has interacted with the Button and either Released or Pressed the button, which will trigger a GPIO Interrupt for handling by the Button Process, which on its turn will register the change of state.

The complete Execution flow is described in FIG. 128, only the Event detection is shown as own block. Because Event Detection is the internal Detection Algorithm separating the two Button Event types and doing the Sequence matching.

Figure 129:
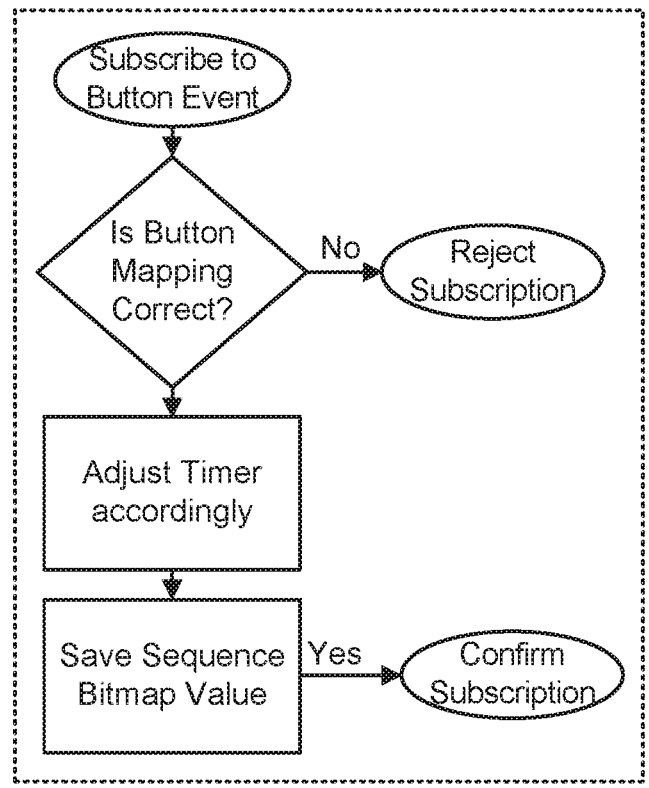

FIG. 129 shows an example 12900 relating to rejecting or confirming a subscription to a button event.

Figure 130:
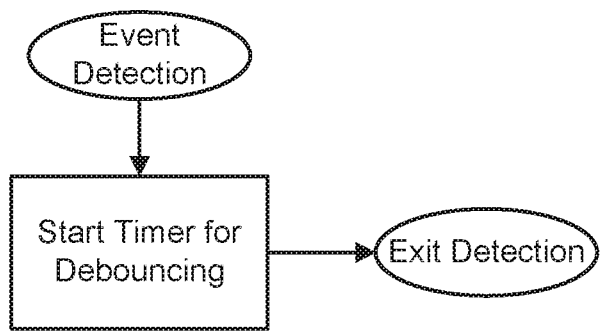

FIG. 130 shows an example 13000 relating to starting a timer for debouncing in response to an event detection.

Figure 131:
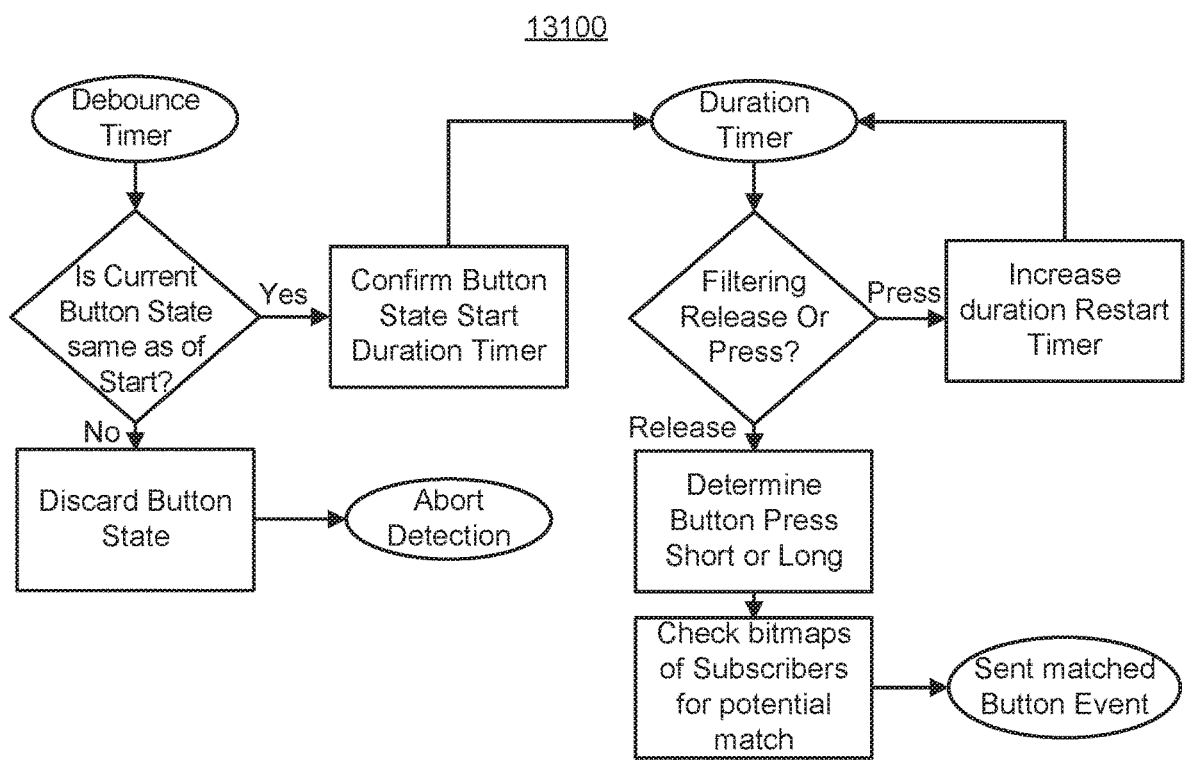

FIG. 131 shows an example 13100 relating to a button process, event detection. Button Process takes primary care of the GPIO Interrupt and Event Detection. Because validating the Button Events is key, the Event Detection is shown separately in own diagram.

The Event Detection algorithm is responsible for registering the Releases and Presses, while the Button Process is the one taking care of confirming there is a new state. Once new state has been registered, either transition from Release to Press or from Press to Release, the Event Detection will be called to evaluate the Event type. First the Event Detection is being called at new state for Press, which is how any Button Event starts. Then, depending on the Duration of the Press, an Event of either Short or Long Press will be Matched. Additionally the Detection algorithm will match against any Bitmap sequences stores from subscribed Processes. In case there is a Match, the Event will be sent.

The Detection algorithm has the responsibility to control the Timer, as seen above, in order to register no changes of Button state and also have control over the Debounce Technique.

The following table relates to tag protocol independent aspects:

| S. NO | Protocol independent requirements | Protocol dependent requirements |
|---|---|---|
| 1. | Tag Off mode (ID 1) On single press, the Tag should boot up and run the idle thread putting the Tag in sleep state. | Battery health (ID 8) Connectivity(ID9, ID10, ID13) |
| 2. | Tag UID (ID2) UID is the static MAC address of the Tag | OTA (ID 14 to ID19) |
| 3. | Tag Meta data (ID 3) | Tag - Activity logging ID 41 |
| 4 | Tag - Charging (ID 5) | Tag - find ability server(ID40) |
| 5. | Tag - Power management(ID 6) Some part of power management can be done autonomously and this can be described. Ex: 1. Accelerometer event waking up the Tag The power management can also be controlled from app which involves the protocol. | Tag - Accessibility(ID35, 36) |
| 6. | Tag - Battery indication (ID 7) Part of Fuel gauge driver. Reporting the battery status to the app involves protocol. | Tag - reset via application (ID21) |
| 7. | Tag - To enter sleep mode on pairing time out ID11 and ID 12 are the same | Tag - firmware waking up the Mobile Device application (ID 42) |
| 8. | Tag reboot to safe state - ID 20 This can be implemented without an external trigger. And the trigger is dependent on protocol. | Alerts (low battery, over/under voltage, current) to Mobile Device (id 43) |
| 9. | Buttons and User Interaction with Buttons ID 27-34 Button can be realized, all three main functions: Push, Press and Long Press. | Tag - silent mode setting from the Mobile Device for buzzer ID 39 |
| 10. | Tag - Enter sleep mode, if no accelerometer event (ID 38) | Tag - Tower localization (ID22 ID23 ID24 ID25 ID26) |

| S. NO | Protocol independent requirements | Protocol dependent requirements |
|---|---|---|
| 11. | Tag - Accelerometer wakes up the Tag from sleep state (ID 37) | Localization Feature - Big Effort (ID59) |
| 12. | Tag - Beacon pattern optimization based on the phone in the vicinity (ID 44, ID45, ID46, ID 47 ID54) | |
| 13. | Tag stationary power saving ID 48 | |
| 14. | Tag Firmware Protection ID 50 and ID51 | |
| 15. | Tag revert to safe power state in case of BLE connection failure or app is killed (ID 60) For example: Loss of BLE Connection | "Night Mode" function but for every time of day - ID49 ID57 This functionality depends on the Time, but the Time depends on the Phone. |
| 16. | Tag should store device around it from scans (ID 58) | |

Some exemplary implementations are described herein. Other implementations are within the scope of the present disclosure, including, but not limited to, systems and/or techniques relating to laboratory management, home security, workplace security, public security, school security, shipping, and/or logistics management.

Systems and/or techniques described herein can operate in accordance with one or more of the following. A system and/or process can use connected devices to create collaborative, modular, scalable, and more contextually aware, intelligent environments (systems and subsystems) across connected device space, IoT device space, and/or a smart home device space. In some implementations, a system and/or process can interpret ambient radio signals from connected devices (frequency, RSSI, beaconing frequency, packet loss, etc. and/or the changes of each over time) to determine identity, presence, location, motion, proximity, and/or directionality. For example, a system and/or process can determine presence or absence of identifiable items, sub-systems, and/or people within specified location parameters or relative proximity parameters. As another example, a system and/or process can determine location and/or proximity of identifiable items, sub-systems, and/or people relative to other identifiable items, sub-systems, people, and/or locations using calculations based on radio signal characteristics such as RSSI strengths, radio frequencies, and the triangulation of data, correlated with changes in values over time. As another example, a system and/or process can determine relative motion and directionality of position and motion of identifiable items, sub-systems, or people relative to other identifiable items, sub-systems, people, and/or locations.

In some implementations, a system and/or process can setup and manage relationships between identifiable radio signals (comprising identifiable items, devices, systems, sub-systems, and/or locations) to create complex rules, groupings, hierarchies, permissions, and controls to enable users to customize behaviors of intelligent environments. For example, a system and/or process can create smart group systems and/or nested sub-systems that are aware of identifiable contents (comprising users, items, locations, and/or sub-systems) within the system, what is missing from the system, and/or what is entering or leaving the system by setting up a radio-based proximity geofence. As another example, a house system can be aware of who is entering the house, where they are relative to the places and items within the house, and/or which room (sub-system) they are in. As another example, a garage sub-system can be aware if an identifiable vehicle is parked within it; the vehicle can be aware of the identifiable contents within the vehicle. As another example, a cabinet sub-system within the kitchen of the house can be aware when contents within have been accessed and identify what person has accessed it. As another example, a system and/or process can allow multi-factor authentication of items, people, systems, subsystems, locations, and/or system states through recognition of multiple radio signals that share relationship-based characteristics. As another example, a system and/or process can recognize radio signatures of a user's phone, with their keys, wallet, and smart bag which provide multiple distinct points of data that, together, validates user identity. As another example, a system and/or process can recognize a radio signature of a device attached to a dog that is leaving the house by itself and interpret it as a running off because there are no other identifiable objects to validate its safe state. As another example, a system and/or process can recognize the same radio signature of a device attached to a dog that leaves the house with an identifiable leash and/or caretaker indicates that the dog is being walked and validates the state of the system as safe.

A system and/or process can integrate device sensor data to detect real-world conditions (location, connectivity, time, temperature, acceleration, and/or humidity, etc.) to add contextual awareness to enable user initiated and/or automated responses within intelligent environments.

A system and/or process can enable connected devices to change behaviors based on context or application within an intelligent environment. In some implementations, a system and/or process can adjust communications cadence within a system or specific subsystem(s) according to context and/or application. A system and/or process can change communications frequency if a purse sub-system is at rest with all of its contents accounted for. For example, the system and/or process can lower its radio beaconing frequency to conserve power. As another example, if the purse sub-system were to experience movement, it can increase its radio beaconing frequency for a duration of time to immediately check on its contents until the sub-system experiences another change in status. A system and/or process can change its communications method if a purse sub-system were deemed lost (e.g., user initiated or self-determined). For example, a system and/or process can switch from a near-field communications protocol such as Bluetooth to a longer range communications protocol such as Bluetooth Long-Range (LoRa) to communicate its state to the owner.

A system and/or process can request a response from another connected device within the intelligent environment. For example, if a bicycle moves in the garage sub-system during the middle of the night without the owner's presence detected, the bicycle can request the garage light to turn on.

A system and/or process can alter access permissions or accessibility of device data under varying environmental conditions or status. For example, in a house/home system, a luggage sub-system is at rest with all broadcasted information secure and private. When the luggage sub-system enters an airport, it can share certain portions of its identifiable radio signature with an airline for tracking purposes. When the luggage sub-system arrives at the destination and is retrieved by the owner, the radio signature can return to a private and secure state. As another example, when a personal backpack system is with its owner, all broadcasted information can be secure and private. If the backpack were deemed lost (e.g., initiated by the user, or self-determined), the radio broadcast can change to include a variety of additional information for nearby devices or users. For example, additional information can include, but is not limited to, lost state, reward amount if found, and/or owner contact information. As another example, a system and/or process can switch communications methods based on varying environmental conditions or status.

A system and/or process can use radio wave characteristics of wireless transmissions to create user interactions and experiences. For example, system and/or process can use high RSSI between a device and a phone to perform pairing interactions and/or to bring up a specific device screens within a mobile app. As another example, a system and/or process can measure and calculate radio wave characteristics (RSSI, packet loss, movement, etc.) to dynamically adjust grouping boundaries.

A system and/or process can use hierarchal access permissions of varying users to identify or interact with them or tagged items. Crowd location can be performed. For example, a message identifying a tag can be broadcast to the devices of multiple users, prompting them to respond if the devices have detected the tag.

Figure 132:
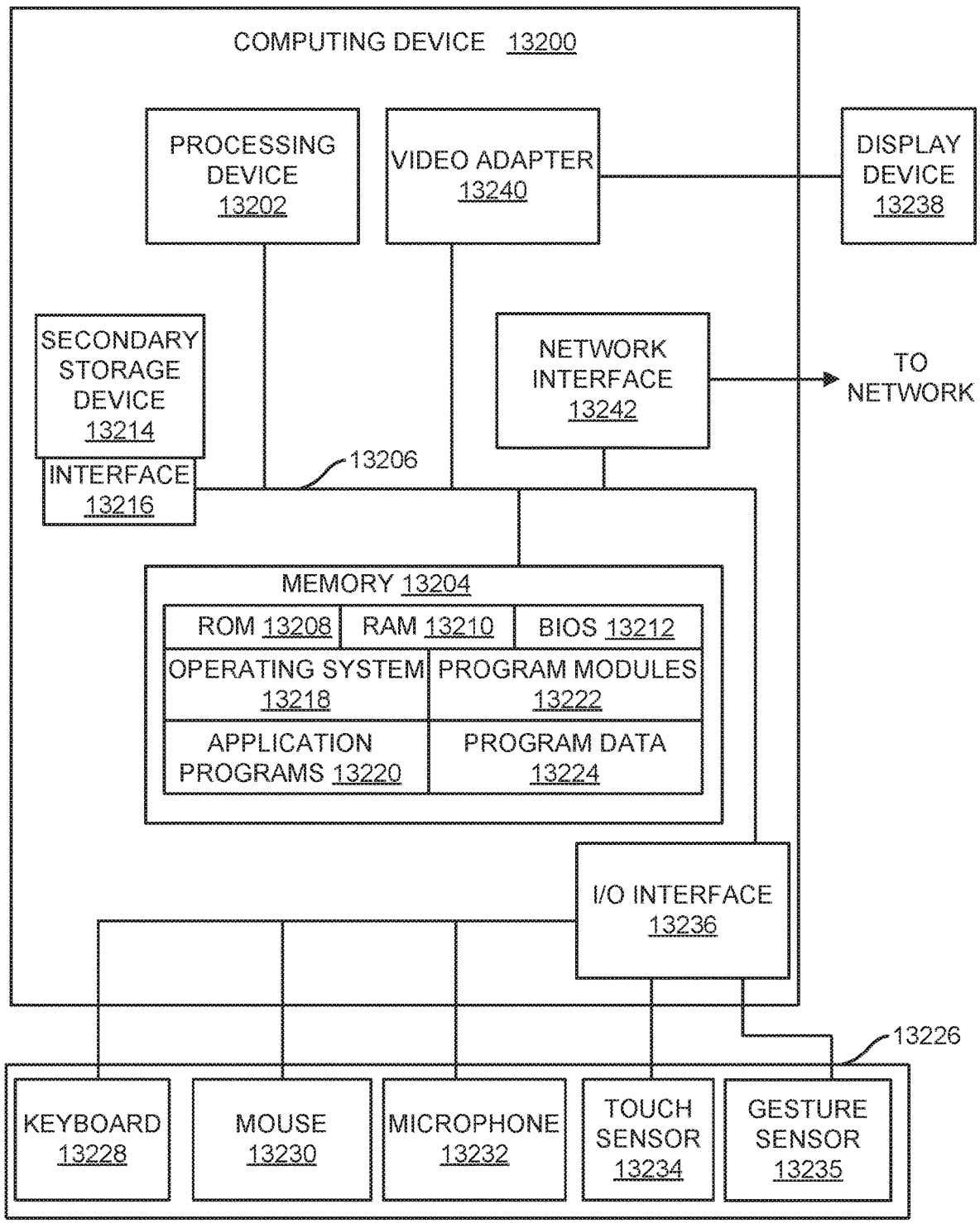

FIG. 132 illustrates an example architecture of a computing device 13200 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 132 can be used to execute the operating system, application programs, and/or software modules (including the software engines) described herein.

The computing device 13200 includes, in some embodiments, at least one processing device 13202 (e.g., a processor), such as a central processing unit (CPU). A variety of processing devices are available from a variety of manufacturers, for example, Intel or Advanced Micro Devices. In this example, the computing device 13200 also includes a system memory 13204, and a system bus 13206 that couples various system components including the system memory 13204 to the processing device 13202. The system bus 13206 is one of any number of types of bus structures that can be used, including, but not limited to, a memory bus, or memory controller; a peripheral bus; and a local bus using any of a variety of bus architectures.

Examples of computing devices that can be implemented using the computing device 13200 include a desktop computer, a laptop computer, a tablet computer, a mobile computing device (such as a smart phone, a touchpad mobile digital device, or other mobile devices), or other devices configured to process digital instructions.

The system memory 13204 includes read only memory 13208 and random access memory 13210. A basic input/output system 13212 containing the basic routines that act to transfer information within computing device 13200, such as during start up, can be stored in the read only memory 13208.

The computing device 13200 also includes a secondary storage device 13214 in some embodiments, such as a hard disk drive, for storing digital data. The secondary storage device 13214 is connected to the system bus 13206 by a secondary storage interface 13216. The secondary storage device 13214 and its associated computer readable media provide nonvolatile and non-transitory storage of computer readable instructions (including application programs and program modules), data structures, and other data for the computing device 13200.

Although the exemplary environment described herein employs a hard disk drive as a secondary storage device, other types of computer readable storage media are used in other embodiments. Examples of these other types of computer readable storage media include magnetic cassettes, flash memory cards, digital video disks, Bernoulli cartridges, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 13214 and/or system memory 13204, including an operating system 13218, one or more application programs 13220, other program modules 13222 (such as the software engines described herein), and program data 13224. The computing device 13200 can utilize any suitable operating system, such as Microsoft Windows™, Google Chrome™ OS, Apple OS, Unix, or Linux and variants and any other operating system suitable for a computing device. Other examples can include Microsoft, Google, or Apple operating systems, or any other suitable operating system used in tablet computing devices.

In some embodiments, a user provides inputs to the computing device 13200 through one or more input devices 13226. Examples of input devices 13226 include a keyboard 13228, mouse 13230, microphone 13232 (e.g., for voice and/or other audio input), touch sensor 13234 (such as a touchpad or touch sensitive display), and gesture sensor 13235 (e.g., for gestural input. In some implementations, the input device(s) 13226 provide detection based on presence, proximity, and/or motion. In some implementations, a user may walk into their home, and this may trigger an input into a processing device. For example, the input device(s) 13226 may then facilitate an automated experience for the user. Other embodiments include other input devices 13226. The input devices can be connected to the processing device 13202 through an input/output interface 13236 that is coupled to the system bus 13206. These input devices 13226 can be connected by any number of input/output interfaces, such as a parallel port, serial port, game port, or a universal serial bus. Wireless communication between input devices 13226 and the input/output interface 13236 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 13238, such as a monitor, liquid crystal display device, projector, or touch sensitive display device, is also connected to the system bus 13206 via an interface, such as a video adapter 13240. In addition to the display device 13238, the computing device 13200 can include various other peripheral devices (not shown), such as speakers or a printer.

The computing device 13200 can be connected to one or more networks through a network interface 13242. The network interface 13242 can provide for wired and/or wireless communication. In some implementations, the network interface 13242 can include one or more antennas for transmitting and/or receiving wireless signals. When used in a local area networking environment or a wide area networking environment (such as the Internet), the network interface 13242 can include an Ethernet interface. Other possible embodiments use other communication devices.

For example, some embodiments of the computing device 13200 include a modem for communicating across the network.

The computing device 13200 can include at least some form of computer readable media. Computer readable media includes any available media that can be accessed by the computing device 13200. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 13200.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 132 is also an example of programmable electronics, which may include one or more such computing devices, and when multiple computing devices are included, such computing devices can be coupled together with a suitable data communication network so as to collectively perform the various functions, methods, or operations disclosed herein.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A system comprising:
   first tags configured to organize activities regarding respective physical objects, each of the first tags including at least a first processor, a first memory, a sensor, an input device, an output device, a wireless communication component, and a first activity component operated using the first processor and the first memory to adapt a behavior of the respective first tag;
   a processing device configured to receive first wireless signals from at least some of the first tags, the processing device including a second processor, a second memory, and a second activity component operated using the second processor and the second memory to determine at least presence, proximity, and movement of the first tags based on the first wireless signals; and
   second tags assigned to at least one of the first tags, wherein the at least one of the first tags is configured to be a parent tag of each of the second tags, and wherein each of the second tags is configured to be a child tag of the at least one of the first tags, the second tags configured to send second wireless signals to the one of the first tags, wherein the first activity component of the one of the first tags determines at least presence, proximity, and movement of the second tags based on the second wireless signals;
   wherein the second activity component is configured to determine the presence, proximity, and movement of the first tags based on a received signal strength indication (RSSI) of the first wireless signals, a latency of the first wireless signals, a connectivity of the first wireless signals, a packet error rate of the first wireless signals, a packet loss of the first wireless signals, a change in the RSSI, a change in the latency, a change in the connectivity, a change in the packet error rate, and a change in the packet loss.

2. The system of claim 1, wherein the first activity component adapts the behavior of the respective first tag based on an output of the sensor of the respective first tag, the output including a measure of one or more of moisture, humidity, pressure, altitude, wind speed, strain, shear, particle radiation, or compass point direction.

3. The system of claim 1, wherein at least one of the first tags scans for second wireless signals from any of the second tags, and wherein the first activity component of the at least one of the first tags adapts the behavior of the one of the first tags based on scanning for the second wireless signals.

4. The system of claim 1, wherein the first memory of the one of the first tags has stored therein a record reflecting confidence levels relating to the presence, proximity, and movement of the second tags.

5. A method comprising:
   receiving, in a first tag configured to organize activities regarding a first physical object, first wireless signals from second tags assigned to the first tag and configured to organize activities regarding respective second physical objects, wherein the first tag is configured to be a parent tag of each of the second tags, and wherein each of the second tags is configured to be a child tag of the first tag;
   determining, in the first tag, event information regarding at least presence, proximity, and movement of the second tags, wherein the event information is determined taking into account a received signal strength indication (RSSI) of the first wireless signals, a latency of the first wireless signals, a connectivity of the first wireless signals, a packet error rate of the first wireless signals, a packet loss of the first wireless signals, a change in the RSSI, a change in the latency, a change in the connectivity, a change in the packet error rate, and a change in the packet loss;

sending, by a second wireless signal from the first tag to a processing device, the event information; and adapting a behavior of the first tag.

6. The method of claim 5, further comprising determining, by the first tag, a confidence level regarding the presence, proximity, and movement of the second tags, and sending the confidence level to the processing device.

7. The method of claim 5, further comprising invoking mesh networking based on the determination.

8. The method of claim 5, wherein the first tag has a beaconing pattern and further includes an accelerometer, and wherein adapting the behavior of the first tag comprises increasing the beaconing pattern in response to the accelerometer indicating that the first tag is in motion.

9. The method of claim 5, wherein the first tag includes an accelerometer, and wherein adapting the behavior of the first tag comprises adapting the behavior of the first tag in response to output from the accelerometer indicating a fall of the first tag.

10. The method of claim 9, wherein the processing device is included in a mobile device, and wherein adapting the behavior of the first tag further comprises pushing a notification to the processing device in response to the fall, and determining whether the mobile device moves away from the first tag.

11. A system comprising:

first tags configured to organize activities regarding respective physical objects, each of the first tags including at least a first processor, a first memory, a sensor, an input device, an output device, a wireless communication component, and a first activity component operated using the first processor and the first memory to adapt a behavior of the respective first tag;

a processing device configured to receive first wireless signals from at least some of the first tags, the processing device including a second processor, a second memory, and a second activity component operated using the second processor and the second memory to determine at least presence, proximity, and movement of the first tags based on the first wireless signals;

second tags assigned to at least one of the first tags, wherein the at least one of the first tags is configured to be a parent tag of each of the second tags, and wherein each of the second tags is configured to be a child tag of the at least one of the first tags, the second tags configured to send second wireless signals to the one of the first tags, wherein the first activity component of the one of the first tags determines at least presence, proximity, and movement of the second tags based on the second wireless signals; and a contextual engine in at least one of the first tags, wherein the first activity component uses the contextual engine in adapting the behavior of the at least one of the first tags, wherein the contextual engine is provided with an internal awareness pertaining to the physical object, and an external awareness relating to factors externally related to the first physical object of the at least one of the first tags, wherein the internal awareness comprises at least one preset state value and at least one dynamic state value, and wherein the preset state value comprises a manufacturer's suggested retail price of the first physical object, or the dynamic state value comprises a market value of the first physical object.

12. The system of claim 11, wherein the contextual engine provides at least event data based on calendar information, and a weather condition based on weather data.

* * * * *